United States Patent
Lee et al.

(10) Patent No.: US 12,177,160 B2
(45) Date of Patent: Dec. 24, 2024

(54) METHOD FOR TRANSMITTING HARQ-ACK CODEBOOK, USER EQUIPMENT, DEVICE AND STORAGE MEDIUM, AND METHOD AND BASE STATION FOR RECEIVING HARQ-ACK CODEBOOK

(71) Applicant: LG ELECTRONICS INC., Seoul (KR)

(72) Inventors: Hyunho Lee, Seoul (KR); Duckhyun Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 391 days.

(21) Appl. No.: 17/778,747

(22) PCT Filed: Mar. 30, 2020

(86) PCT No.: PCT/KR2020/004319
§ 371 (c)(1),
(2) Date: May 20, 2022

(87) PCT Pub. No.: WO2021/100982
PCT Pub. Date: May 27, 2021

(65) Prior Publication Data
US 2023/0006798 A1 Jan. 5, 2023

Related U.S. Application Data

(60) Provisional application No. 62/938,186, filed on Nov. 20, 2019.

(51) Int. Cl.
*H04B 7/0456* (2017.01)
*H04L 1/1812* (2023.01)
(Continued)

(52) U.S. Cl.
CPC ......... *H04L 5/0055* (2013.01); *H04B 7/0456* (2013.01); *H04L 1/1812* (2013.01); *H04W 72/21* (2023.01)

(58) Field of Classification Search
CPC .......... H04L 5/0055; H04L 1/1812; H04L 1/1614; H04L 1/1854; H04L 1/1896;
(Continued)

(56) References Cited

U.S. PATENT DOCUMENTS

| 2019/0306841 | A1* | 10/2019 | Huang | H04L 5/0055 |
| 2021/0227570 | A1* | 7/2021 | Park | H04L 1/189 |
| 2021/0352656 | A1* | 11/2021 | Choi | H04L 5/0094 |

FOREIGN PATENT DOCUMENTS

KR 1020180125549 11/2018

OTHER PUBLICATIONS

NTT Docomo, Inc., "Maintenance for carrier aggregation and bandwidth parts", R1-1809144, 3GPP TSG RAN WG1 Meeting #94, Aug. 2018, 23 pages.
(Continued)

*Primary Examiner* — Thai Nguyen
(74) *Attorney, Agent, or Firm* — LEE, HONG, DEGERMAN, KANG & WAIMEY

(57) ABSTRACT

A user equipment generates an HARQ-ACK codebook comprising HARQ-ACK bits for semi-persistent scheduling (SPS) physical downlink shared channels (PDSCHs) based on multiple SPS configurations, and transmits the HARQ-ACK codebook. In the HARQ-ACK codebook, with respect to an SPS configuration index and a serving cell index, an HARQ-ACK bit for an SPS PDSCH in a slot of a lower slot index precedes an HARQ-ACK bit for an SPS PDSCH in a slot of a higher slot index, and with respect to each serving cell index, an HARQ-ACK bit for an SPS PDSCH based on an SPS configuration having a lower SPS configuration
(Continued)

index precedes an HARQ-ACK bit for an SPS PDSCH based on an SPS configuration having a higher SPS configuration index.

13 Claims, 18 Drawing Sheets

(51) Int. Cl.
*H04L 5/00* (2006.01)
*H04W 72/21* (2023.01)

(58) Field of Classification Search
CPC ..... H04L 1/1607; H04L 5/001; H04L 5/0012; H04L 5/0026; H04L 5/0091; H04L 27/2602; H04L 1/1864; H04L 1/1819; H04B 7/0456; H04W 72/21
See application file for complete search history.

(56) References Cited

OTHER PUBLICATIONS

LG Electronics Inc., "Other aspects for URLLC/IIOT," 3GPP TSG-RAN WG1 #99, R1-1912402, Nov. 2019, 9 pages.
NTT Docomo, Inc., "Discussions on DL SPS Enhancement," 3GPP TSG-RAN WG1 #98bis, R1-1911182, Oct. 2019, 12 pages.
OPPO, "DL SPS Enhancement," 3GPP TSG-RAN WG1 #99, R1-1912524, Nov. 2019, 5 pages.
PCT International Application No. PCT/KR2020/004319, Written Opinion and International Search Report dated Aug. 11, 2020, 3 pages.

* cited by examiner

METHOD FOR TRANSMITTING HARQ-ACK CODEBOOK, USER EQUIPMENT, DEVICE AND STORAGE MEDIUM, AND METHOD AND BASE STATION FOR RECEIVING HARQ-ACK CODEBOOK

CROSS-REFERENCE TO RELATED APPLICATIONS

This application is the National Stage filing under 35 U.S.C. 371 of International Application No. PCT/KR2020/004319, filed on Mar. 30, 2020, which claims the benefit of U.S. Provisional Application No. 62/938,186, filed on Nov. 20, 2019, the contents of which are all incorporated by reference herein in their entirety.

TECHNICAL FIELD

The present disclosure relates to a wireless communication system.

BACKGROUND ART

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at anytime and anywhere by connecting a plurality of devices and objects to each other is one main issue to be considered in next-generation communication.

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

DISCLOSURE

Technical Task

As new radio communication technology has been introduced, the number of UEs to which a BS should provide services in a prescribed resource region is increasing and the volume of data and control information that the BS transmits/receives to/from the UEs to which the BS provides services is also increasing. Since the amount of resources available to the BS for communication with the UE(s) is limited, a new method for the BS to efficiently receive/transmit uplink/downlink data and/or uplink/downlink control information from/to the UE(s) using the limited radio resources is needed. In other words, due to increase in the density of nodes and/or the density of UEs, a method for efficiently using high-density nodes or high-density UEs for communication is needed.

A method to efficiently support various services with different requirements in a wireless communication system is also needed.

Overcoming delay or latency is an important challenge to applications, performance of which is sensitive to delay/latency.

The objects to be achieved with the present disclosure are not limited to what has been particularly described hereinabove and other objects not described herein will be more clearly understood by persons skilled in the art from the following detailed description.

Technical Solutions

According to one aspect of the present disclosure, a method for transmitting a hybrid automatic repeat request acknowledgment (HARQ-ACK) codebook by user equipment in a wireless communication system is provided. The method includes generating the HARQ-ACK codebook including HARQ-ACK bits for SPS physical downlink shared channels (PDSCHs) based on a plurality of semi-persistent scheduling (SPS) configurations, and transmitting the HARQ-ACK codebook. The HARQ-ACK codebook is generated such that a HARQ-ACK bit for an SPS PDSCH in a slot with a low slot index precedes a HARQ-ACK bit for an SPS PDSCH in a slot with a high slot index with respect to an SPS configuration index and a serving cell index, and the HARQ-ACK codebook is generated such that a HARQ-ACK bit for an SPS PDSCH based on an SPS configuration with a lower SPS configuration index precedes a HARQ-ACK bit for an SPS PDSCH based on an SPS configuration with a higher SPS configuration index with respect to each serving cell index.

According to another aspect of the present disclosure, user equipment transmitting a hybrid automatic repeat request acknowledgment (HARQ-ACK) codebook in a wireless communication system is provided. The user equipment includes at least one transceiver, at least one processor, and at least one computer memory operably connectable to the at least one processor and storing instructions that, when executed, cause the at least one processor to perform operations. The operations include generating the HARQ-ACK codebook including HARQ-ACK bits for SPS physical downlink shared channels (PDSCHs) based on a plurality of semi-persistent scheduling (SPS) configurations, and transmitting the HARQ-ACK codebook. The HARQ-ACK codebook is generated such that a HARQ-ACK bit for an SPS PDSCH in a slot with a low slot index precedes a HARQ-ACK bit for an SPS PDSCH in a slot with a high slot index with respect to an SPS configuration index and a serving cell index, and the HARQ-ACK codebook is generated such that a HARQ-ACK bit for an SPS PDSCH based on an SPS configuration with a lower SPS configuration index precedes a HARQ-ACK bit for an SPS PDSCH based on an SPS configuration with a higher SPS configuration index with respect to each serving cell index.

According to another aspect of the present invention, a device for user equipment is provided. The device includes at least one processor and at least one computer memory operably connectable to the at least one processor and storing instructions that, when executed, cause the at least one processor to perform operations. The operations include generating the HARQ-ACK codebook including HARQ-ACK bits for SPS physical downlink shared channels (PD- SCHs) based on a plurality of semi-persistent scheduling (SPS) configurations, and transmitting the HARQ-ACK codebook. The HARQ-ACK codebook is generated such that a HARQ-ACK bit for an SPS PDSCH in a slot with a low slot index precedes a HARQ-ACK bit for an SPS PDSCH in a slot with a high slot index with respect to an SPS configuration index and a serving cell index, and the HARQ-ACK codebook is generated such that a HARQ-ACK bit for an SPS PDSCH based on an SPS configuration with a lower SPS configuration index precedes a HARQ-ACK bit for an SPS PDSCH based on an SPS configuration with a higher SPS configuration index with respect to each serving cell index.

According to another aspect of the present disclosure, a computer-readable storage medium is provided. The computer-readable storage medium stores at least one computer program including instructions that, when executed by at least one processor, cause the at least one processor to perform operations for user equipment. The operations include generating the HARQ-ACK codebook including HARQ-ACK bits for SPS physical downlink shared channels (PDSCHs) based on a plurality of semi-persistent scheduling (SPS) configurations, and transmitting the HARQ-ACK codebook. The HARQ-ACK codebook is generated such that a HARQ-ACK bit for an SPS PDSCH in a slot with a low slot index precedes a HARQ-ACK bit for an SPS PDSCH in a slot with a high slot index with respect to an SPS configuration index and a serving cell index, and the HARQ-ACK codebook is generated such that a HARQ-ACK bit for an SPS PDSCH based on an SPS configuration with a lower SPS configuration index precedes a HARQ-ACK bit for an SPS PDSCH based on an SPS configuration with a higher SPS configuration index with respect to each serving cell index.

According to another aspect of the present disclosure, a method for receiving a hybrid automatic repeat request acknowledgment (HARQ-ACK) codebook by a base station in a wireless communication system is provided. The method includes transmitting SPS physical downlink shared channels (PDSCHs) based on a plurality of semi-persistent scheduling (SPS) configurations, and receiving the HARQ-ACK codebook including HARQ-ACK bits for the SPS PDSCHs. The HARQ-ACK codebook includes the HARQ-ACK bits for the SPS PDSCHs such that a HARQ-ACK bit for an SPS PDSCH in a slot with a low slot index precedes a HARQ-ACK bit for an SPS PDSCH in a slot with a high slot index with respect to an SPS configuration index and a serving cell index, and the HARQ-ACK codebook includes the HARQ-ACK bits for the SPS PDSCHs such that a HARQ-ACK bit for an SPS PDSCH based on an SPS configuration with a lower SPS configuration index precedes a HARQ-ACK bit for an SPS PDSCH based on an SPS configuration with a higher SPS configuration index with respect to each serving cell index.

According to another aspect of the present disclosure, a base station receiving a hybrid automatic repeat request acknowledgment (HARQ-ACK) codebook in a wireless communication system is provided. The base station includes at least one transceiver, at least one processor, and at least one computer memory operably connectable to the at least one processor and storing instructions that, when executed, cause the at least one processor to perform operations. The operations include transmitting SPS physical downlink shared channels (PDSCHs) based on a plurality of semi-persistent scheduling (SPS) configurations, and receiving the HARQ-ACK codebook including HARQ-ACK bits for the SPS PDSCHs. The HARQ-ACK codebook includes the HARQ-ACK bits for the SPS PDSCHs such that a HARQ-ACK bit for an SPS PDSCH in a slot with a low slot index precedes a HARQ-ACK bit for an SPS PDSCH in a slot with a high slot index with respect to an SPS configuration index and a serving cell index, and the HARQ-ACK codebook includes the HARQ-ACK bits for the SPS PDSCHs such that a HARQ-ACK bit for an SPS PDSCH based on an SPS configuration with a lower SPS configuration index precedes a HARQ-ACK bit for an SPS PDSCH based on an SPS configuration with a higher SPS configuration index with respect to each serving cell index.

In each aspect of the present disclosure, the HARQ-ACK codebook may include the HARQ-ACK bits for the SPS PDSCHs such that all HARQ-ACK bits for an SPS PDSCH of a cell with a lower serving cell index precede all HARQ-ACK bits for an SPS PDSCH of a cell with a higher serving cell index.

In each aspect of the present disclosure, the HARQ-ACK codebook may be transmitted or received through a physical uplink control channel (PUCCH).

In each aspect of the present disclosure, the HARQ-ACK codebook may include only the HARQ-ACK bits for the SPS PDSCHs.

In each aspect of the present disclosure, the HARQ-ACK codebook may include the HARQ-ACK bits for the SPS PDSCHs such that a HARQ ACK bit for an SPS PDSCH associated with a larger PDSCH-to-HARQ feedback timing value precedes a HARQ-ACK bit for an SPS PDSCH associated with a smaller PDSCH-to-HARQ feedback timing value with respect to each serving cell index.

In each aspect of the present disclosure, the HARQ-ACK codebook includes the HARQ-ACK bits for the SPS PDSCHs such that a HARQ-ACK bit for an SPS PDSCH based on an SPS configuration with a lower SPS configuration index precedes a HARQ-ACK bit for an SPS PDSCH based on an SPS configuration with a higher SPS configuration index with respect to the same PDSCH-to-HARQ feedback timing value and the same serving cell index.

The foregoing solutions are merely a part of the examples of the present disclosure and various examples into which the technical features of the present disclosure are incorporated may be derived and understood by persons skilled in the art from the following detailed description.

Advantageous Effects

According to implementation(s) of the present disclosure, a wireless communication signal may be efficiently transmitted/received. Accordingly, the total throughput of a wireless communication system may be raised.

According to implementation(s) of the present disclosure, various services with different requirements may be efficiently supported in a wireless communication system.

According to implementation(s) of the present disclosure, delay/latency generated during radio communication between communication devices may be reduced.

The effects according to the present disclosure are not limited to what has been particularly described hereinabove and other effects not described herein will be more clearly understood by persons skilled in the art related to the present disclosure from the following detailed description.

DESCRIPTION OF DRAWINGS

The accompanying drawings, which are included to provide a further understanding of the present disclosure, illustrate examples of implementations of the present disclosure and together with the detailed description serve to explain implementations of the present disclosure.

BEST MODE FOR DISCLOSURE

Figure 1:
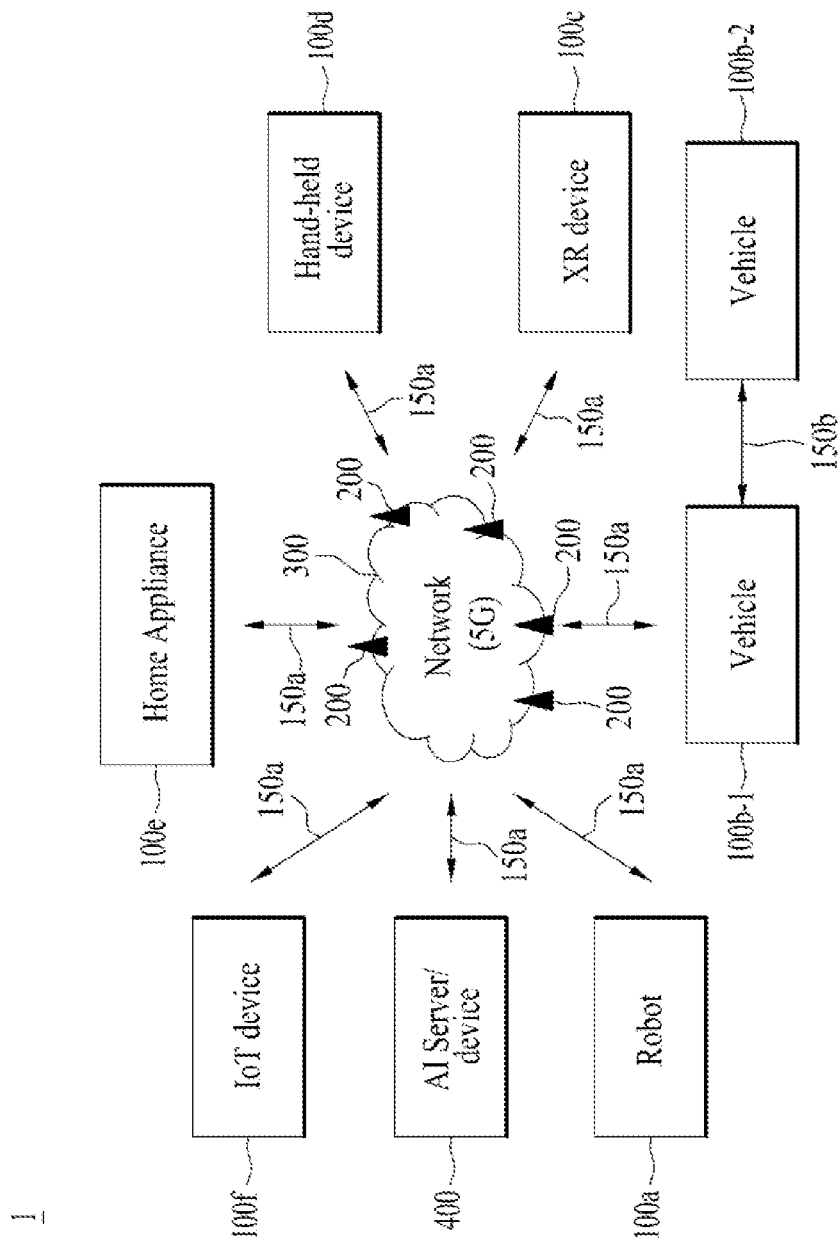
FIG. 1 illustrates an example of a communication system 1 to which implementations of the present disclosure are applied.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP LTE standard specifications, for example, 3GPP TS 36.211, 3GPP TS 36.212, 3GPP TS 36.213, 3GPP TS 36.321, 3GPP TS 36.300, 3GPP TS 36.331, etc. and 3GPP NR standard specifications, for example, 3GPP TS 38.211, 3GPP TS 38.212, 3GPP TS 38.213, 3GPP TS 38.214, 3GPP TS 38.300, 3GPP TS 38.331, etc.

In examples of the present disclosure described later, if a device "assumes" something, this may mean that a channel transmission entity transmits a channel in compliance with the corresponding "assumption". This also may mean that a channel reception entity receives or decodes the channel in the form of conforming to the "assumption" on the premise that the channel has been transmitted in compliance with the "assumption".

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, repeater, etc. may be a node. Furthermore, a node may not be a BS. For example, a radio remote head (RRH) or a radio remote unit (RRU) may be a node. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per node. An antenna may refer to a physical antenna port or refer to a virtual antenna or an antenna group. The node may also be called a point.

In the present disclosure, a cell refers to a specific geographical area in which one or more nodes provide communication services. Accordingly, in the present disclosure, communication with a specific cell may mean communication with a BS or a node providing communication services to the specific cell. A DL/UL signal of the specific cell refers to a DL/UL signal from/to the BS or the node providing communication services to the specific cell. A cell providing UL/DL communication services to a UE is especially called a serving cell. Furthermore, channel status/quality of the specific cell refers to channel status/quality of a channel or a communication link generated between the BS or the node providing communication services to the specific cell and the UE. In 3GPP-based communication systems, the UE may measure a DL channel state from a specific node using cell-specific reference signal(s) (CRS(s)) transmitted on a CRS resource and/or channel state information reference signal(s) (CSI-RS(s)) transmitted on a CSI-RS resource, allocated to the specific node by antenna port(s) of the specific node.

A 3GPP-based communication system uses the concept of a cell in order to manage radio resources, and a cell related to the radio resources is distinguished from a cell of a geographic area.

The "cell" of the geographic area may be understood as coverage within which a node may provide services using a carrier, and the "cell" of the radio resources is associated with bandwidth (BW), which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of radio resources used by the node. Accordingly, the term "cell" may be used to indicate service coverage by the node sometimes, radio resources at other times, or a range that a signal using the radio resources may reach with valid strength at other times.

In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information. For example, the combination of the DL resources and the UL resources may be indicated by system information block type 2 (SIB2) linkage. In this case, the carrier frequency may be equal to or different from a center frequency of each cell or CC. When carrier aggregation (CA) is configured, the UE has only one radio resource control (RRC) connection with a network. During RRC connection establishment/re-establishment/handover, one serving cell provides non-access stratum (NAS) mobility information. During RRC connection re-establishment/handover, one serving cell provides security input. This cell is referred to as a primary cell (Pcell). The Pcell refers to a cell operating on a primary frequency on which the UE performs an initial connection establishment procedure or initiates a connection re-establishment procedure. According to UE capability, secondary cells (Scells) may be configured to form a set of serving cells together with the Pcell. The S cell may be configured after completion of RRC connection establishment and used to provide additional radio resources in addition to resources of a specific cell (SpCell). A carrier corresponding to the Pcell on DL is referred to as a downlink primary CC (DL PCC), and a carrier corresponding to the Pcell on UL is referred to as an uplink primary CC (UL PCC). A carrier corresponding to the Scell on DL is referred to as a downlink secondary CC (DL SCC), and a carrier corresponding to the Scell on UL is referred to as an uplink secondary CC (UL SCC).

For dual connectivity (DC) operation, the term SpCell refers to the Pcell of a master cell group (MCG) or the Pcell of a secondary cell group (SCG). The SpCell supports PUCCH transmission and contention-based random access and is always activated. The MCG is a group of service cells associated with a master node (e.g., BS) and includes the SpCell (Pcell) and optionally one or more Scells. For a UE configured with DC, the SCG is a subset of serving cells associated with a secondary node and includes a PSCell and 0 or more Scells. For a UE in RRC CONNECTED state, not configured with CA or DC, only one serving cell including only the Pcell is present. For a UE in RRC CONNECTED state, configured with CA or DC, the term serving cells refers to a set of cells including SpCell(s) and all Scell(s). In DC, two medium access control (MAC) entities, i.e., one MAC entity for the MCG and one MAC entity for the SCG, are configured for the UE.

A UE with which CA is configured and DC is not configured may be configured with a Pcell PUCCH group, which includes the Pcell and 0 or more Scells, and an Scell PUCCH group, which includes only Scell(s). For the Scells, an Scell on which a PUCCH associated with the corresponding cell is transmitted (hereinafter, PUCCH cell) may be configured. An S cell indicated as the PUCCH Scell belongs to the Scell PUCCH group and PUCCH transmission of related uplink control information (UCI) is performed on the PUCCH Scell. An Scell, which is not indicated as the PUCCH Scell or in which a cell indicated for PUCCH transmission is a Pcell, belongs to the Pcell PUCCH group and PUCCH transmission of related UCI is performed on the Pcell.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PCFICH), a physical downlink control channel (PDCCH), etc. are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, the PDCCH refers to a set of time-frequency resources (e.g., resource elements) that carry downlink control information (DCI), and the PDSCH refers to a set of time-frequency resources that carry DL data. The PUCCH, PUSCH, and PRACH refer to a set of time-frequency resources that carry UCI, UL data, and random access signals, respectively. In the following description, the meaning of "The UE transmits/receives the PUCCH/PUSCH/PRACH" is that the UE transmits/receives the UCI/UL data/random access signals on or through the PUSCH/PUCCH/PRACH, respectively. In addition, the meaning of "the BS transmits/receives the PBCH/PDCCH/PDSCH" is that the BS transmits the broadcast information/DL data/DCI on or through a PBCH/PDCCH/PDSCH, respectively.

As more and more communication devices have required greater communication capacity, there has been a need for eMBB communication relative to legacy radio access technology (RAT). In addition, massive MTC for providing various services at any time and anywhere by connecting a plurality of devices and objects to each other is one main issue to be considered in next-generation communication.

Further, communication system design considering services/UEs sensitive to reliability and latency is also under discussion. The introduction of next-generation RAT is being discussed in consideration of eMBB communication, massive MTC, ultra-reliable and low-latency communication (URLLC), and the like. Currently, in 3GPP, a study on the next-generation mobile communication systems after EPC is being conducted. In the present disclosure, for convenience, the corresponding technology is referred to as a new RAT (NR) or fifth-generation (5G) RAT, and a system using NR or supporting NR is referred to as an NR system.

FIG. 1 illustrates an example of a communication system 1 to which implementations of the present disclosure are applied. Referring to FIG. 1, the communication system 1 applied to the present disclosure includes wireless devices, BSs, and a network. Here, the wireless devices represent devices performing communication using RAT (e.g., 5G NR or LTE (e.g., E-UTRA)) and may be referred to as communication/radio/5G devices. The wireless devices may include, without being limited to, a robot $100a$, vehicles $100b$-1 and $100b$-2, an extended reality (XR) device $100c$, a hand-held device $100d$, a home appliance $100e$, an Internet of Things (IoT) device $100f$, and an artificial intelligence (AI) device/server 400. For example, the vehicles may include a vehicle having a wireless communication function, an autonomous driving vehicle, and a vehicle capable of performing vehicle-to-vehicle communication. Here, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless device $200a$ may operate as a BS/network node with respect to another wireless device.

The wireless devices $100a$ to $100f$ may be connected to a network 300 via BSs 200. AI technology may be applied to the wireless devices $100a$ to $100f$ and the wireless devices $100a$ to $100f$ may be connected to the AI server 400 via the network 300. The network 300 may be configured using a 3G network, a 4G (e.g., LTE) network, or a 5G (e.g., NR) network. Although the wireless devices $100a$ to $100f$ may communicate with each other through the BSs 200/network 300, the wireless devices $100a$ to $100f$ may perform direct communication (e.g., sidelink communication) with each other without passing through the BSs/network. For example, the vehicles $100b$-1 and $100b$-2 may perform direct communication (e.g. vehicle-to-vehicle (V2V)/Vehicle-to-everything (V2X) communication). The IoT device (e.g., a sensor) may perform direct communication with other IoT devices (e.g., sensors) or other wireless devices $100a$ to $100f$.

Wireless communication/connections $150a$ and $150b$ may be established between the wireless devices $100a$ to $100f$ and the BSs 200 and between the wireless devices $100a$ to $100f$. Here, the wireless communication/connections such as UL/DL communication $150a$ and sidelink communication $150b$ (or, device-to-device (D2D) communication) may be established by various RATs (e.g., 5G NR). The wireless devices and the BSs/wireless devices may transmit/receive radio signals to/from each other through the wireless communication/connections 150a and 150b. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
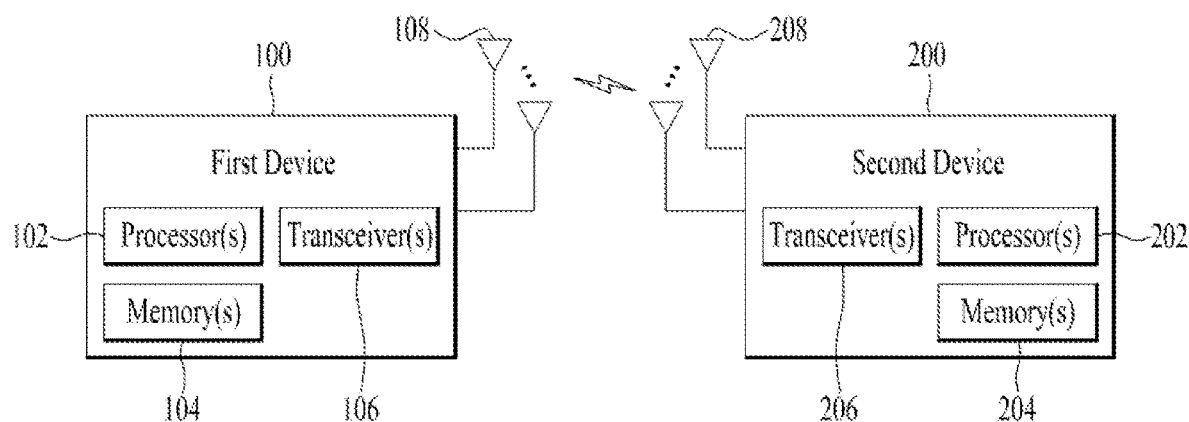
FIG. 2 is a block diagram illustrating examples of communication devices capable of performing a method according to the present disclosure.

FIG. 2 is a block diagram illustrating examples of communication devices capable of performing a method according to the present disclosure. Referring to FIG. 2, a first wireless device 100 and a second wireless device 200 may transmit and/or receive radio signals through a variety of RATs (e.g., LTE and NR). Here, {the first wireless device 100 and the second wireless device 200} may correspond to {the wireless device 100x and the BS 200} and/or {the wireless device 100x and the wireless device 100x} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the above-described/proposed functions, procedures, and/or methods. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or all of processes controlled by the processor(s) 102 or store software code including instructions for performing the above-described/proposed procedures and/or methods. Here, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 is used interchangeably with radio frequency (RF) unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the above-described/proposed functions, procedures, and/or methods. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or all of processes controlled by the processor(s) 202 or store software code including instructions for performing the above-described/proposed procedures and/or methods. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 is used interchangeably with RF unit(s). In the present disclosure, the wireless device may represent the communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as a physical (PHY) layer, medium access control (MAC) layer, a radio link control (RLC) layer, a packet data convergence protocol (PDCP) layer, radio resource control (RRC) layer, and a service data adaptation protocol (SDAP) layer). The one or more processors 102 and 202 may generate one or more protocol data units (PDUs) and/or one or more service data units (SDUs) according to the functions, procedures, proposals, and/or methods disclosed in this document. The one or more processors 102 and 202 may generate messages, control information, data, or information according to the functions, procedures, proposals, and/or methods disclosed in this document. The one or more processors 102 and 202 may generate signals (e.g., baseband signals) including PDUs, SDUs, messages, control information, data, or information according to the functions, procedures, proposals, and/or methods disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The functions, procedures, proposals, and/or methods disclosed in this document may be implemented using firmware or software, and the firmware or software may be configured to include the modules, procedures, or functions. Firmware or software configured to perform the functions, procedures, proposals, and/or methods disclosed in this document may be included in the one or more processors 102 and 202 or stored in the one or more memories 104 and 204 so as to be driven by the one or more processors 102 and 202. The functions, procedures, proposals, and/or methods disclosed in this document may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
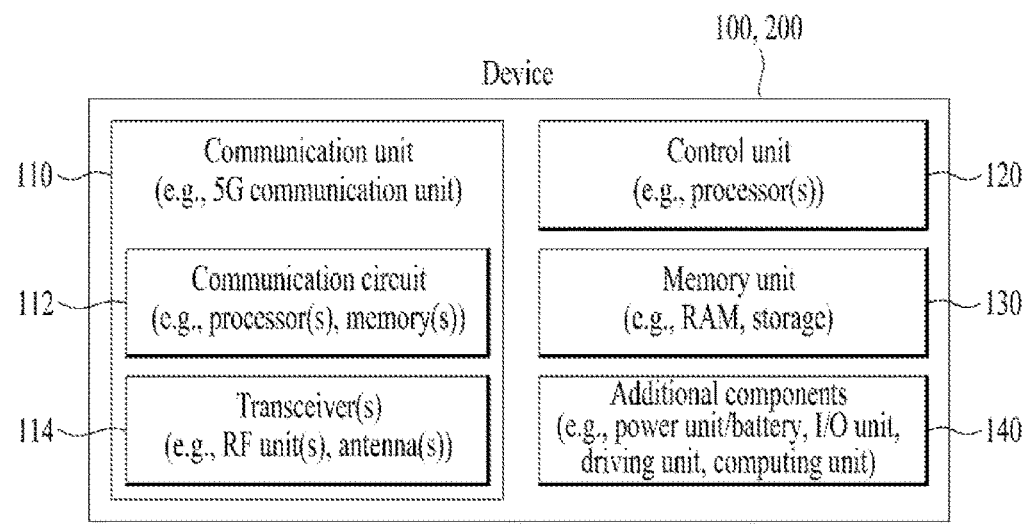
FIG. 3 illustrates another example of a wireless device capable of performing implementation(s) of the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast UE, a hologram device, a public safety device, an MTC device, a medicine device, a fintech device (or a finance device), a security device, a climate/environment device, the AI server/device (400 of FIG. 1), the BS (200 of FIG. 1), a network node, etc. The wireless device may be used in a mobile or fixed place according to a use-case/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a volatile memory, a non-volatile memory, and/or a combination thereof.

In the present disclosure, at least one memory (e.g., 104 or 204) may store instructions or programs which, when executed, cause at least one processor operably coupled to the at least one memory to perform operations according to some embodiments or implementations of the present disclosure.

In the present disclosure, a computer-readable storage medium may store at least one instruction or computer program which, when executed by at least one processor, causes the at least one processor to perform operations according to some embodiments or implementations of the present disclosure.

In the present disclosure, a processing device or apparatus may include at least one processor and at least one computer memory coupled to the at least one memory. The at least one computer memory may store instructions or programs which, when executed, cause the at least one processor operably coupled to the at least one memory to perform operations according to some embodiments or implementations of the present disclosure.

A communication device of the present disclosure includes at least one processor; and at least one computer memory operably connectable to the at least one processor and configured to store instructions for causing, when executed, the at least one processor to perform operations according to example(s) of the present disclosure described later.

Figure 4:
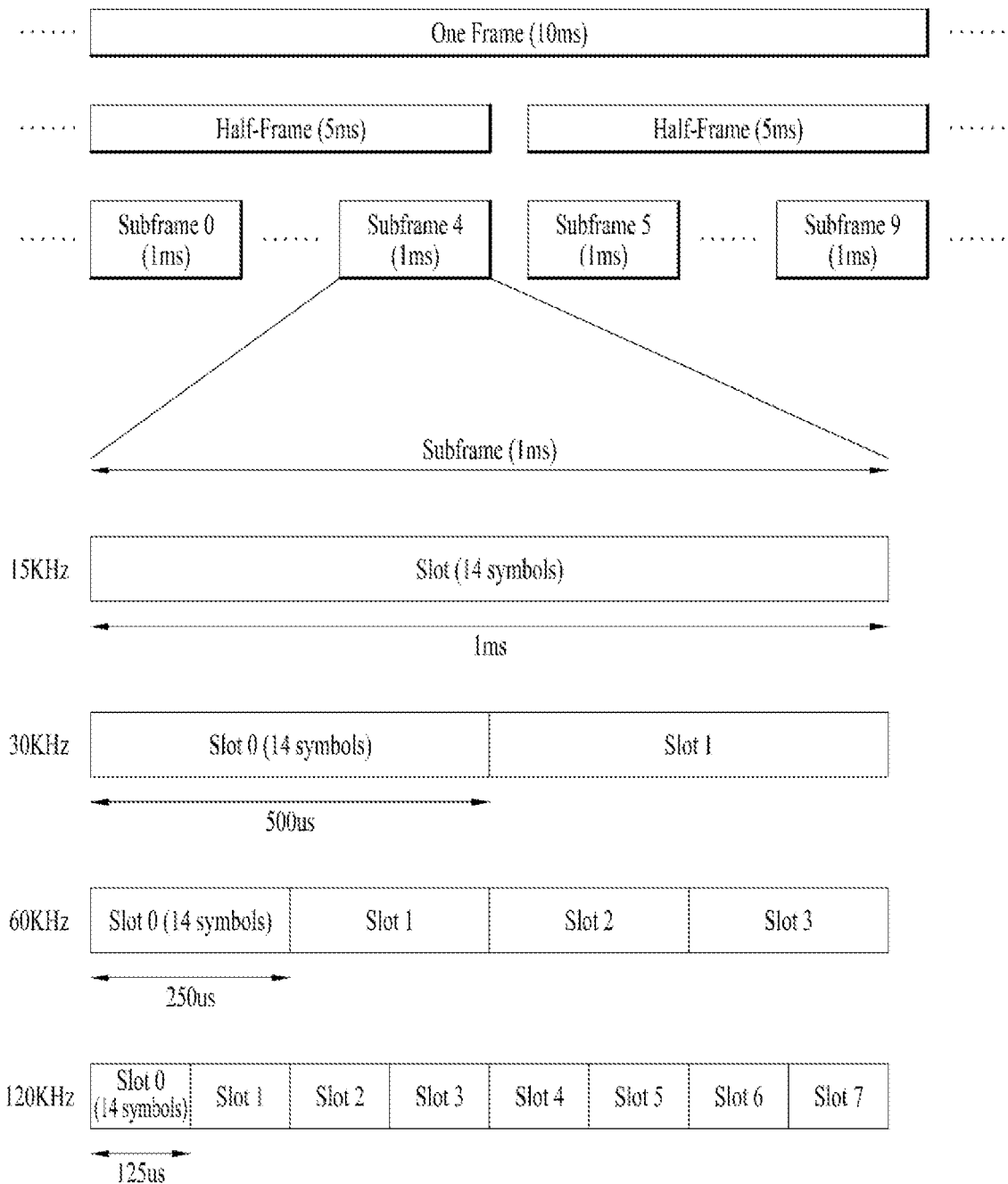
FIG. 4 illustrates an example of a frame structure used in a 3rd generation partnership project (3GPP)-based wireless communication system.

FIG. 4 illustrates an example of a frame structure used in a 3GPP-based wireless communication system.

The frame structure of FIG. 4 is purely exemplary and the number of subframes, the number of slots, and the number of symbols, in a frame, may be variously changed. In an NR system, different OFDM numerologies (e.g., subcarrier spacings (SCSs)) may be configured for multiple cells which are aggregated for one UE. Accordingly, the (absolute time) duration of a time resource including the same number of symbols (e.g., a subframe, a slot, or a transmission time interval (TTI)) may be differently configured for the aggregated cells. Here, the symbol may include an OFDM symbol (or cyclic prefix-OFDM (CP-OFDM) symbol) and an SC-FDMA symbol (or discrete Fourier transform-spread-OFDM (DFT-s-OFDM) symbol). In the present disclosure, the symbol, the OFDM-based symbol, the OFDM symbol, the CP-OFDM symbol, and the DFT-s-OFDM symbol are used interchangeably.

Referring to FIG. 4, in the NR system, UL and DL transmissions are organized into frames. Each half-frame includes 5 subframes and a duration $T_{sf}$ of a single subframe is 1 ms. Subframes are further divided into slots and the number of slots in a subframe depends on a subcarrier spacing. Each slot includes 14 or 12 OFDM symbols based on a cyclic prefix. In a normal CP, each slot includes 14 OFDM symbols and, in an extended CP, each slot includes 12 OFDM symbols. The numerology depends on an exponentially scalable subcarrier spacing $\Delta f = 2^u * 15$ kHz. The table below shows the number of OFDM symbols ($N^{slot}_{symb}$) per slot, the number of slots ($N^{frame,u}_{slot}$) per frame, and the number of slots ($N^{subframe,u}_{slot}$) per subframe.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The table below shows the number of OFDM symbols per slot, the number of slots per frame, and the number of slots per subframe, according to the subcarrier spacing $\Delta f = 2^u * 15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

In some scenarios, a 14-symbol TTI may be defined as one or more slots according to a subcarrier spacing (SCS) as follows.

For SCS=7.5 kHz or 15 kHz, 14-symbol TTI #i is defined as two 0.5 ms slots #2i and #2i+1 (where i=0 to 9).

For SCS=1.25 kHz, 14-symbol TTI #i is defined as one 1 ms slot #2i.

For SCS=15 kHz, 14-symbol TTI #i may be defined as 6 subslots as shown in Table A1.

Table 3 shows a subslot configuration in a TTI (normal CP).

TABLE 3

| Subslot number | 0 | 1 | 2 | 3 | 4 | 5 |
|---|---|---|---|---|---|---|
| Slot number | 2i | | | 2i + 1 | | |
| Uplink subslot pattern (Symbol number) | 0, 1, 2 | 3, 4 | 5, 6 | 0, 1 | 2, 3 | 4, 5, 6 |
| Downlink subslot pattern 1 (Symbol number) | 0, 1, 2 | 3, 4 | 5, 6 | 0, 1 | 2, 3 | 4, 5, 6 |
| Downlink subslot pattern 2 (Symbol number) | 0, 1 | 2, 3, 4 | 5, 6 | 0, 1 | 2, 3 | 4, 5, 6 |

Figure 5:
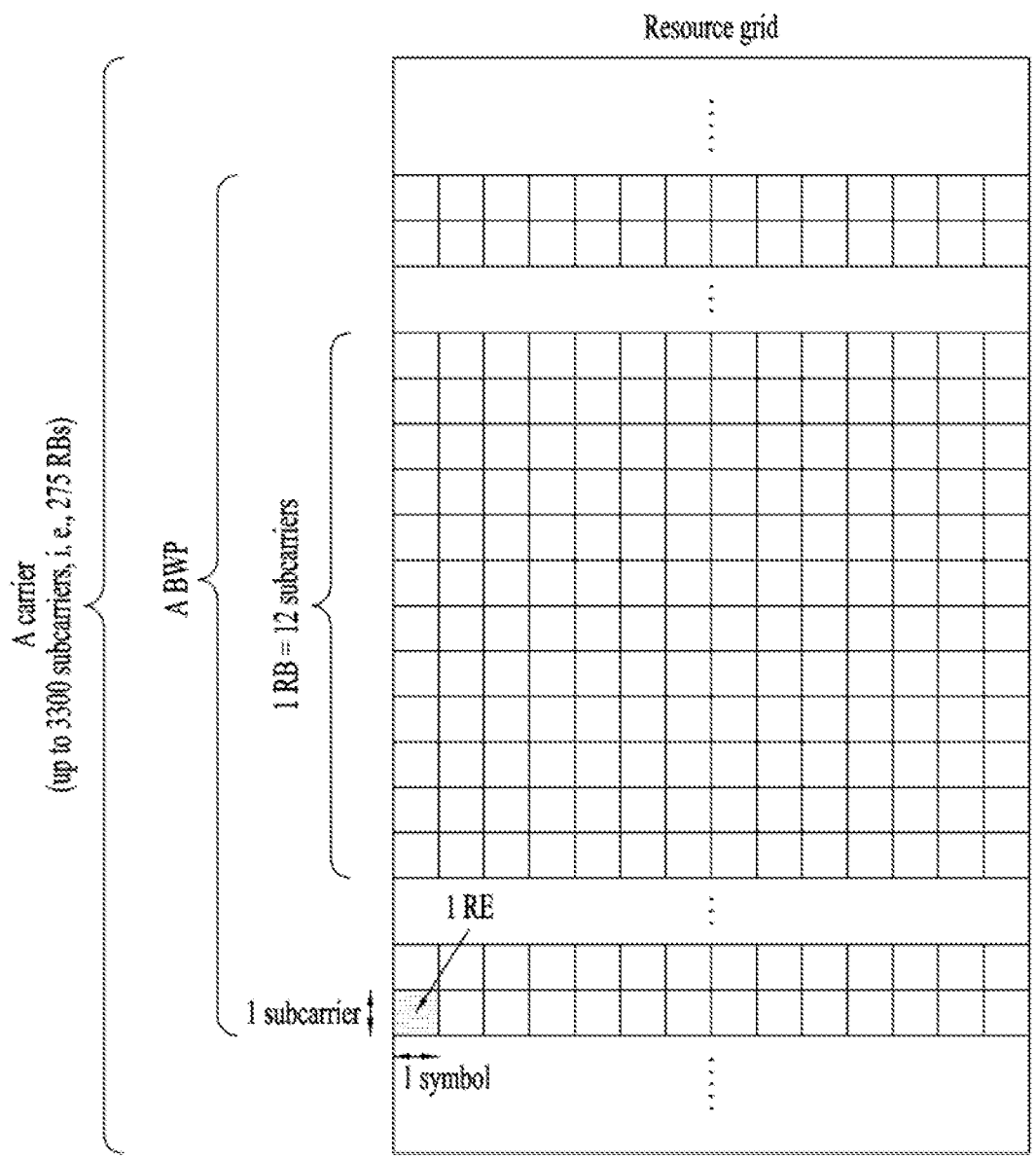
FIG. 5 illustrates a resource grid of a slot.

FIG. 5 illustrates a resource grid of a slot. The slot includes multiple (e.g., 14 or 12) symbols in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at a common resource block (CRB) $N^{start,u}_{grid}$ indicated by higher layer signaling (e.g. RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP-based wireless communication system, $N^{RB}_{sc}$ is typically 12. There is one resource grid for a given antenna port p, a subcarrier spacing configuration u, and a transmission link (DL or UL). The carrier bandwidth $N^{size,u}_{grid}$ for the subcarrier spacing configuration u is given to the UE by a higher layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index/representing a symbol location relative to a reference point in the time domain. In the NR system, an RB is defined by 12 consecutive subcarriers in the frequency domain. In the NR system, RBs are classified into CRBs and physical resource blocks (PRBs). The CRBs are numbered from 0 upwards in the frequency domain for the subcarrier spacing configuration u. The center of subcarrier 0 of CRB 0 for the subcarrier spacing configuration u is equal to 'Point A' which serves as a common reference point for RB grids. The PRBs are defined within a bandwidth part (BWP) and numbered from 0 to $N^{size}_{BWP,i}-1$, where i is a number of the BWP. The relation between a PRB $n_{PRB}$ in a BWP i and a CRB $n_{CRB}$ is given by: $n_{PRB}=n_{CRB}+N^{size}_{BWP,i}$, where $N^{size}_{BWP,i}$ is a CRB in which the BWP starts relative to CRB 0. The BWP includes a plurality of consecutive RBs in the frequency domain. A carrier may include a maximum of N (e.g., 5) BWPs. The UE may be configured to have one or more BWPs on a given component carrier. Data communication is performed through an activated BWP and only a predetermined number of BWPs (e.g., one BWP) among BWPs configured for the UE may be active on the component carrier.

Figure 6:
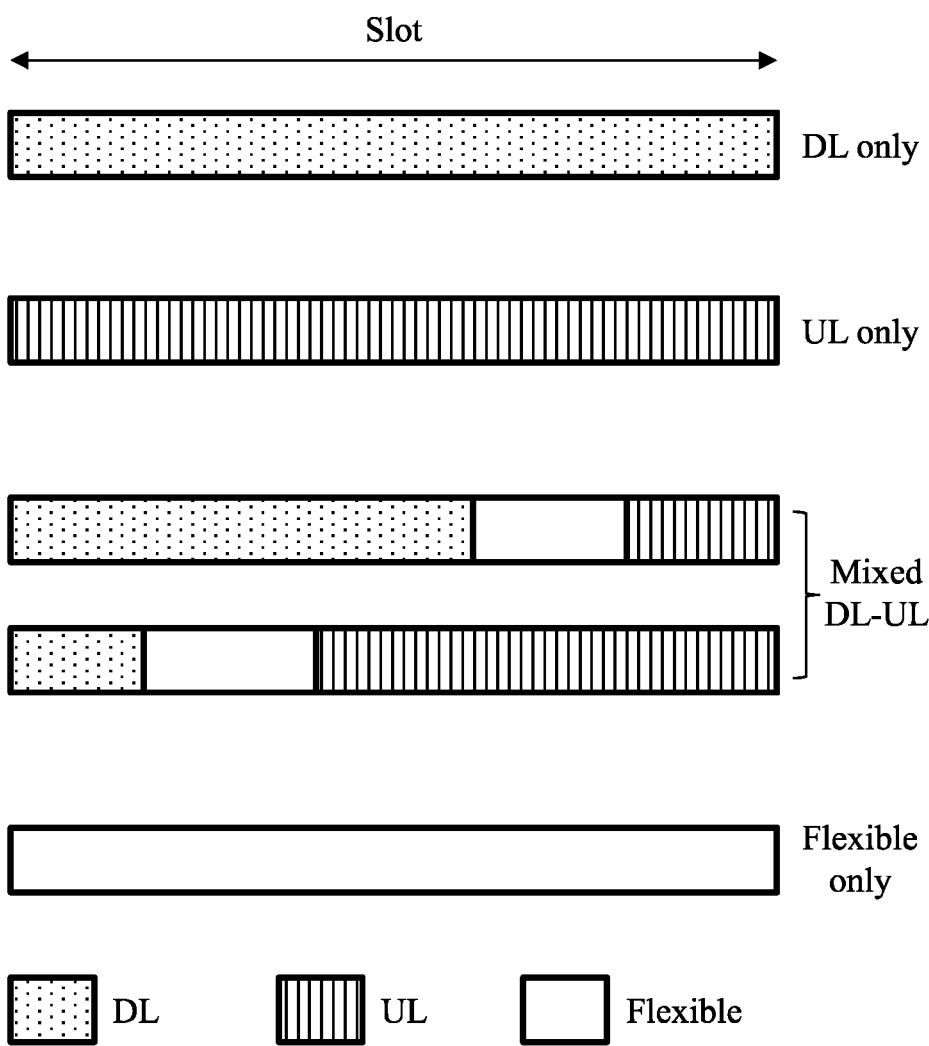
FIG. 6 illustrates slot structures available in a 3GPP based system.

FIG. 6 is a diagram illustrating exemplary slot structures which may be used in the 3GPP-based system. In the 3GPP-based system, for example, the NR system, each slot may have a self-contained structure with i) a DL control channel, ii) DL or UL data, and/or iii) a UL control channel. For example, the first N symbols of a slot may be used to deliver a DL control channel (hereinafter, referred to as a DL control region), and the last M symbols of the slot may be used to deliver a UL control channel (hereinafter, referred to as a UL control region). Each of N and M is 0 or a positive integer. A resource region (hereinafter, referred to as a data region) between the DL control region and the UL control region may be used to deliver DL data or UL data. The symbols of a single slot may be divided into group(s) of consecutive symbols available as DL symbols, UL symbols, or flexible symbols. Hereinbelow, information specifying the usages of symbols in a slot is referred to as a slot format. For example, a slot format may define which symbols are to be used for UL and which symbols are to be used for DL.

When a serving cell is to be operated in a TDD mode, the BS may configure a UL and DL allocation pattern for the serving cell by higher-layer signaling (e.g., RRC signaling). For example, the following parameters may be used to configure a TDD DL-UL pattern:

- dl-UL-TransmissionPeriodicity indicating the periodicity of a DL-UL pattern;
- nrofDownlinkSlots indicating the number of consecutive full DL slots at the beginning of each DL-UL pattern, where a full DL slot is a slot including DL symbols only;
- nrofDownlinkSymbols indicating the number consecutive DL symbols at the beginning of the slot following the last full DL slot;
- nrojUplinkSlots indicating the number of consecutive full UL slots at the end of each DL-UL pattern, where a full UL slot is a slot including UL symbols only; and
- nrofUplinkSymbols indicating the number of consecutive UL symbols at the end of the slot preceding the first full UL slot.

The remaining symbols configured neither as DL nor as UL among the symbols of the DL-UL pattern are flexible symbols.

Upon receipt of a configuration for a TDD DL-UL pattern, that is, a TDD UL-DL configuration (e.g., tdd-UL-DL-ConfigurationCommon or tdd-UL-DLConfigurationDedicated) by higher-layer signaling, the UE sets a slot format for each slot across the slots.

Although various combinations may be produced out of DL symbols, UL symbols, and flexible symbols, a specific number of combinations may be predefined as slot formats, and the predefined slot formats may be identified by slot format indexes. The following table lists some of the predefined slot formats. In the table, D denotes DL symbol, U denotes UL symbol, and F denotes flexible symbol.

TABLE 4

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| ... | | | | | | | | | | | | | | |

To indicate which one of the predefined slot formats to be used for a specific slot, the BS may configure a set of slot format combinations available for each serving cell in a set of serving cells by higher-layer signaling (e.g., RRC signaling), and configure the UE to monitor a group-common PDCCH for slot format indicator(s) (SFI(s)) by higher-layer signaling (e.g., RRC signaling). DCI carried on the group-common PDCCH for the SFI(s) is referred to as SFI DCI. DCI format 2_0 is used for the SFI DCI. For example, for each serving cell in a set of serving cells, the BS may provide the UE with the (starting) position of a slot format combination ID (i.e., SFI-index) for the serving cell, a set of slot format combinations applicable to the serving cell, and a reference SCS configuration for each slot format in a slot format combination indicated by an SFI-index value in the SFI DCI. For each slot format combination in the set of slot format combinations, one or more slot formats are configured and a slot format combination ID (i.e., SFI-index) is assigned. For example, when the BS is to configure a slot format combination with N slot formats, the BS may indicate N ones of slot format indexes for the predefined slot formats (e.g., refer to Table 4) for the slot format combination. To configure the UE to monitor the group-common PDCCH for SFIs, the BS indicates an RNTI used for SFIs, SFI-RNTI and the total length of DCI payload scrambled with the SFI-RNTI to the UE. Upon detection of a PDCCH based on the SFI-RNTI, the UE may determine slot format(s) for a corresponding serving cell from an SFI-index for the serving cell among SFI-indexes in DCI payload of the PDCCH.

Symbols indicated as flexible by a TDD DL-UL pattern configuration may be indicated as UL, DL, or flexible by SFI DCI. Symbols indicated as DL/UL by the TDD DL-UL pattern configuration are not overridden as UL/DL or flexible by the SFI DCI.

When the UE is not configured with a TDD DL-UL pattern, the UE determines for each slot whether the slot is for UL or DL, and symbols allocation in the slot based on SFI DCI and/or DCI that schedules or triggers a DL or UL signal transmission (e.g., DCI format 1_0, DCI format 1_1, DCI format 1_2, DCI format 0_0, DCI format 0_1, DCI format 0_2, and DCI format 2_3).

The UE for which carrier aggregation is configured may be configured to use one or more cells. If the UE is configured with a plurality of serving cells, the UE may be configured with one or multiple cell groups. The UE may also be configured with a plurality of cell groups associated with different BSs. Alternatively, the UE may be configured with a plurality of cell groups associated with a single BS. Each cell group of the UE includes one or more serving cells and includes a single PUCCH cell for which PUCCH resources are configured. The PUCCH cell may be a Pcell or an Scell configured as the PUCCH cell among Scells of a corresponding cell group. Each serving cell of the UE belongs to one of cell groups of the UE and does not belong to a plurality of cells.

NR frequency bands are defined as two types of frequency ranges, FR1 and FR2, and FR2 is also referred to as a millimeter wave (mmW). The following table below shows frequency ranges in which NR is operable.

TABLE 5

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Hereinafter, physical channels that may be used in the 3GPP-based wireless communication system will be described in detail.

A PDCCH carries DCI. For example, the PDCCH (i.e., DCI) carries information about transport format and resource allocation of a downlink shared channel (DL-SCH), information about resource allocation of an uplink shared channel (UL-SCH), paging information about a paging channel (PCH), system information about the DL-SCH, information about resource allocation for a control message, such as a random access response (RAR) transmitted on a PDSCH, of a layer (hereinafter, higher layer) positioned higher than a physical layer among protocol stacks of the UE/BS, a transmit power control command, information about activation/release of configured scheduling (CS), etc. DCI including resource allocation information about the DL-SCH is referred to as PDSCH scheduling DCI, and DCI including resource allocation information about the UL-SCH is referred to as PUSCH scheduling DCI. The DCI includes a cyclic redundancy check (CRC). The CRC is masked/scrambled with various identifiers (e.g., radio network temporary identifier (RNTI)) according to an owner or usage of the PDCCH. For example, if the PDCCH is for a specific UE, the CRS is masked with a UE identifier (e.g., cell-RNTI (C-RNTI)). If the PDCCH is for a paging message, the CRC is masked with a paging RNTI (P-RNTI). If the PDCCH is for system information (e.g., system information block (SIB)), the CRC is masked with a system information RNTI (SI-RNTI). If the PDCCH is for a random access response, the CRC is masked with a random access-RNTI (RA-RNTI).

If a PDCCH on a serving cell schedules a PDSCH or PUSCH of another serving cell, this is referred to as cross-carrier scheduling. Cross-carrier scheduling using a carrier indicator field (CIF) may permit a PDCCH of a serving cell to schedule resources on another serving cell. On the other hand, if a PDSCH on a serving cell schedules a PDSCH or PUSCH of the serving cell, this is referred to as self-carrier scheduling. If cross-carrier scheduling is used on a cell, the BS may provide information about a cell for scheduling the cell on which cross-carrier scheduling is used to the UE. For example, the BS may provide the UE with information as to whether a serving cell is scheduled by a PDCCH on another (scheduling) cell or by the serving cell, or which cell signals DL assignments and UL assignments for the serving cell when the serving cell is scheduled by another (scheduling) cell. In the present disclosure, a cell carrying a PDCCH is referred to as a scheduling cell, and a cell on which PUSCH or PDSCH transmission is scheduled by DCI included in the PDCCH, i.e., a cell carrying a PUSCH or a PDSCH scheduled by the PDCCH, is referred to as a scheduled cell.

A PDCCH is transmitted through a control resource set (CORESET). One or more CORESETs may be configured for the UE. The CORESET consists of a set of PRBs with a duration of 1 to 3 OFDM symbols. The PRBs and a CORESET duration that constitute the CORESET may be provided to the UE through higher layer (e.g., RRC) signaling. A set of PDCCH candidates in the configured CORESET(s) is monitored according to corresponding search space sets. In the present disclosure, monitoring implies decoding (called blind decoding) each PDCCH candidate according to monitored DCI formats. A master information block (MIB) on a PBCH provides the UE with parameters (e.g., CORESET #0) for monitoring a PDCCH for scheduling a PDSCH carrying system information block 1 (SIB1). The PBCH may indicate that there is no associated SIB1. In this case, the UE is informed of not only a frequency range within which it may be assumed that there is no SSB associated with SSB1 but also another frequency range within which the SSB associated with SIB1 is to be discovered. CORESET #0, which is a CORESET for scheduling at least SIB1, may be configured through either the MIB or dedicated RRC signaling.

The set of the PDCCH candidates that the UE monitors is defined in terms of PDCCH search space sets. The search space sets may be common search space (CSS) sets or UE-specific search space (USS) sets. Each CORESET configuration is associated with one or more search space sets and each search space set is associated with one CORESET configuration. The search space set is determined based on the following parameters provided by the BS to the UE.

controlResourceSetId: Indicator for identifying a CORESET associated with the search space set;

monitoringSlotPeriodicityAndOffset: A PDCCH monitoring periodicity and a PDCCH monitoring offset, for configuring slots for PDCCH monitoring.

duration: The number of consecutive slots that the search space lasts in every occasion, i.e., upon every period as given in monitoringSlotPeriodicityAndOffset.

monitoringSymbolsWithinSlot: A PDCCH monitoring pattern in a slot, indicating the first symbol(s) of the CORESET in a slot for PDCCH monitoring.

nrofCandidates: The number of PDCCH candidates per CCE aggregation level.

The UE monitors PDCCH candidates only in PDCCH monitoring occasions. The UE determines the PDCCH monitoring occasions from a PDCCH monitoring periodicity, a PDCCH monitoring offset, and a PDCCH monitoring pattern in a slot. Parameter monitoringSymbolsWithinSlot indicates, for example, the first symbol(s) for PDCCH monitoring in slots configured for PDCCH monitoring (e.g., refer to parameters monitoringSlotPeriodicityAndOffset and duration). For example, if monitoringSymbolsWithinSlot is 14 bit, the bit of monitoringSymbolsWithinSlot may represent 14 OFDM symbols of a slot, respectively, such that the most significant (left) bit represents the first OFDM symbol in the slot and the second most significant (left) bit represents the second OFDM symbol in the slot. For example, bit(s) set to 1 among the bit in monitoringSymbolsWithinSlot identify the first symbol(s) of the CORESET in the slot.

The following table shows search space sets, related RNTIs, and use cases.

TABLE 6

| Search Space Set | RNTI | Use Case |
| --- | --- | --- |
| Type0-PDCCH CSS set | SI-RNTI on a primary cell | SIB Decoding |
| Type0A-PDCCH CSS set | SI-RNTI on a primary cell | SIB Decoding |
| Type1-PDCCH CSS set | RA-RNTI or TC-RNTI on a primary cell | Msg2, Msg4 decoding in RACH |
| Type2-PDCCH CSS set | P-RNTI on a primary cell | Paging Decoding |
| Type3-PDCCH CSS set | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| USS set | C-RNTI, or MCS-C-RNTI, or CS-RNTI(s) | User specific PDSCH decoding |

The following table shows DCI formats which are capable of being carried by a PDCCH.

TABLE 7

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbols(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a transport block (TB)-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. In the case of a CSS, DCI format 0_0 and DCI format 1_0 have a fixed size after a BWP size is initially given by RRC. In the case of a USS, in DCI format 0_0 and DCI format 1_0, the sizes of fields except for the size of a frequency domain resource assignment (FDRA) field has a fixed size, whereas the size of the FDRA field may be changed through a related parameter configuration by the BS. In DCI format 0_1 and DCI format 1_1, the sizes of DCI fields may be changed through various RRC reconfigurations by the BS. DCI format 2_0 may be used to transfer dynamic slot format information (e.g., SFI DCI) to the UE, and DCI format 2_1 may be used to transfer DL pre-emption information to the UE.

A PDSCH is a physical layer UL channel for UL data transport. The PDSCH carries DL data (e.g., DL-SCH transport block) and is subjected to modulation such as quadrature phase shift keying (QPSK), 16 quadrature amplitude modulation (QAM), 64 QAM, 256 QAM, etc. A codeword is generated by encoding a transport block (TB). The PDSCH may carry a maximum of two codewords. Scrambling and modulation mapping per codeword may be performed and modulation symbols generated from each codeword may be mapped to one or more layers. Each layer is mapped to a radio resource together with a DMRS and generated as an OFDM symbol signal. Then, the OFDM symbol signal is transmitted through a corresponding antenna port.

A PUCCH means a physical layer UL channel for UCI transmission. The PUCCH carries UCI. The UCI includes the following information.

Scheduling request (SR): Information that is used to request a UL-SCH resource.

Hybrid automatic repeat request (HARQ)-acknowledgment (ACK): A response to a DL data packet (e.g., codeword) on the PDSCH. HARQ-ACK indicates whether the DL data packet has been successfully received by a communication device. In response to a single codeword, 1-bit HARQ-ACK may be transmitted. In response to two codewords, 2-bit HARQ-ACK may be transmitted. The HARQ-ACK response includes positive ACK (simply, ACK), negative ACK (NACK), discontinuous transmission (DTX), or NACK/DTX. Here, the term HARQ-ACK is used interchangeably with HARQ ACK/NACK, ACK/NACK, or A/N.

Channel state information (CSI): Feedback information about a DL channel. The CSI may include channel quality information (CQI), a rank indicator (RI), a precoding matrix indicator (PMI), a CSI-RS resource indicator (CSI), an SS/PBCH resource block indicator (SSBRI), and a layer indicator (L1). The CSI may be classified into CSI part 1 and CSI part 2 according to UCI type included in the CSI. For example, the CRI, RI, and/or the CQI for the first codeword may be included in CSI part 1, and LI, PMI, and/or the CQI for the second codeword may be included in CSI part 2.

In the present disclosure, for convenience, PUCCH resources configured/indicated for/to the UE by the BS for HARQ-ACK, SR, and CSI transmission are referred to as a HARQ-ACK PUCCH resource, an SR PUCCH resource, and a CSI PUCCH resource, respectively.

PUCCH formats may be defined as follows according to UCI payload sizes and/or transmission lengths (e.g., the number of symbols included in PUCCH resources). In regard to the PUCCH formats, reference may also be made to Table 8.

(0) PUCCH Format 0 (PF0 or F0)

Supported UCI payload size: up to K bit (e.g., K=2)

Number of OFDM symbols constituting a single PUCCH: 1 to X symbols (e.g., X=2)

Transmission structure: Only a UCI signal without a DMRS is included in PUCCH format 0. The UE transmits a UCI state by selecting and transmitting one of a plurality of sequences. For example, the UE transmits specific UCI to the BS by transmitting one of a plurality of sequences through a PUCCH, which is PUCCH format 0. The UE transmits the PUCCH, which is PUCCH format 0, in PUCCH resources for a corresponding SR configuration only upon transmitting a positive SR.

Configuration for PUCCH format 0 includes the following parameters for a corresponding PUCCH resource: an index for initial cyclic shift, the number of symbols for PUCCH transmission, and/or the first symbol for PUCCH transmission.

(1) PUCCH Format 1 (PF1 or F1)

Supported UCI payload size: up to K bit (e.g., K=2)

Number of OFDM symbols constituting a single PUCCH: Y to Z symbols (e.g., Y=4 and Z=14)

Transmission structure: The DMRS and UCI are configured/mapped in TDM in/to different OFDM symbols. In other words, the DMRS is transmitted in symbols in which modulation symbols are not transmitted and the UCI is represented as the product between a specific sequence (e.g., orthogonal cover code (OCC)) and a modulation (e.g., QPSK) symbol. Code division multiplexing (CDM) is supported between a plurality of PUCCH resources (conforming to PUCCH format 1) (within the same RB) by applying cyclic shifts (CSs)/OCCs to both the UCI and the DMRS. PUCCH format 1 carries the UCI of up to 2 bit and the modulation symbols are spread by the OCC (differently configured depending on whether frequency hopping is performed) in the time domain.

Configuration for PUCCH format 1 includes the following parameters for a corresponding PUCCH resource: an index for initial cyclic shift, the number of symbols for PUCCH transmission, the first symbol for PUCCH transmission, and/or an index for the OCC.

(2) PUCCH Format 2 (PF2 or F2)

Supported UCI payload size: more than K bit (e.g., K=2)

Number of OFDM symbols constituting a single PUCCH: 1 to X symbols (e.g., X=2)

Transmission structure: The DMRS and UCI are configured/mapped using frequency division multiplexing (FDM) within the same symbol. The UE transmits the UCI by applying only IFFT without DFT to encoded UCI bit. PUCCH format 2 carries UCI of a larger bit size than K bit and modulation symbols are subjected to FDM with the DMRS, for transmission. For example, the DMRS is located in symbol indexes #1, #4, #7, and #10 within a given RB with the density of ⅓. A pseudo noise (PN) sequence is used for a DMRS sequence. Frequency hopping may be activated for 2-symbol PUCCH format 2.

Configuration for PUCCH format 2 includes the following parameters for a corresponding PUCCH resource: the number of PRBs, the number of symbols for PUCCH transmission, and/or the first symbol for PUCCH transmission.

(3) PUCCH Format 3 (PF3 or F3)

Supported UCI payload size: more than K bit (e.g., K=2)

Number of OFDM symbols constituting a single PUCCH: Y to Z symbols (e.g., Y=4 and Z=14)

Transmission structure: The DMRS and UCI are configured/mapped in TDM for/to different OFDM symbols. The UE transmits the UCI by applying DFT to encoded UCI bit. PUCCH format 3 does not support UE multiplexing for the same time-frequency resource (e.g., same PRB).

Configuration for PUCCH format 3 includes the following parameters for a corresponding PUCCH resource: the number of PRBs, the number of symbols for PUCCH transmission, and/or the first symbol for PUCCH transmission.

(4) PUCCH Format 4 (PF4 or F4)

Supported UCI payload size: more than K bit (e.g., K=2)

Number of OFDM symbols constituting a single PUCCH: Y to Z symbols (e.g., Y=4 and Z=14)

Transmission structure: The DMRS and UCI are configured/mapped in TDM for/to different OFDM symbols. PUCCH format 4 may multiplex up to 4 UEs in the same PRB, by applying an OCC at the front end of DFT and applying a CS (or interleaved FDM (IFDM) mapping) to the DMRS. In other words, modulation symbols of the UCI are subjected to TDM with the DMRS, for transmission.

Configuration for PUCCH format 4 includes the following parameters for a corresponding PUCCH resource: the number of symbols for PUCCH transmission, length for the OCC, an index for the OCC, and the first symbol for PUCCH transmission.

The table below shows the PUCCH formats. The PUCCH formats may be divided into short PUCCH formats (formats 0 and 2) and long PUCCH formats (formats 1, 3, and 4) according to PUCCH transmission length.

TABLE 8

| PUCCH format | Length in OFDM symbols $N^{PUCCH}_{symb}$ | Number of bits | Usage | Etc. |
|---|---|---|---|---|
| 0 | 1-2 | =<2 | HARQ, SR | Sequence selection |
| 1 | 4-14 | =<2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM(no UE multiplexing) |
| 4 | 4-14 | >2 | HARQ, CSI, [SR] | DFT-s-OFDM(Pre DFT OCC) |

A PUCCH resource may be determined according to a UCI type (e.g., A/N, SR, or CSI). A PUCCH resource used for UCI transmission may be determined based on a UCI (payload) size. For example, the BS may configure a plurality of PUCCH resource sets for the UE, and the UE may select a specific PUCCH resource set corresponding to a specific range according to the range of the UCI (payload) size (e.g., numbers of UCI bit). For example, the UE may select one of the following PUCCH resource sets according to the number of UCI bit, $N_{UCI}$:—PUCCH resource set #0, if the number of UCI bit=<2

PUCCH resource set #1, if 2<the number of UCI bit=<$N_1$

. . .

PUCCH resource set #(K−1), if $N_{K-2}$<the number of UCI bit=<$N_{K-1}$

Here, K represents the number of PUCCH resource sets (K>1) and $N_i$ represents a maximum number of UCI bit supported by PUCCH resource set #i. For example, PUCCH resource set #1 may include resources of PUCCH formats 0 to 1, and the other PUCCH resource sets may include resources of PUCCH formats 2 to 4 (see Table 8).

Configuration for each PUCCH resource includes a PUCCH resource index, a start PRB index, and configuration for one of PUCCH format 0 to PUCCH format 4. The UE is configured with a code rate for multiplexing HARQ-ACK, SR, and CSI report(s) within PUCCH transmission using PUCCH format 2, PUCCH format 3, or PUCCH format 4, by the BS through a higher layer parameter maxCodeRate. The higher layer parameter maxCodeRate is used to determine how to feed back the UCI on PUCCH resources for PUCCH format 2, 3, or 4.

If the UCI type is SR and CSI, a PUCCH resource to be used for UCI transmission in a PUCCH resource set may be configured for the UE through higher layer signaling (e.g., RRC signaling). If the UCI type is HARQ-ACK for a semi-persistent scheduling (SPS) PDSCH, the PUCCH resource to be used for UCI transmission in the PUCCH resource set may be configured for the UE through higher layer signaling (e.g., RRC signaling). On the other hand, if the UCI type is HARQ-ACK for a PDSCH scheduled by DCI, the PUCCH resource to be used for UCI transmission in the PUCCH resource set may be scheduled by the DCI.

In the case of DCI-based PUCCH resource scheduling, the BS may transmit the DCI to the UE on a PDCCH and indicate a PUCCH resource to be used for UCI transmission in a specific PUCCH resource set by an ACK/NACK resource indicator (ARI) in the DCI. The ARI may be used to indicate a PUCCH resource for ACK/NACK transmission and also be referred to as a PUCCH resource indicator (PRI). Here, the DCI may be used for PDSCH scheduling and the UCI may include HARQ-ACK for a PDSCH. The BS may configure a PUCCH resource set including a larger number of PUCCH resources than states representable by the ARI by (UE-specific) higher layer (e.g., RRC) signaling for the UE. The ARI may indicate a PUCCH resource subset of the PUCCH resource set and which PUCCH resource in the indicated PUCCH resource subset is to be used may be determined according to an implicit rule based on transmission resource information about the PDCCH (e.g., the starting CCE index of the PDCCH).

For UL-SCH data transmission, the UE should have UL resources available for the UE and, for DL-SCH data reception, the UE should have DL resources available for the UE. The UL resources and the DL resources are assigned to the UE by the BS through resource allocation. Resource allocation may include time domain resource allocation (TDRA) and frequency domain resource allocation (FDRA). In the present disclosure, UL resource allocation is also referred to as a UL grant and DL resource allocation is referred to as DL assignment. The UL grant is dynamically received by the UE on the PDCCH or in an RAR or semi-persistently configured for the UE by the BS through RRC signaling. DL assignment is dynamically received by the UE on the PDCCH or semi-persistently configured for the UE by the BS through RRC signaling.

On UL, the BS may dynamically allocate UL resources to the UE through PDCCH(s) addressed to a cell radio network temporary Identifier (C-RNTI). The UE monitors the PDCCH(s) in order to discover possible UL grant(s) for UL transmission. The BS may allocate the UL resources using a configured grant to the UE. Two types of configured grants, Type 1 and Type 2, may be used. In Type 1, the BS directly provides the configured UL grant (including periodicity) through RRC signaling. In Type 2, the BS may configure a periodicity of an RRC-configured UL grant through RRC signaling and signal, activate, or deactivate the configured UL grant through the PDCCH addressed to a configured scheduling RNTI (CS-RNTI). For example, in Type 2, the PDCCH addressed to the CS-RNTI indicates that the corresponding UL grant may be implicitly reused according to the configured periodicity through RRC signaling until deactivation.

On DL, the BS may dynamically allocate DL resources to the UE through PDCCH(s) addressed to the C-RNTI. The UE monitors the PDCCH(s) in order to discover possible DL assignments. The BS may allocate the DL resources to the UE using SPS. The BS may configure a periodicity of configured DL assignments through RRC signaling and signal, activate, or deactivate the configured DL assignment through the PDCCH addressed to the CS-RNTI. For example, the PDCCH addressed to the CS-RNTI indicates that the corresponding DL assignment may be implicitly reused according to the configured periodicity through RRC signaling until deactivation.

Hereinafter, resource allocation by the PDCCH and resource allocation by RRC will be described in more detail.
Resource Allocation by PDCCH: Dynamic Grant/Assignment The PDCCH may be used to schedule DL transmission on the PDSCH and UL transmission on the PUSCH. DCI on the PDCCH for scheduling DL transmission may include DL resource assignment that at least includes a modulation and coding format (e.g., modulation and coding scheme (MCS) index $I_{MCS}$), resource allocation, and HARQ information, associated with a DL-SCH. DCI on the PDCCH for scheduling UL transmission may include a UL scheduling grant that at least includes a modulation and coding format, resource allocation, and HARQ information, associated with a UL-SCH. The size and usage of the DCI carried by one PDCCH differs according to a DCI format. For example, DCI format 0_0, DCI format 0_1, or DCI format 0_2 may be used to schedule the PUSCH, and DCI format 1_0, DCI format 1_1, or DCI format 1_2 may be used to schedule the PDSCH. Particularly, DCI format 0_2 and DCI format 1_2 may be used to schedule transmission having higher transmission reliability and lower latency requirements than transmission reliability and latency requirement guaranteed by DCI format 0_0, DCI format 0_1, DCI format 1_0, or DCI format 1_1. Some implementations of the present disclosure may be applied to UL data transmission based on DCL format 0_2. Some implementations of the present disclosure may be applied to DL data reception based on DCI format 1_2.

Figure 7:
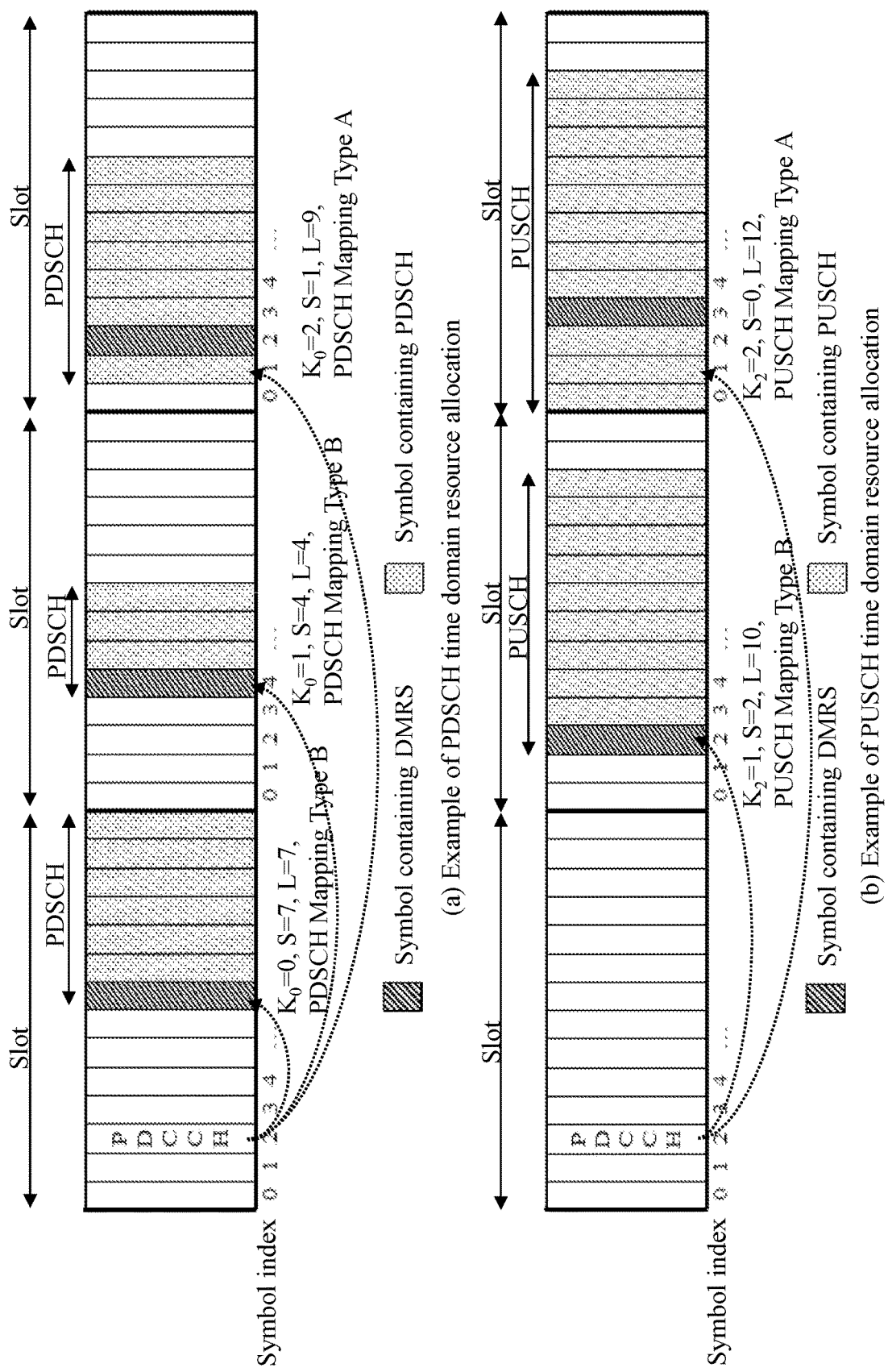
FIG. 7 illustrates an example of PDSCH time domain resource allocation (TDRA) caused by a PDCCH and an example of PUSCH TDRA caused by the PDCCH.
Figure 8:
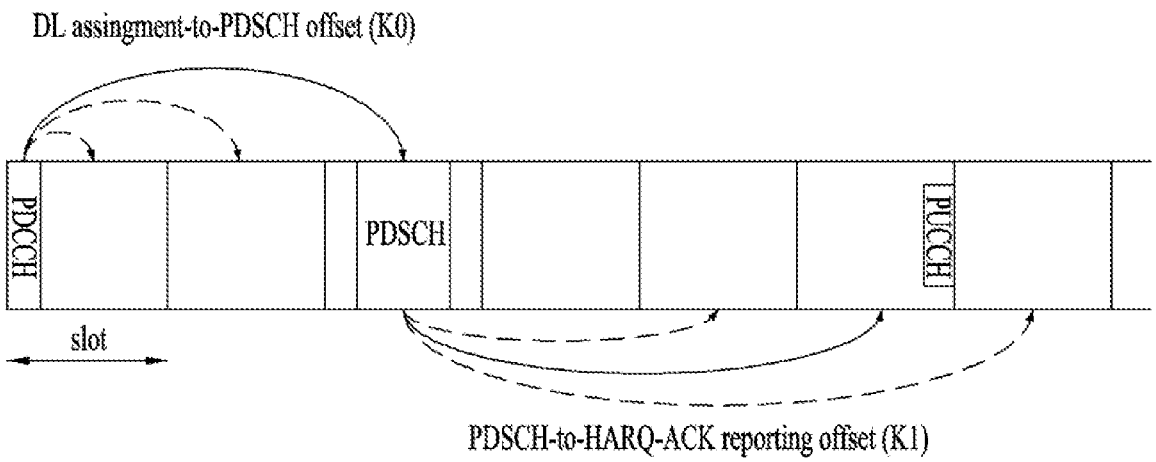
FIG. 8 illustrates a hybrid automatic repeat request-acknowledgement (HARQ-ACK) transmission/reception procedure.

FIG. 7 illustrates an example of PDSCH TDRA caused by a PDCCH and an example of PUSCH TDRA caused by the PDCCH.

DCI carried by the PDCCH in order to schedule a PDSCH or a PUSCH includes a TDRA field. The TDRA field provides a value m for a row index m+1 to an allocation table for the PDSCH or the PUSCH. Predefined default PDSCH time domain allocation is applied as the allocation table for the PDSCH, or a PDSCH TDRA table that the BS configures through RRC signaled pdsch-TimeDomainAllocationList is applied as the allocation table for the PDSCH. Predefined default PUSCH time domain allocation is applied as the allocation table for the PDSCH, or a PUSCH TDRA table that the BS configures through RRC signaled pusch-TimeDomainAllocationList is applied as the allocation table for the PUSCH. The PDSCH TDRA table to be applied and/or the PUSCH TDRA table to be applied may be determined according a fixed/predefined rule (e.g., refer to 3GPP TS 38.214).

In PDSCH time domain resource configurations, each indexed row defines a DL assignment-to-PDSCH slot offset $K_0$, a start and length indicator value SLIV (or directly, a start position (e.g., start symbol index S) and an allocation length (e.g., the number of symbols, L) of the PDSCH in a slot), and a PDSCH mapping type. In PUSCH time domain resource configurations, each indexed row defines a UL grant-to-PUSCH slot offset $K_2$, a start position (e.g., start symbol index S) and an allocation length (e.g., the number of symbols, L) of the PUSCH in a slot, and a PUSCH mapping type. $K_0$ for the PDSCH and $K_2$ for the PUSCH indicate the difference between the slot with the PDCCH and the slot with the PDSCH or PUSCH corresponding to the PDCCH. SLIV denotes a joint indicator of the start symbol S relative to the start of the slot with the PDSCH or PUSCH and the number of consecutive symbols, L, counting from the symbol S. The PDSCH/PUSCH mapping type includes two mapping types: one is mapping Type A and the other is mapping Type B. In PDSCH/PUSCH mapping Type A, a demodulation reference signal (DMRS) is located in the third symbol (symbol #2) or fourth symbol (symbol #3) in a slot according to RRC signaling. In PDSCH/PUSCH mapping Type B, the DMRS is located in the first symbol allocated for the PDSCH/PUSCH.

The scheduling DCI includes an FDRA field that provides assignment information about RBs used for the PDSCH or the PUSCH. For example, the FDRA field provides information about a cell for PDSCH or PUSCH transmission, information about a BWP for PDSCH or PUSCH transmission, and/or information about RBs for PDSCH or PUSCH transmission to the UE.

Resource Allocation by RRC

As mentioned above, there are two types of transmission without a dynamic grant: configured grant Type 1 and configured grant Type 2. In configured grant Type 1, a UL grant is provided by RRC signaling and stored as a configured UL grant. In configured grant Type 2, the UL grant is provided by the PDCCH and stored or cleared as the configured UL grant based on L1 signaling indicating configured UL grant activation or deactivation. Type 1 and Type 2 may be configured by RRC signaling per serving cell and per BWP. Multiple configurations may be simultaneously activated on different serving cells.

When configured grant Type 1 is configured, the UE may be provided with the following parameters through RRC signaling:
 cs-RNTI corresponding to a CS-RNTI for retransmission;
 periodicity corresponding to a periodicity of configured grant Type 1;
 timeDomainOffset indicating an offset of a resource with respect to system frame number (SFN)=0 in the time domain;
 timeDomainAllocation value m that provides a row index m+1 pointing to the allocation table, indicating a combination of the start symbol S, the length L, and the PUSCH mapping type;
 frequencyDomainAllocation that provides frequency domain resource allocation; and
 mcsAndTBS that provides/mcs indicating a modulation order, a target code rate, and a transport block size.

Upon configuration of configured grant Type 1 for a serving cell by RRC, the UE stores the UL grant provided by RRC as a configured UL grant for an indicated serving cell and initializes or re-initializes the configured UL grant to start in a symbol according to timeDomainOffset and S (derived from SLIV) and to recur with periodicity. After the UL grant is configured for configured grant Type 1, the UE may consider that the UL grant recurs in association with each symbol satisfying: [(SFN*numberOfSlotsPerFrame (numberOfSymbolsPerSlot)+(slot number in the frame*numberOfSymbolsPerSlot)+symbol number in the slot]=(timeDomainOffset*numberOfSymbolsPerSlot+S+N*periodicity) modulo (1024*numberOfSlotsPerFrame*numberOfSymbolsPerSlot), for all N>=0, where numberOfSlotsPerFrame and numberOfSymbolsPerSlot indicate the number of consecutive slots per frame and consecutive OFDM symbols per slot, respectively, (refer to Table 1 and Table 2).

For configured grant Type 2, the UE may be provided with the following parameters by the BS through RRC signaling:
 cs-RNTI corresponding to a CS-RNTI for activation, deactivation, and retransmission; and
 periodicity that provides a periodicity of configured grant Type 2.

An actual UL grant is provided to the UE by the PDCCH (addressed to the CS-RNTI). After the UL grant is configured for configured grant Type 2, the UE may consider that the UL grant recurs in association with each symbol satisfying:
[(SFN*numberOfSlotsPerFrame*numberOfSymbolsPerSlot)+ (slot number in the frame*numberOfSymbolsPerSlot)+symbol number in the slot]=[(SFN$_{start\ time}$*numberOfSlotsPerFrame*numberOfSymbolsPerSlot+ slot$_{start\ time}$*numberOfSymbolsPerSlot+symbol$_{start\ time}$)+ N*periodicity] modulo (1024*numberOfSlotsPerFrame* numberOfSymbolsPerSlot), for all N>=0, where SFN$_{start\ time}$, slot$_{start\ time}$, and symbol$_{start\ time}$ represent an SFN, a slot, and a symbol, respectively, of the first transmission opportunity of the PUSCH after the configured grant is (re-)initialized, and numberOfSlotsPerFrame and numberOfSymbolsPerSlot indicate the number of consecutive slots per frame and consecutive OFDM symbols per slot, respectively, (refer to Table 1 and Table 2).

On DL, the UE may be configured with SPS per serving cell and per BWP by RRC signaling from the BS. For DL SPS, DL assignment is provided to the UE by the PDCCH and stored or cleared based on L1 signaling indicating SPS activation or deactivation. When SPS is configured, the UE may be provided with the following parameters by the BS through RRC signaling:
 cs-RNTI corresponding to a CS-RNTI for activation, deactivation, and retransmission;
 nrofHARQ-Processes that provides the number of HARQ processes for SPS; and
 periodicity that provides a periodicity of configured DL assignment for SPS.

After DL assignment is configured for SPS, the UE may consider sequentially that N-th DL assignment occurs in a slot satisfying: (numberOfSlotsPerFrame*SFN+slot number in the frame)=[(numberOfSlotsPerFrame*SFN$_{start\ time}$+ slot$_{start\ time}$)+N*periodicity*numberOfSlotsPerFrame/10] modulo (1024*numberOfSlotsPerFrame), where SFN$_{start\ time}$ and slot$_{start\ time}$ represent an SFN and a slot, respectively, of first transmission of the PDSCH after configured DL assignment is (re-)initialized, and numberOfSlotsPerFrame and numberOfSymbolsPerSlot indicate the number of consecutive slots per frame and consecutive OFDM symbols per slot, respectively, (refer to Table 1 and Table 2).

If the CRC of a corresponding DCI format is scrambled with the CS-RNTI provided by the RRC parameter cs-RNTI, and a new data indicator field for an enabled transport block is set to 0, the UE validates, for scheduling activation or scheduling release, a DL SPS assignment PDCCH or a configured UL grant Type 2 PDCCH. Validation of the DCI format is achieved if all fields for the DCI format are set according to Table 9 and Table 10. Table 9 shows an example of special fields for DL SPS and UL grant Type 2 scheduling activation PDCCH validation, and Table 10 shows an example of special fields for DL SPS and UL grant Type 2 scheduling release PDCCH validation.

TABLE 9

|  | DCI format 0_0/0_1 | DCI format 1_0 | DCI format 1_1 |
|---|---|---|---|
| HARQ process number | set to all 0's | set to all 0's | set to all 0's |
| Redundancy version | set to '00' | set to '00' | For the enabled transport block: set to '00' |

TABLE 10

|  | DCI format 0_0 | DCI format 1_0 |
|---|---|---|
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

Actual DL assignment or UL grant for DL SPS or UL grant Type 2, and a corresponding MCS are provided by resource assignment fields (e.g., a TDRA field providing a TDRA value m, an FDRA field providing frequency RB allocation, and/or an MCS field) in the DCI format carried by a corresponding DL SPS or UL grant Type 2 scheduling activation PDCCH. If validation is achieved, the UE considers information in the DCI format as valid activation or valid release of DL SPS or configured UL grant Type 2.

FIG. 7 illustrates a HARQ-ACK transmission/reception procedure.

Referring to FIG. 7, the UE may detect a PDCCH in a slot n. Next, the UE may receive a PDSCH in a slot n+K0 according to scheduling information received through the PDCCH in the slot n and then transmit UCI through a PUCCH in a slot n+K1. In this case, the UCI includes a HARQ-ACK response for the PDSCH.

The DCI (e.g., DCI format 1_0 or DCI format 1_1) carried by the PDCCH for scheduling the PDSCH may include the following information.

FDRA: FDRA indicates an RB set allocated to the PDSCH.

TDRA: TDRA indicates a DL assignment-to-PDSCH slot offset K0, the start position (e.g., symbol index S) and length (e.g., the number of symbols, L) of the PDSCH in a slot, and the PDSCH mapping type. PDSCH mapping Type A or PDSCH mapping Type B may be indicated by TDRA. For PDSCH mapping Type A, the DMRS is located in the third symbol (symbol #2) or fourth symbol (symbol #3) in a slot. For PDSCH mapping Type B, the DMRS is allocated in the first symbol allocated for the PDSCH.

PDSCH-to-HARQ_feedback timing indicator: This indicator indicates K1.

If the PDSCH is configured to transmit a maximum of one TB, a HARQ-ACK response may consist of one bit. If the PDSCH is configured to transmit a maximum of 2 TBs, the HARQ-ACK response may consist of 2 bit when spatial bundling is not configured and one bit when spatial bundling is configured. When a HARQ-ACK transmission timing for a plurality of PDSCHs is designated as slot n+K1, UCI transmitted in slot #n+K1 includes a HARQ-ACK response for the plural PDSCHs.

In the present disclosure, a HARQ-ACK payload consisting of HARQ-ACK bit(s) for one or plural PDSCHs may be referred to as a HARQ-ACK codebook. The HARQ-ACK codebook may be categorized as a semi-static HARQ-ACK codebook and a dynamic HARQ-ACK codebook according to a HARQ-ACK payload determination scheme. In the present disclosure, the semi-static HARQ-ACK codebook is also referred to as a type-1 HARQ-ACK codebook, and the dynamic HARQ-ACK codebook is also referred to as a type-2 codebook.

In the case of the semi-static HARQ-ACK codebook, parameters related to a HARQ-ACK payload size that the UE is to report are semi-statically configured by a (UE-specific) higher layer (e.g., RRC) signal. For example, the HARQ-ACK payload size of the semi-static HARQ-ACK codebook and the (maximum) HARQ-ACK payload (size) transmitted through one PUCCH in one slot may be determined based on the number of HARQ-ACK bit corresponding to a combination (hereinafter, bundling window) of all DL carriers (i.e., DL serving cells) configured for the UE and all DL scheduling slots (or PDSCH transmission slots or PDCCH monitoring slots) in which the HARQ-ACK transmission timing may be indicated. That is, in a semi-static HARQ-ACK codebook scheme, the size of the HARQ-ACK codebook is fixed (to a maximum value) regardless of the number of actually scheduled DL data. For example, DL grant DCI (PDCCH) includes PDSCH-to-HARQ-ACK timing information, and the PDSCH-to-HARQ-ACK timing information may have one (e.g., k) of a plurality of values. For example, when the PDSCH is received in slot #m and the PDSCH-to-HARQ-ACK timing information in the DL grant DCI (PDCCH) for scheduling the PDSCH indicates k, HARQ-ACK information for the PDSCH may be transmitted in slot #(m+k). As an example, k∈{1, 2, 3, 4, 5, 6, 7, 8}. When the HARQ-ACK information is transmitted in slot #n, the HARQ-ACK information may include possible maximum HARQ-ACK based on the bundling window. That is, HARQ-ACK information of slot #n may include HARQ-ACK corresponding to slot #(n−k). For example, when k∈{1, 2, 3, 4, 5, 6, 7, 8}, the HARQ-ACK information of slot #n may include HARQ-ACK corresponding to slot #(n−8) to slot #(n−1) regardless of actual DL data reception (i.e., HARQ-ACK of a maximum number). Here, the HARQ-ACK information may be replaced with a HARQ-ACK codebook or a HARQ-ACK payload. A slot may be understood/replaced as/with a candidate occasion for DL data reception. As described in the example, the bundling window may be determined based on a PDSCH-to-HARQ-ACK timing based on a HARQ-ACK slot, and a PDSCH-to-HARQ-ACK timing set may have predefined values (e.g., {1, 2, 3, 4, 5, 6, 7, 8}) or may be configured by higher layer (RRC) signaling. In the case of the dynamic HARQ-ACK codebook, the HARQ-ACK payload size that the UE is to report may be dynamically changed by the DCI etc. In a dynamic HARQ-ACK codebook scheme, DL scheduling DCI may include a counter-DAI (i.e., c-DAI) and/or a total-DAI (i.e., t-DAI). Here, the DAI indicates a downlink assignment index and is used by the BS to inform the UE of transmitted or scheduled PDSCH(s) that are to be included in one HARQ-ACK transmission. Particularly, the c-DAI is an index indicating order between PDCCHs carrying DL scheduling DCI (hereinafter, DL scheduling PDCCHs), and t-DAI is an index indicating the total number of DL scheduling PDCCHs up to a current slot in which a PDCCH with the t-DAI is present. For example, the c-DAI represents a {CC, slot} scheduling order value calculated in a component carrier (CC)-first (or cell-first) manner and is used to designate the location of a HARQ-ACK bit in a HARQ-ACK codebook. The t-DAI represents a slot-unit scheduling accumulation value up to a slot in which a PDCCH carrying the t-DAI is present and is used to determine the size of the HARQ-ACK codebook.

In the NR system, a method of implementing a plurality of logical networks in a single physical network is considered. The logical networks need to support services with various requirements (e.g., eMBB, mMTC, URLLC, etc.). Accordingly, a physical layer of NR is designed to support a flexible transmission structure in consideration of the various service requirements. As an example, the physical layer of NR may change, if necessary, an OFDM symbol length (OFDM symbol duration) and a subcarrier spacing (SCS) (hereinafter, OFDM numerology). Transmission resources of physical channels may also be changed in a predetermined range (in units of symbols). For example, in NR, a PUCCH (resource) and a PUSCH (resource) may be configured to flexibly have a transmission length/transmission start timing within a predetermined range.

In a wireless communication system including the BS and the UE, when the UE transmits UCI on a PUCCH, a PUCCH resource may overlap with another PUCCH resource or a PUSCH resource on the time axis. For example, (1) a PUCCH (resource) and a PUCCH (resource) (for different UCI transmission) or (2) a PUCCH (resource) and a PUSCH (resource) may overlap on the time axis (in the same slot) in terms of the same UE. The UE may not support PUCCH-PUCCH simultaneous transmission or PUCCH-PUSCH simultaneous transmission (according to restrictions on UE capability or according to configuration information received from the BS). In addition, the UE may not be permitted to simultaneously transmit a plurality UL channels within a predetermined time range.

In the present disclosure, methods of handling a plurality of UL channels when the UL channels that the UE should transmit are present in a predetermined time range are described. In the present disclosure, methods of handling UCI and/or data that should have been transmitted/received on the UL channels are also described. The following terms are used in a description of examples in the present disclosure.

UCI: UCI implies control information that the UE transmits on UL. The UCI includes multiple types of control information (i.e., UCI types). For example, the UCI may include HARQ-ACK (shortly, A/N or AN), SR, and/or CSI.

UCI multiplexing: UCI multiplexing may mean an operation of transmitting different UCIs (UCI types) on a common physical UL channel (e.g., a PUCCH or PUSCH). UCI multiplexing may include multiplexing of different UCIs (UCI types). For convenience, the multiplexed UCI is referred to as MUX UCI. Further, UCI multiplexing may include an operation performed in relation to MUX UCI. For example, UCI multiplexing may include a process of determining a UL channel resource to transmit MUX UCI.

UCI/data multiplexing: UCI/data multiplexing may mean an operation of transmitting UCI and data on a common physical UL channel (e.g., PUSCH). UCI/data multiplexing may include an operation of multiplexing UCI with data. For convenience, the multiplexed UCI is referred to as MUX UCI/data. Further, UCI/data multiplexing may include an operation performed in relation to MUX UCI/data. For example, UCI/data multiplexing may include a process of determining a UL channel resource to transmit MUX UCI/data.

Slot: Slot means a basic time unit or time interval for data scheduling. A slot includes a plurality of symbols. Here, a symbol may be an OFDM-based symbol (e.g., a CP-OFDM symbol or DFT-s-OFDM symbol).

Overlapping UL channel resource(s): Overlapping UL channel resource(s) mean UL channel (e.g., PUCCH or PUSCH) resource(s) overlapping (at least partially) with each other on the time axis within a predetermined time period (e.g., slot). Overlapping UL channel resource(s) may imply UL channel resource(s) before UCI multiplexing is performed. In the present disclosure, (at least partially) overlapping UL channels on the time axis are referred to as colliding UL channels in time or in the time domain.

Figure 9:
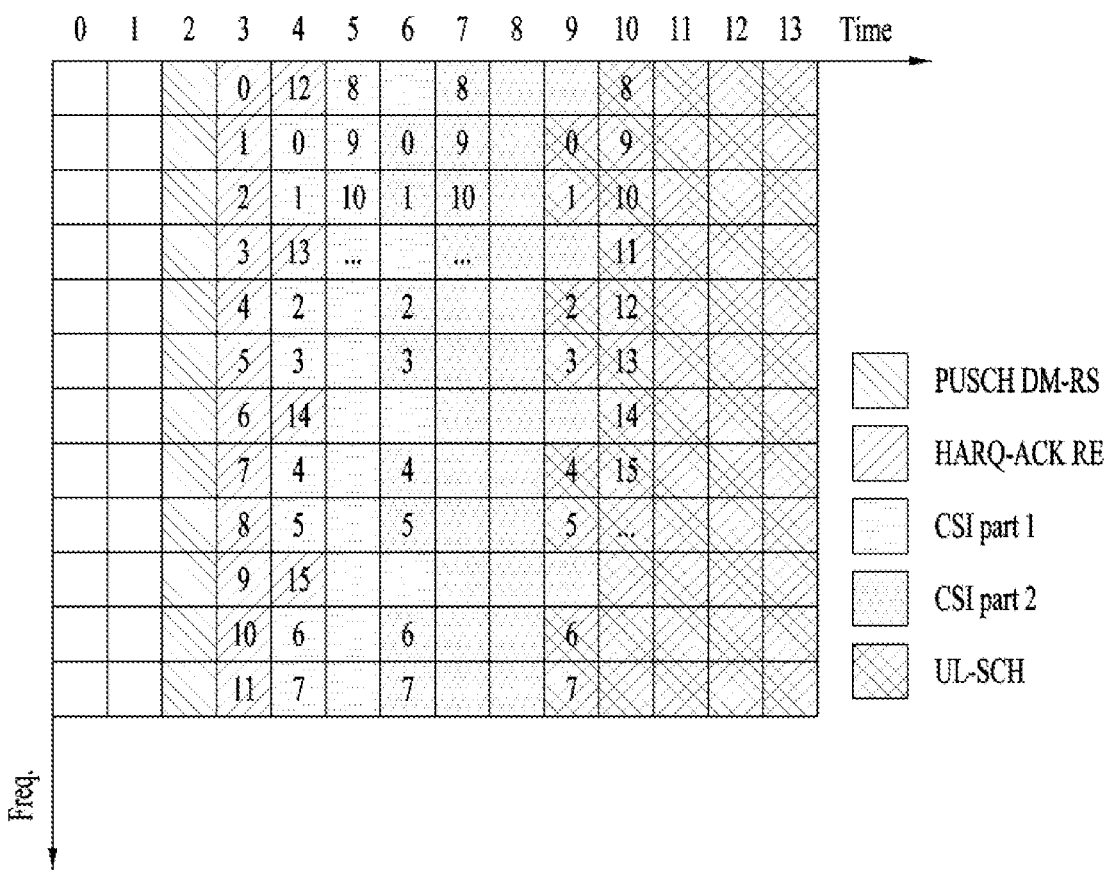
FIG. 9 illustrates an example of multiplexing uplink control information (UCI) with a PUSCH.

FIG. 9 illustrates an example of multiplexing UCI with a PUSCH. When PUCCH resource(s) and a PUSCH resource overlap in a slot and PUCCH-PUSCH simultaneous transmission is not configured, UCI may be transmitted on the PUSCH as illustrated. Transmission of the UCI on the PUSCH is referred to as UCI piggyback or PUSCH piggyback. Particularly, FIG. 9 illustrates the case in which HARQ-ACK and CSI are carried on the PUSCH resource.

When a plurality of UL channels overlaps within a predetermined time interval, a method for the UE to process the UL channels needs to be specified in order to allow the BS to correctly receive the UL channel(s). Hereinafter, methods of handling collision between UL channels will be described.

Figure 10:
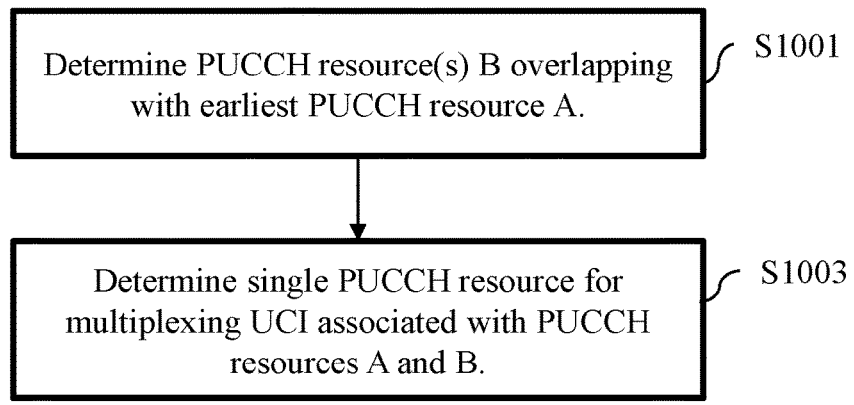
FIG. 10 illustrates an example of a process for a UE with overlapping physical uplink control channels (PUCCHs) in a single slot to handle collision between uplink (UL) channels.

FIG. 10 illustrates an example of a process for a UE with overlapping PUCCHs in a single slot to handle collision between UL channels.

To transmit UCI, the UE may determine PUCCH resources for each UCI. Each PUCCH resource may be defined by a start symbol and a transmission interval. When PUCCH resources for PUCCH transmission overlap in a single slot, the UE may perform UCI multiplexing based on a PUCCH resource with the earliest start symbol. For example, the UE may determine overlapping PUCCH resource(s) (in time) (hereinafter, PUCCH resource(s) B) based on a PUCCH resource with the earliest start symbol (hereinafter, PUCCH resource A) in a slot (S1001). The UE may apply a UCI multiplexing rule to the PUCCH resource A and the PUCCH resource(s) B. For example, based on UCI A of the PUCCH resource A and UCI B of the PUCCH resource(s) B, MUX UCI including all or part of the UCI A and the UCI B may be obtained according to the UCI multiplexing rule. To multiplex UCI associated with the PUCCH resource A and the PUCCH resource(s) B, the UE may determine a single PUCCH resource (hereinafter, MUX PUCCH resource) (S1003). For example, the UE determines a PUCCH resource set corresponding to a payload size of the MUX UCI (hereinafter, PUCCH resource set X) among PUCCH resource sets configured or available for the UE and determines one of PUCCH resources belonging to the PUCCH resource set X as a MUX PUCCH resource. For example, the UE may determine one of the PUCCH resources belonging to the PUCCH resource set X as the MUX PUCCH resource, using a PUCCH resource indicator field in the last DCI among DCIs having a PDSCH-to-HARQ feedback timing indicator field that indicates the same slot for PUCCH transmission. The UE may determine the total number of PRBs of the MUX PUCCH resource based on the payload size of the MUX UCI and a maximum code rate for a PUCCH format of the MUX PUCCH resource. If the MUX PUCCH resource overlaps with other PUCCH resources (except for the PUCCH resource A and the PUCCH resource(s) B), the UE may perform the above-described operation again based on the MUX PUCCH resource (or a PUCCH resource having the earliest start symbol among the other PUCCH resources including the MUX PUCCH resource).

Figure 11:
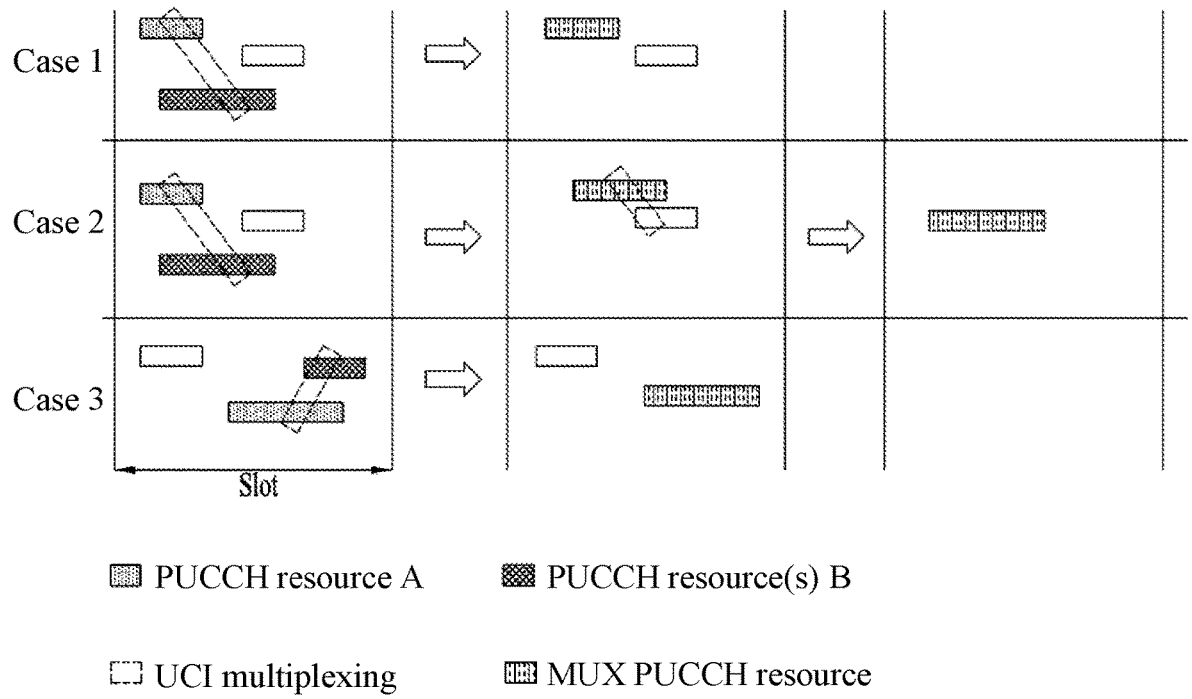
FIG. 11 illustrates cases for performing UCI multiplexing based on FIG. 12.

FIG. 11 illustrates cases for performing UCI multiplexing based on FIG. 10. Referring to FIG. 11, when a plurality of PUCCH resources overlap in a slot, UCI multiplexing may be performed based on the earliest PUCCH resource A (e.g., PUCCH resource A with the earliest start symbol). In FIG. 11, Case 1 and Case 2 show that the first PUCCH resource overlaps with another PUCCH resource. In this case, the process of FIG. 10 may be performed in a state in which the first PUCCH resource is regarded as the earliest PUCCH resource A. In contrast, Case 3 shows that the first PUCCH resource does not overlap with another PUCCH resource and the second PUCCH resource overlaps with another PUCCH resource. In Case 3, UCI multiplexing is not performed on the first PUCCH resource. Instead, the process of FIG. 10 may be performed in a state in which the second PUCCH resource is regarded as the earliest PUCCH resource A. Case 2 shows that a MUX PUCCH resource determined to transmit the multiplexed UCI newly overlaps with another PUCCH resource. In this case, the process of FIG. 10 may be additionally performed in a state in which the MUX PUCCH resource (or the earliest PUCCH resource (e.g., a PUCCH resource having the earliest start symbol) among the other PUCCH resources including the MUX PUCCH resource) is regarded as the earliest PUCCH resource A.

Figure 12:
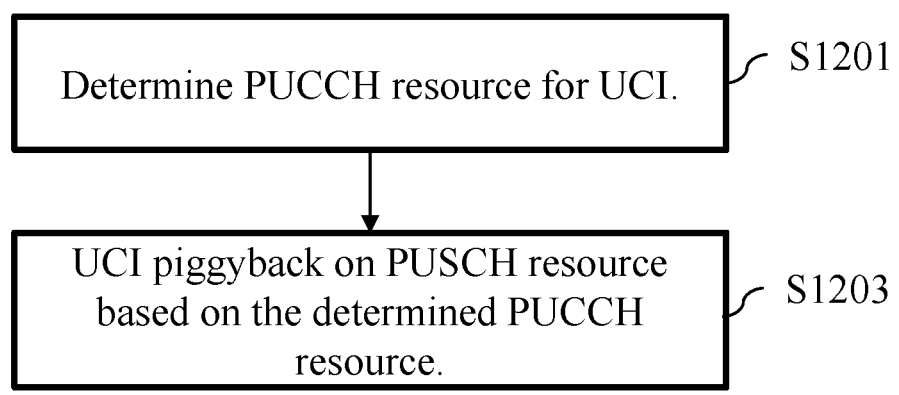
FIG. 12 illustrates a process for a user equipment (UE) with an overlapping PUCCH and PUSCH in a single slot to handle collision between UL channels.

FIG. 12 illustrates a process for a UE with an overlapping PUCCH and PUSCH in a single slot to handle collision between UL channels.

To transmit UCI, the UE may determine a PUCCH resource (S1201). Determination of the PUCCH resource for the UCI may include determining a MUX PUCCH resource. In other words, determination of the PUCCH resource for the UCI by the UE may include determining the MUX PUCCH resource based on a plurality of overlapping PUCCHs in a slot.

The UE may perform UCI piggyback on a PUSCH resource based on the determined (MUX) PUCCH resource (S1203). For example, when there is a PUSCH resource (on which multiplexed UCI transmission is allowed), the UE may apply the UCI multiplexing rule to PUCCH resource(s) overlapping with the PUSCH resource (on the time axis). The UE may transmit the UCI on the PUSCH.

When there is no PUSCH overlapping with the determined PUCCH resource in a slot, S1103 is omitted and the UCI may be transmitted on the PUCCH.

When the determined PUCCH resource overlaps with a plurality of PUSCHs on the time axis, the UE may multiplex the UCI with one of the PUSCHs. For example, when the UE intends to transmit the PUSCHs to respective serving cells, the UE may multiplex the UCI on a PUSCH of a specific serving cell (e.g., a serving cell having the smallest serving cell index) among the serving cells. When more than one PUSCH is present in the slot of the specific serving cell, the UE may multiplex the UCI on the earliest PUSCH transmitted in the slot.

Figure 13:
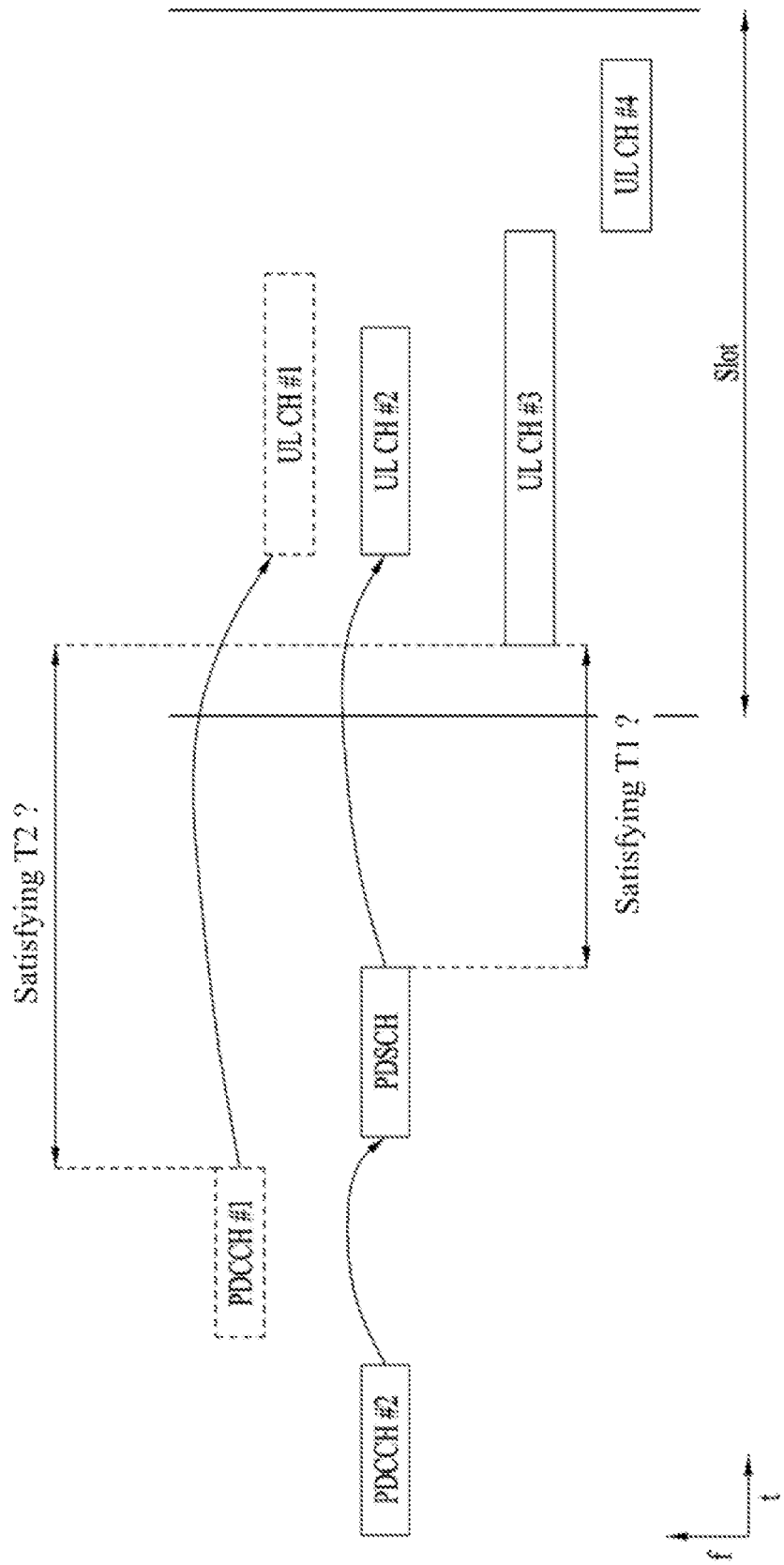
FIG. 13 illustrates UCI multiplexing considering a timeline condition.

FIG. 13 illustrates UCI multiplexing considering a timeline condition. When the UE performs UCI and/or data multiplexing for overlapping PUCCH(s) and/or PUSCH(s) on the time axis, the UE may be lacking in processing time for UCI and/or data multiplexing due to flexible UL timing configuration for the PUCCH or the PUSCH. In order to prevent the processing time of the UE from being insufficient, two timeline conditions (hereinafter, multiplexing timeline conditions) described below are considered in a process of performing UCI/data multiplexing for the overlapping PUCCH(s) and/or PUSCH(s) (on the time axis).

(1) The last symbol of a PDSCH corresponding to HARQ-ACK information is received before time N1+ from the start symbol of the earliest channel among the overlapping PUCCH(s) and/or PUSCH(s) (on the time axis). T1 may be determined based on i) a minimum PDSCH processing time N1 defined according to a UE processing capability, and/or ii) dl predefined as an integer equal to or greater than 0 according to a scheduled symbol position, a DMRS position in the PUSCH, BWP switching, etc.

For example, T1 may be determined as follows: $T1=(N1+d1)*(2048+144)*\kappa*2^{-u}*T_c$. N1 is based on u of Table 11 and Table 12 for UE processing capabilities #1 and #2, respectively, and u is one of $(u_{PDCCH}, u_{PDSCH}, u_{UL})$, that causes the largest T1, where $u_{PDCCH}$ corresponds to a subcarrier spacing of a PDCCH for scheduling the PDSCH, $u_{PDSCH}$ corresponds to a subcarrier spacing of the scheduled PDSCH, $u_{UL}$ corresponds to a subcarrier spacing of a UL channel on which HARQ-ACK is to be transmitted, and $\kappa=T_s/T_f=64$. In Table 11, in the case of $N_{1,0}$, if a PDSCH DMRS position of an added DMRS is $l_1=12$, then $N_{1,0}=14$ and, otherwise, $N_{1,0}=13$ (refer to Section 7.4.1.1.2 of 3GPP TS 38.211). If the last symbol of the PDSCH for PDSCH mapping type A is present on an i-th slot, d1=7−i for i<7 and, otherwise, d1=0. If the PDSCH has mapping type B for UE processing capability #1, d1 may be 0 when the number of allocated PDSCH symbols is 7, d1 may be 3 when the number of allocated PDSCH symbols is 4, d1 may be 3+d when the number of allocated PDSCH symbols is 2, where d is the number of overlapping symbols of the scheduling PDCCH and the scheduled PDSCH. If the PDSCH mapping type is B for UE processing capability #2, d1 may be 0 when the number of allocated PDSCH symbols is 7, and d1 may correspond to the number of overlapping symbols of the scheduling PDCCH and the scheduled PDSCH when the number of allocated PDSCH symbols is 4. Further, if the number of allocated PDSCH symbols is 2, d1 may be 3 when the scheduling PDSCH is within a 3-symbol CORESET and the CORESET and the PDSCH have the same starting symbol, and d1 may be the number of overlapping symbols of the scheduling PDCCH and the scheduled PDSCH for the other cases. In the present disclosure T1 may also be referred to as T_proc,1.

(2) The last symbol of a (e.g., triggering) PDCCH for indicating PUCCH or PUSCH transmission is received before time T2 from the start symbol of the earliest channel among overlapping PUCCH(s) and/or PUSCH(s) (on the time axis). T2 may be determined based on i) a minimum PUSCH preparation time N1 defined according to a UE PUSCH timing capability, and/or ii) d2 predefined as an integer equal to or greater than 0 according to the scheduled symbol position, BWP switching, etc. d2 may be categorized into $d_{2,1}$ related to the scheduled symbol position and $d_{2,2}$ related to BWP switching.

For example, T2 may be determined as follows: $T2=\max\{(N2+d_{2,1})*(2048+144)*\kappa*2^{-u}*T_c, d_{2,2}\}$. N2 is based on u of Table 13 and Table 14 for UE timing capabilities #1 and #2, respectively, and u is one of $(u_{DL}, u_{UL})$, that causes the largest T1, where $u_{DL}$ corresponds to a subcarrier spacing of a PDCCH carrying DCI for scheduling a PUSCH, $u_{UL}$ corresponds to a subcarrier spacing of the PUSCH, and $\kappa=T_s/T_f=64$. If the first symbol of PUSCH allocation is composed only of a DMRS, then $d_{2,1}$ may be 0 and, otherwise, $d_{2,1}$ may be 1. If the scheduling DCI has triggered BWP switching, $d_{2,2}$ is equal to a switching time and, otherwise, $d_{2,2}$ is 0. The switching time may be differently defined depending on a frequency range (FR). For example, the switching time may be defined as 0.5 ms for FR1 and as 0.25 ms for FR2. In the present disclosure, T2 may also be referred to as T_proc,2.

Tables below show processing times according to UE processing capability. Particularly, Table 11 shows a PDSCH processing time for PDSCH processing capability #1 of the UE, Table 12 shows a PDSCH processing time for PDSCH processing capability #2 of the UE, Table 13 shows a PUSCH preparation time for PUSCH timing capability #1 of the UE, and Table 14 shows a PUSCH processing time for PUSCH timing capability #2 of the UE.

TABLE 11

| | PDSCH decoding time N1 [symbols] | |
|---|---|---|
| u/SCS | Front-loaded DMRS only | Front-loaded + additional DMRS |
| 0/15 kHz | 8 | $N_{1,0}$ |
| 1/30 kHz | 10 | 13 |
| 2/60 kHz | 17 | 20 |
| 3/120 kHz | 20 | 24 |

TABLE 12

| u/SCS | PDSCH decoding time N1 [symbols] |
| --- | --- |
| 0/15 kHz | 3 |
| 1/30 kHz | 4.5 |
| 2/60 kHz | 9 for frequency range 1 |

TABLE 13

| u/SCS | PUSCH preparation time N2 [symbols] |
| --- | --- |
| 0/15 kHz | 10 |
| 1/30 kHz | 12 |
| 2/60 kHz | 23 |
| 3/120 kHz | 36 |

TABLE 14

| u/SCS | PUSCH preparation time N2 [symbols] |
| --- | --- |
| 0/15 kHz | 5 |
| 1/30 kHz | 5.5 |
| 2/60 kHz | 11 for frequency range 1 |

If the UE configured to multiplex different UCI types within one PUCCH intends to transmit a plurality of overlapping PUCCHs in a slot or transmit overlapping PUCCH(s) and PUSCH(s) in a slot, the UE may multiplex the UCI types when specific conditions are fulfilled. The specific conditions may include multiplexing timeline condition(s). For example, PUCCH(s) and PUSCH(s) to which UCI multiplexing is applied in FIGS. 10 to 12 may be UL channels that satisfy the multiplexing timeline condition(s). Referring to FIG. 13, the UE may need to transmit a plurality of UL channels (e.g., UL channels #1 to #4) in the same slot. Here, UL CH #1 may be a PUSCH scheduled by PDCCH #1. UL CH #2 may be a PUCCH for transmitting HARQ-ACK for a PDSCH. The PDSCH is scheduled by PDCCH #2 and a resource of UL CH #2 may also be indicated by PDCCH #2.

In this case, if overlapping UL channels (e.g., UL channels #1 to #3) on the time axis satisfy the multiplexing timeline condition, the UE may perform UCI multiplexing for overlapping UL channels #1 to #3 on the time axis. For example, the UE may check whether the first symbol of UL CH #3 from the last symbol of the PDSCH satisfies the condition of T1. The UE may also check whether the first symbol of UL CH #3 from the last symbol of PDCCH #1 satisfies the condition of T2. If the multiplexing timeline condition is satisfied, the UE may perform UCI multiplex for UL channels #1 to #3. In contrast, if the earliest UL channel (e.g., UL channel having the earliest start symbol) among overlapping UL channels does not satisfy the multiplexing timeline condition, the UE may not be allowed to multiplex all of the corresponding UCI types.

Figure 14:
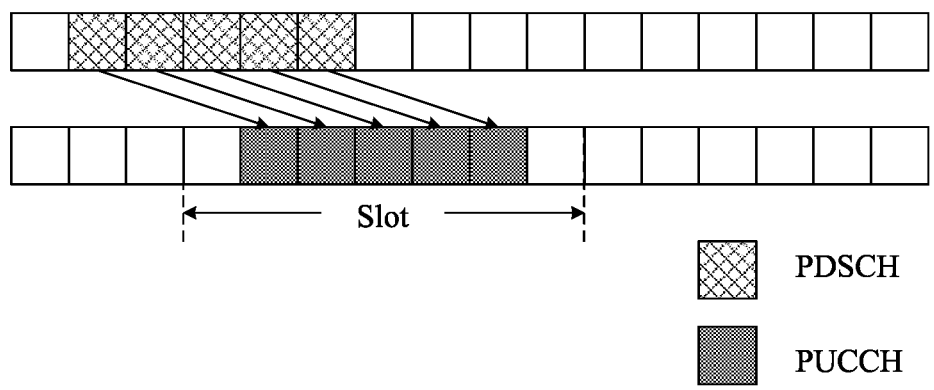
FIG. 14 illustrates transmission of a plurality of HARQ-ACK PUCCHs in a slot.

FIG. 14 illustrates transmission of a plurality of HARQ-ACK PUCCHs in a slot.

The current NR standard specification (e.g., 3GPP TS 38.213 V15.2.0) specifies that the UE is not expected to transmit a PUCCH with HARQ-ACK information in more than one slot. Accordingly, according to the current NR standard specification, the UE may transmit at most one PUCCH with the HARQ-ACK information in one slot. In order to prevent a situation in which the UE fails to transmit the HARQ-ACK information due to restrictions on the number of HARQ-ACK PUCCHs transmittable by the UE, the BS needs to perform DL scheduling so that the HARQ-ACK information may be multiplexed on one PUCCH resource. However, when taking into consideration a service with stringent latency and reliability requirements, such as a URLLC service, a scheme of concentrating a plurality of HARQ-ACK feedbacks only on one PUCCH in a slot may not be desirable in terms of PUCCH performance. Furthermore, in order to support a latency-critical service, the BS may be required to schedule a plurality of consecutive PDSCHs with a short duration in one slot. Although the UE may transmit a PUCCH in random symbol(s) in a slot by the configuration/indication of the BS, if the UE is allowed to transmit only a maximum of one HARQ-ACK PUCCH in a slot, it may be impossible for the BS to perform fast back-to-back scheduling for PDSCHs and for the UE to perform fast HARQ-ACK feedback. Accordingly, in order to flexibly and efficiently use resources and support services, it is better to allow transmission of a plurality of (non-overlapping) HARQ-ACK PUCCHs (or PUSCHs) in one slot as illustrated in FIG. 14.

One of the representative scenarios of the next system, URLLC has the low-latency and high-reliability requirements of a user-plane delay of 0.5 ms and transmission of X bytes of data within 1 ms at or below an error rate of $10^{-5}$. In general, eMBB is characterized by a large traffic capacity, a file size equal to or less than tens to hundreds of bytes, and sporadic occurrence. Therefore, eMBB requires transmission at a maximum transmission rate with minimum overhead of control information, whereas URLLC requires a short scheduling time unit and a reliable transmission method.

Depending on application fields or traffic types, various reference time units may be assumed/used to transmit/receive a physical channel. A reference time may be a basic unit for scheduling a specific physical channel, and a reference time unit may be changed according to the number of symbols and/or a subcarrier spacing (SCS) in the scheduling time unit. Some embodiments/implementations of the present disclosure are described in the context of a slot or mini-slot as a reference time unit, for convenience of description. A slot may be, for example, a basic scheduling unit used for general data traffic (e.g., eMBB). A mini-slot may have a shorter duration than a slot in the time domain, and may be a scheduling basic unit used for a special purpose or for a special communication scheme (e.g., URLLC, an unlicensed band, or millimeter wave). However, the embodiment(s)/implementation(s) of the present disclosure may also be applied to physical channel transmission/reception in mini slots for eMBB or physical channel transmission/reception in slots for URLLC or other communication schemes.

Figure 15:
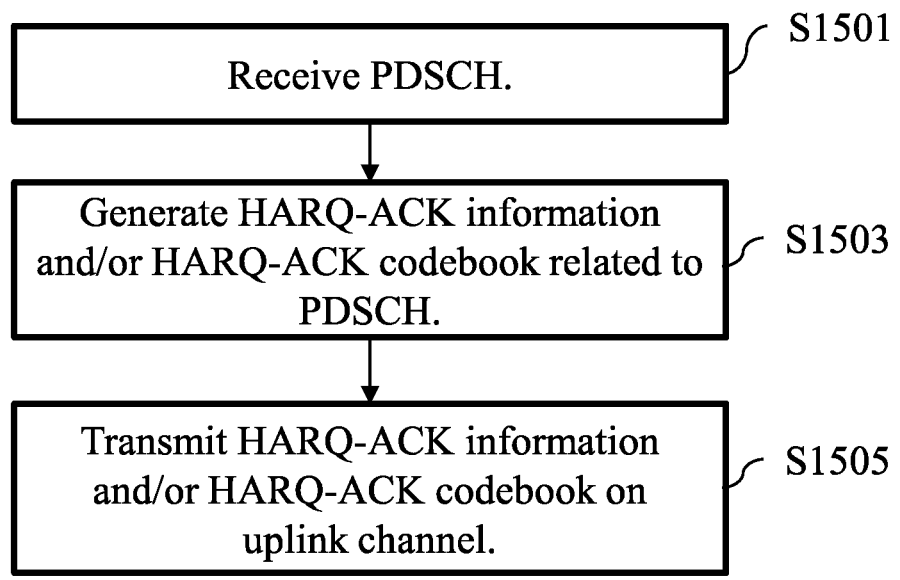
FIGS. 15 and 16 illustrate overall operations of a UE and a BS according to some implementations of the present disclosure.
Figure 16:
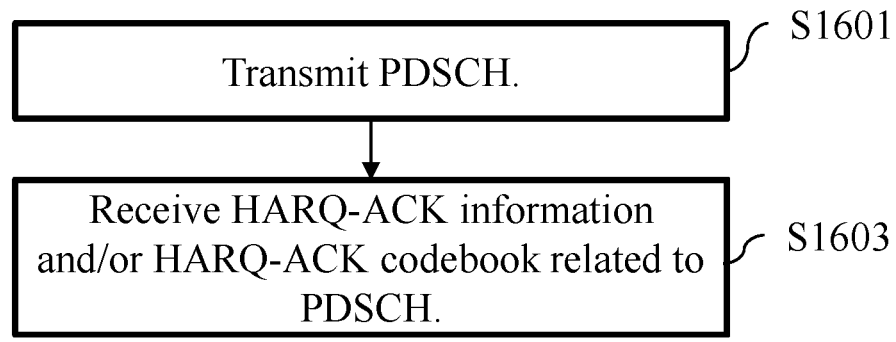

FIGS. 15 and 16 illustrate overall operations of a UE and a BS according to some implementations of the present disclosure. In particular, FIG. 15 illustrates the operation of the UE according to some implementations of the present disclosure, and FIG. 16 illustrates the operation of the BS according to some implementations of the present disclosure.

Referring to FIG. 15, the UE receives a PDSCH from the BS (S1501) and generates HARQ-ACK information and/or a HARQ-ACK codebook, corresponding to the PDSCH (S1503). In some implementations of the present disclosure, the UE may generate the HARQ-ACK information and/or the HARQ-ACK codebook according to Example 1, which will be described later, based on characteristics of the PDSCH (e.g., a service type/requirement, a TTI length, a numerology, and/or a processing time). In some implementations of the present disclosure, when the PDSCH is a PDSCH received based on an SPS configuration, the HARQ-ACK information and/or the HARQ-ACK codebook may be generated according to Example 2 and/or Example 3, which will be described later. The UE may transmit the HARQ-ACK information and/or the HARQ-ACK codebook on a UL channel such as a PUSCH and/or a PUCCH (S1505). A resource of the UL channel used to transmit the HARQ-ACK information and/or the HARQ-ACK codebook may be determined based on Example 1.

Referring to FIG. 16, the BS may transmit the PDSCH to the UE (S1601). The PDSCH may have a specific service type/requirement (e.g., eMBB or URLLC), a specific TTI length, a specific numerology, and/or a specific processing time. The PDSCH may be a PDSCH transmitted according to the SPS configuration. Thereafter, the BS may receive the HARQ-ACK information and/or the HARQ-ACK codebook, corresponding to the PDSCH (S1603). The HARQ-ACK information and/or the HARQ-ACK codebook may be HARQ-ACK information and/or a HARQ-ACK codebook, which is generated based on at least one of Example 1 to Example 3 and/or is received on the UL channel.

<Example 1> PUCCH Resource for Different Service Types/Requirements

For the purpose of supporting various service requirements and/or flexibly and efficiently using resources, a next-generation system may consider that HARQ-ACK transmission(s) for multiple DL data receptions having different service types/requirements (e.g., eMBB or URLLC), TTI lengths, numerologies, and/or processing times (e.g., PDSCH-to-HARQ-ACK timing gaps or PDCCH-to-PUSCH timing gaps) are transmitted on a single PUCCH (or a PUSCH) or multiple PUCCHs (or PUSCHs) within one slot. Hereinbelow, an efficient PUCCH (or PUSCH) resource allocation and transmission method in the above situation will be proposed. Hereinbelow, different PUCCH resources may refer to PUCCH resources based on different PUCCH formats (e.g., structures of REs/symbols to which UCI and a DMRS are mapped are different) or refer to different PUCCH resources (e.g., at least one of a frequency (e.g., a PRB index), a time (e.g., a symbol index), or a code (e.g., a cyclic shift (CS) or an orthogonal cover code (OCC) sequence) is different) based on the same PUCCH format. When UCI is periodically transmitted on a PUSCH or UCI without a UL-SCH is aperiodically transmitted on the PUSCH, such periodic PUSCH transmission and aperiodic PUSCH transmission may also be regarded as different PUCCH resources/formats. Alternatively, PUCCH resources (or UCI resources) may be distinguished based on a time/frequency/time duration resource, a PUSCH DMRS mapping type, etc., configured for PUSCH transmission.

When HARQ-ACK transmissions for multiple DL data transmissions are performed on multiple PUCCHs (or PUSCHs) within one slot, a PUCCH resource may be configured as follows.

Option 1-1: A rule may be defined such that the BS configures multiple (PUCCH) resources (or resource sets) for the UE by associating the (PUCCH) resources with one state indicated by a "PUCCH resource indicator" and determines a PUCCH resource to be finally used for HARQ-ACK transmission for a PDSCH according to a service type/requirement (e.g., eMBB or URLLC), a processing time, a search space, a CORESET, a DCI format, an RNTI, CRC masking of a PDCCH, and/or a value indicated by a specific field (other than the "PUCCH resource indicator") in DCI for the PDSCH.

Option 1-2: A rule may be defined such that a different resource set is used for HARQ-ACK transmission for the PDSCH according to the service type/requirement (e.g., eMBB or URLLC), the processing time, the search space, the CORESET, the DCI format, the RNTI, the CRC masking of the PDCCH, and/or the value indicated by the specific field (other than the "PUCCH resource indicator") in the DCI for the PDSCH. Alternatively, a rule may be defined such that a resource set is determined by considering the service type/requirement (e.g., eMBB or URLLC), the search space, the CORESET, the DCI format, the RNTI, the CRC masking of the PDCCH, and/or the value indicated by the specific field (other than the "PUCCH resource indicator") in the DCI for the PDSCH, in addition to a payload size of the PUCCH.

Option 1-3: A plurality of starting symbols and length values (or a single starting symbol and length value and a plurality of offsets) may be configured when a PUCCH resource is configured, and time-domain PUCCH resources corresponding to plural PUCCHs in a slot may be determined based on these configured values. On which PUCCH resource among a plurality of PUCCH resources in a slot HARQ-ACK for the PDSCH will be transmitted may be determined by the service type/requirement (e.g., eMBB or URLLC), the processing time, the search space, the CORESET, the DCI format, the RNTI, the CRC masking of the PDCCH, and/or the value indicated by the specific field (other than the "PUCCH resource indicator") in the DCI for the PDSCH.

Option 1-4: A plurality of subslots within a slot may be previously defined/configured/indicated, and a starting symbol and length of a PUCCH resource associated with one state indicated by the "PUCCH resource indicator" may be configured based on a subslot boundary. The starting symbol and length may be individually configured with respect to each subslot, or only one starting symbol and length may be configured and a PUCCH resource for each subslot may be determined based on the configured starting symbol and length.

<Example 2> Determination of HARQ-ACK Codebook for DL SPS

In some scenarios, in the case of a type-1 HARQ-ACK codebook, which is a semi-static HARQ-ACK codebook, the UE reports HARQ-ACK information for PDSCH reception or SPS PDSCH release in a HARQ-ACK codebook that the UE transmits in a slot indicated by a value of a PDSCH-to-HARQ_feedback timing indicator (i.e., a PDSCH-to-HARQ feedback timing offset) field in a corresponding DCI format used to schedule a PDSCH in a cell, and reports NACK value(s) for HARQ-ACK information bit(s) in a HARQ-ACK codebook that the UE transmits in a slot which is not indicated by a value of the PDSCH-to-HARQ_feedback timing field in a corresponding DCI format used to schedule the PDSCH in the cell (hereinafter, a DL DCI format).

In some scenarios, the UE determines occasion(s) for candidate PDSCH receptions or SPS PDSCH releases based on a row in a table defined by a PDSCH TDRA configuration and determines the type-1 (i.e., semi-static) HARQ-ACK codebook based on the occasion(s). Here, the "candidate PDSCH receptions" may include a PDSCH scheduled through dynamic DL assignment DCI and/or an SPS PDSCH transmitted on a determined resource indicated by an SPS configuration activated through DL SPS activation DCI. For example, referring to Section 9.1.2.1 of 3GPP TS 38.213 V15.5.0, for a serving cell c, an active DL BWP, and an active UL BWP, the UE may determine a set of $M_{A,c}$ occasions for candidate PDSCH receptions for which the UE is to transmit corresponding HARQ-ACK information on a PUCCH in a slot nu, based on a) a set of slot timing values $K_1$ associated with the active UL BWP and b) a set of row indexes R of a table provided by row indexes (hereinafter, TDRA table row indexes) that define slot offsets K0, start and length indicators SLIV, and PDSCH mapping types, which are associated with the DL BWP and are for PDSCH reception. For the set of the slot timing values $K_1$, the UE determines the set of $M_{A,c}$ occasions for candidate PDSCH receptions or SPS PDSCH releases. The $M_{A,c}$ occasions are indexed in ascending order of used TDRA table row indexes for the same cell index and the same slot timing value, indexed in descending order of slot timing values for the same cell index, and indexed in ascending order of serving cell indexes for different cells. In other words, upon determining the set of $M_{A,c}$ occasions, the UE and the BS determine occasion(s) for candidate PDSCH receptions or SPS PDSCH releases with respect to each serving cell in consideration of the slot timing values and the TDRA table row indexes in ascending order of serving cell indexes from a serving cell having the lowest serving cell index. In this case, the TDRA table row indexes are considered in ascending order with respect to each slot timing value in descending order of the slot timing values. In the HARQ-ACK codebook, locations of HARQ-ACK information bits for candidate PDSCH receptions and/or SPS PDSCH releases are determined based on occasion(s) $M_c$ for candidate PDSCH reception(s) or SPS PDSCH release(s) per cell and a maximum number of codewords (i.e., a maximum number of transport blocks) capable of being transmitted in a corresponding cell. For example, one HARQ-ACK information bit for one transport block or two HARQ-ACK information bits for two transport blocks are determined for each occasion according to a maximum number of transport blocks configured for a corresponding serving cell in ascending order of indexes of occasions for candidate PDSCH receptions or SPS PDSCH releases for one serving cell and then are included in the HARQ-ACK codebook. In the case of a HARQ-ACK codebook for multiple serving cells, HARQ-ACK information bits for the multiple serving cells are included in the HARQ-ACK codebook in ascending order of serving cell indexes from HARQ-ACK information bits for a serving cell of the lowest serving cell index. Consequently, according to Section 9.1.2.1 of 3GPP TS 38.213 V15.5.0, HARQ-ACK information bit(s) for a cell of a lower serving cell index precede HARQ-ACK information bit(s) for a cell of a higher serving cell index in the HARQ-ACK codebook. In addition, in HARQ-ACK information bits for the same serving cell index, HARQ-ACK information bits for a higher slot timing value precedes HARQ-ACK information bits for a lower slot timing value and, in HARQ-ACK information bits for the same slot timing value, HARQ-ACK information bits for a lower (TDRA table) row index precedes HARQ-ACK information bits for a higher (TDRA table) row index.

<2-1> In some scenarios, a minimum periodicity of a DL SPS is 10 ms. In scenarios in which the minimum periodicity of the DL SPS is 10 ms, a HARQ-ACK bit, corresponding to the DL SPS, which is capable of being included in one PUCCH resource, is one bit corresponding to candidate PDSCH reception indicated through DL SPS activation DCI. If the minimum periodicity of the DL SPS is reduced to a predetermined value or less, a DL SPS based PDSCH may be received on a resource other than candidate PDSCH reception indicated through the DL SPS activation DCI. For example, if a TDRA table is configured for the UE through a higher layer (e.g., RRC) signal, the periodicity of a DL SPS is set to 7 symbols, and starting symbol index=1 and length=2 are indicated through a TDRA field of the DL SPS activation DCI, then the UE may receive a PDSCH in symbols {#1, #2} and a PDSCH in symbols {#8, #9} in a slot (assuming that a subcarrier spacing is 15 kHz). However, in the case of the symbols {#8, #9}, a start and length indicator value (SLIV) indicating a corresponding resource in the TDRA table may not be present, and a HARQ-ACK bit corresponding to the SLIV may not be included in the type-1 HARQ-ACK codebook. To generate a proper HARQ-ACK codebook for DL SPS transmission, the following option(s) may be applied.

Option 2-1-1: When the periodicity of a DL SPS configuration is a predetermined value or less (e.g., SPS periodicity shorter than a slot) and/or when an SLIV indicating a corresponding resource is not present in the TDRA table with respect to a specific DL SPS transmission resource determined according to an indication by DL SPS configuration and activation DCI, the UE may perform codebook determination by considering that the SLIV corresponding to this resource is configured as a virtual row in the TDRA table. This operation may be performed after the UE receives the SPS activation DCI. In contrast, after the UE receives SPS release DCI, this operation may not be performed.

The UE may perform codebook determination by considering that the virtual row is configured only upon considering the same PDSCH-to-PUCCH offset as a PDSCH-to-HARQ feedback timing offset $K1_{SPS}$ for a specific DL SPS transmission resource determined according to the indication by the DL SPS configuration and activation DCI. In other words, upon performing codebook determination for a plurality of PDSCH-to-HARQ feedback timing offsets, it may be considered that the virtual row is configured only when the UE performs codebook determination for $K1_{SPS}$.

Option 2-1-2: When the periodicity of a DL SPS configuration is a predetermined value or less (e.g., SPS periodicity shorter than a slot) and/or when an SLIV indicating a corresponding resource is not present in the TDRA table with respect to a specific DL SPS transmission resource determined according to an indication by the DL SPS configuration and activation DCI, Option 2-1-2-1: the UE may generate HARQ-ACK bit(s) for all DL SPS transmission resource(s) in a specific time duration (e.g., slot) determined according to the indication by the DL SPS configuration and activation DCI and, after determination of a configured TDRA table based HARQ-ACK codebook, the UE may concatenate the HARQ-ACK bit(s) at a rear part of the HARQ-ACK codebook. For example, after determining a HARQ-ACK codebook for (candidate) SPS PDSCHs for which the SLIV indicating a corresponding resource is present in the TDRA table, the UE may add the generated HARQ-ACK bit(s) to the rear part of the HARQ-ACK codebook, thereby generating a new HARQ-ACK codebook. This operation may be performed after the UE receives the SPS activation DCI. In contrast, after the UE receives the SPS release DCI, this operation may not be performed.

Option 2-1-2-2: Alternatively, the UE may generate a HARQ-ACK bit only for a resource for which the SLIV indicating the corresponding resource is not present in the TDRA table among DL SPS transmission resource(s) in a specific time duration (e.g., slot) determined according to the indication by the DL SPS configuration and activation DCI and concatenate the HARQ-ACK bit at a rear part of a codebook generated by an existing table (e.g., a codebook based on SPS PDSCH(s) for which the SLIV indicating a corresponding resource is present in the TDRA table). This operation may be performed after the UE receives the SPS activation DCI. In contrast, after the UE receives the SPS release DCI, this operation may not be performed.

Option 2-1-3: When the periodicity of a DL SPS configuration is a predetermined value or less (e.g., SPS periodicity shorter than a slot) and/or when an SLIV indicating a corresponding resource is not present in the TDRA table with respect to a specific DL SPS transmission resource determined according to an indication by the DL SPS configuration and activation DCI, if the number of HARQ-ACK bits per specific time duration determined after the UE performs codebook determination is N–y under the assumption that a specific SLIV in the TDRA table (hereinafter, SLIV_y) is indicated by the DL SPS activation DCI and all DL SPS transmission resource(s) derived with respect to a specific time duration (e.g., slot) are configured as virtual row(s) in the TDRA table upon considering the periodicity of the DL SPS configuration, the UE may concatenate, at a rear part of a codebook generated by the existing table, bit(s) corresponding to the largest number of bits max_y{N_y} (or max_y {_y}–N_k, where N_k is the number of HARQ-ACK bits per specific time duration in a codebook generated by the existing table (e.g., a codebook based on SPS PDSCH(s) for which the SLIV indicating a corresponding resource is present in the TDRA table)) among N_y.

The number of bits needed by an SLIV indicated by actual activation DCI may be smaller than the number of bits corresponding to max_y{N_y} (or max_y{N_y}–N_k). In this case, the UE may fill actual HARQ-ACK information with bits starting from the most significant bit (MSB) and generate and report NACK for the remaining bit(s) by regarding the remaining bit(s) as NACK.

This may be applied even when the DL SPS configuration is not activated through the activation DCI. This may always maintain the same codebook size regardless of the SLIV indicated by the activation DCI, or a PDSCH-to-HARQ feedback timing. For example, when the DL SPS configuration is not activated through the activation DCI, the UE may regard bit(s) corresponding to the added max_y{N_y} (or max_y {N_y}–N_k) as NACK and generate and report NACK for the corresponding bit(s).

Option 2-1-4: When the periodicity of a DL SPS configuration is a predetermined value or less (e.g., SPS periodicity shorter than a slot) and/or when a SLIV indicating a corresponding resource is not present in the TDRA table with respect to a specific DL SPS transmission resource determined according to an indication by the DL SPS configuration and activation DCI, Option 2-1-4-1: in consideration of a specific time duration (e.g., slot) and the periodicity of the DL SPS configuration, the UE may generate HARQ-ACK bit(s) for a maximum number of DL SPS transmission resource(s) that may occur in the corresponding time duration, determine a codebook based on candidate PDSCH reception(s) for which the SLIV indicating a corresponding resource is present in the TDRA table, and concatenate the HARQ-ACK bit(s) at a rear part of the codebook.

Option 2-1-4-2: Alternatively, in consideration of the specific time duration (e.g., slot) and the periodicity of the DL SPS configuration, the UE may generate HARQ-ACK bit(s) corresponding to a number obtained by subtracting one from a maximum number of DL SPS transmission resource(s) that may occur in the corresponding time duration and concatenate the HARQ-ACK bit(s) at a rear part of a codebook generated by the existing table (e.g., a codebook based on SPS PDSCH(s) for which the SLIV indicating a corresponding resource is present in the TDRA table).

Option 2-1-4-3: Alternatively, in consideration of the specific time duration (e.g., slot) and the periodicity of the DL SPS configuration, the UE may generate a HARQ-ACK bit only for a resource for which the SLIV indicating the corresponding DL SPS transmission resource is not present (hereinafter, resource X) in the TDRA table among DL SPS transmission resource(s) that may occur in the corresponding time duration and concatenate the HARQ-ACK bit at a rear part of a codebook generated by the existing table (e.g., a codebook based on SPS PDSCH(s) for which the SLIV indicating a corresponding resource is present in the TDRA table). If the resource X is not included in DL SPS transmission resource(s) derived in a specific time duration (e.g., slot) by the actual activation DCI, the UE regards HARQ-ACK for the resource X as NACK and generates and reports NACK for a HARQ-ACK bit corresponding to the resource X.

Option 2-1-4-1, Option 2-1-4-2, and/or Option 2-1-4-3 may be applied even to the case in which the DL SPS configuration is not activated through the activation DCI. Irrespective of the SLIV indicated by the activation DCI, or the PDSCH-to-HARQ feedback timing, the same codebook size may always be maintained. For example, when the DL SPS configuration is not activated through the activation DCI etc., the UE regards an added bit in relation to the DL SPS configuration as NACK and generates and reports NACK for the corresponding bit.

<2-2> In some scenarios, in the case of the type-1 HARQ-ACK codebook, a HARQ-ACK bit for SPS PDSCH release is determined as the same location as a HARQ-ACK bit location corresponding to SPS PDSCH reception and is then transmitted. In other words, in some scenarios, in the type-1 HARQ-ACK codebook, the HARQ-ACK bit location for SPS release is determined as the same location as the HARQ-ACK bit location corresponding to SPS-based PDSCH reception. When the periodicity of the DL SPS configuration is a predetermined value or less (e.g., an SPS periodicity shorter than a slot) and/or when an SLIV indicating a corresponding resource is present in the TDRA table with respect to a plurality of DL SPS transmission resources determined according to the indication by the DL SPS configuration and activation DCI, there may be ambiguity in determining the HARQ-ACK bit for SPS PDSCH release, and the HARQ-ACK bit for SPS PDSCH release may be differently understood by the BS and the UE. To prevent this, the following option(s) may be used to the determine the HARQ-ACK bit for SPS PDSCH release in this situation.

Option 2-2-1: In consideration of a specific time duration (e.g., slot) and the periodicity of the DL SPS configuration, the UE may transmit HARQ-ACK information for SPS PDSCH release using the same location as a HARQ-ACK bit location corresponding to the first resource among DL SPS transmission resource(s) that may occur in the corresponding time duration.

Option 2-2-2: The UE may transmit the HARQ-ACK information for SPS PDSCH release using the same location as a HARQ-ACK bit location corresponding to a resource indicated by the DL SPS activation DCI.

Option 2-2-3: The UE may transmit the HARQ-ACK information for SPS PDSCH release always using a determined HARQ-ACK bit location regardless of a DL SPS transmission resource that may occur in a corresponding time duration. For example, the UE may concatenate a HARQ-ACK bit for SPS PDSCH release always at the rearmost part of a codebook after the codebook is generated based on candidate PDSCH receptions.

Example <2-2> may be applied individually or together with Example <2-1>.

<2-3> In some scenarios, in the case of the type-1 HARQ-ACK codebook, the UE determines that HARQ-ACK for an SPS PDSCH without associated DCI and for SPS PDSCH release is transmitted in the same location as a HARQ-ACK bit corresponding to SPS PDSCH reception. However, when plural DL SPS resources are configured, i.e., when plural DL SPS configurations are provided to the UE, HARQ-ACK bits corresponding to the plural DL SPS resources may need to be included in one PUCCH resource. Accordingly, it is necessary to determine HARQ-ACK bit locations for the plural DL SPS resources. To determine a HARQ-ACK bit location for SPS PDSCH release, the following option(s) may be used.

Option 2-3-1: The UE may transmit HARQ-ACK information based on a HARQ-ACK bit location corresponding to a PDSCH occasion indicated by TDRA in SPS release DCI. This option may be applied for one SPS release DCI for simultaneously releasing one or more DL SPS resources (hereinafter, joint release DCI). In the present disclosure, the joint release DCI may refer to DCI including information for releasing a plurality of SPS configurations. Plural SPS PDSCH releases (for a cell) may be indicated by a single joint release DCI.

In this case, when SPS PDSCHs corresponding respectively to different SPS release DCIs have the same HARQ-ACK bit location, the UE may transmit responses to a plurality of (joint) SPS release DCIs using one bit location.

Alternatively, upon transmitting the responses to the plural (joint) SPS release DCIs on one PUCCH resource, the UE expects that the responses to the respective (joint) SPS release DCIs will have different bit locations. Alternatively, upon transmitting the responses to the plural (joint) SPS release DCIs on one PUCCH resource, the UE does not expect that the responses to the plural (joint) SPS release DCIs will have the same bit location.

Option 2-3-2: The UE may transmit HARQ-ACK information for SPS PDSCH release using the same location as a HARQ-ACK bit location corresponding to the first resource among DL SPS transmission resources(s) in a specific time duration based on the SPS release DCI.

Option 2-3-3: In the case in which a HARQ-ACK bit location for joint release DCI should be determined, the UE may transmit HARQ-ACK information based on a HARQ-ACK bit location corresponding to each PDSCH occasion indicated by TDRA in corresponding activation DCI with respect to each of a plurality of DL SPS resources to be released.

If only one HARQ-ACK bit is considered for a joint release DCI, the UE may transmit the HARQ-ACK information based on a HARQ-ACK bit location corresponding to a PDSCH occasion indicated by TDRA in corresponding activation DCI for a DL SPS resource which is selected in consideration of at least one of the following items among a plurality of DL SPS resources (based on a plurality of (respective) DL SPS configurations) released by the joint release DCI.

Lowest SPS configuration index. When SPS PDSCH resources of a plurality of SPS configurations released by a single joint release DCI are released, a location in the type-1 HARQ ACK codebook for HARQ-ACK information corresponding to SPS PDSCH releases by the single joint release DCI may be equal to a location for HARQ-ACK information for an SPS PDSCH resource having the lowest SPS configuration index. If a HARQ-ACK bit location for plural SPS PDSCH releases is determined based on the lowest SPS configuration index, implementation complexity of the BS and the UE may be relieved. When SPS configurations are grouped, the SPS configuration index may be an SPS group index or a configuration index indicating one SPS configuration in an SPS configuration group; and/or Lowest (or highest) row index among row indexes (corresponding to SPS PDSCH occasions) in a used TDRA table (defined in Section 5.1.2.1.1 of 3GPP TS 38.214). If HARQ-ACK bit locations for a plurality of SPS PDSCH releases are determined based on the lowest row index of the used TDRA table, the implementation complexity of the BS and the UE may be reduced; and/or Lowest SPS configuration index among SPS configuration(s) corresponding to a higher priority. A priority may be assigned to each of the SPS configurations. When there are multiple SPS configurations of a higher priority with which an SPS PDSCH is released by a single DCI, a location in the type-1 HARQ ACK codebook for HARQ-ACK information corresponding to (multiple) SPS releases by the single DCI may be equal to a location for HARQ-ACK information for an SPS PDSCH resource having the lowest SPS configuration index among SPS PDSCH resources according to the SPS configurations of the higher priority.

Figure 17:
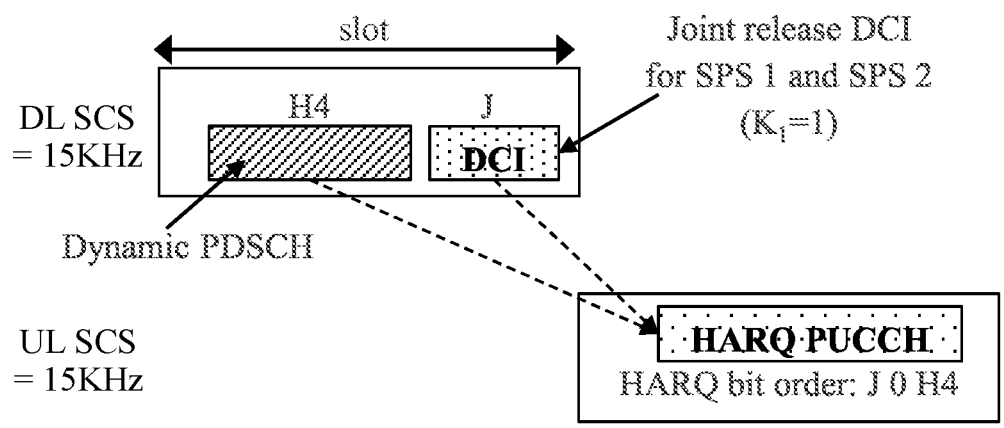
FIG. 17 illustrates transmission/reception of HARQ-ACK information for SPS release DCI according to some implementations of the present disclosure.

FIG. 17 illustrates transmission/reception of HARQ-ACK information for SPS release DCI according to some implementations of the present disclosure. In FIG. 17, SPS 1 denotes an SPS PDSCH reception occasion according to one SPS configuration, SPS 2 denotes an SPS PDSCH reception occasion according to another SPS configuration, $K_1$ denotes a PDSCH-to-HARQ_feedback timing value (i.e., a slot timing value), and a TDRA table row index denotes a row index for a corresponding PDSCH among row indexes of a used TDRA table.

Referring to FIG. 17, a HARQ-ACK codebook including a HARQ-ACK information bit for H1, which is an SPS 1 based PDSCH, and a HARQ-ACK information bit for H5, which is an SPS 2 based PDSCH, is transmitted on HARQ PUCCH 1. If joint release DCI J for releasing both SPS 1 and SPS 2 is transmitted as illustrated in FIG. 17, a HARQ-ACK codebook that includes a HARQ-ACK information bit for the joint release DCI J and a HARQ-ACK information bit for a dynamic PDSCH H4 having a PUCCH resource in the same slot is transmitted on a HARQ PUCCH. In some implementations of the present disclosure, the HARQ-ACK information bit for the joint release DCI J is included in a corresponding HARQ-ACK codebook at the same location as the location of a HARQ-ACK information bit for PDSCH reception of SPS 1 having the lowest SPS configuration index among SPS 1 and SPS 2 released by the joint release DCI. Referring to FIG. 17, since HARQ-ACK information bits carried by a HARQ PUCCH are located in the HARQ-ACK codebook in ascending order of row indexes for $K_1=1$, order of the HARQ-ACK information bits carried by the HARQ PUCCH becomes a HARQ-ACK bit for an occasion for candidate PDSCH reception corresponding to $K_1=1$ and a row index 1, a HARQ-ACK information bit for an occasion for candidate PDSCH reception corresponding to $K_1=1$ and a row index 2, and a HARQ-ACK information bit for an occasion for candidate PDSCH reception corresponding to $K_1=1$ and a row index 3. Since SPS 1 and SPS 2 are released by the joint release DCI J, a HARQ-ACK information bit for release of SPS 1 and release of SPS 2 (i.e., a HARQ-ACK information bit for the joint release DCI J) may be transmitted at the same location as a HARQ-ACK information bit location (a location indicated by "J" in a HARQ bit order of FIG. 17) for an occasion for receiving an SPS 1 based PDSCH having the lowest SPS configuration index among released SPSs, i.e., for candidate PDSCH reception corresponding to $K_1=1$ and a row index 1. 0 indicating NACK may be transmitted at a HARQ-ACK information bit location (a location indicated by "0" in the HARQ bit order of FIG. 17) for an occasion for candidate PDSCH reception corresponding to $K_1=1$ and a row index 2 since an SPS 2 based PDSCH is not received due to release of SPS 2. An ACK or NACK value may be transmitted according to a decoding result of the dynamic PDSCH H4 at a HARQ-ACK information bit location (a location indicated by "H4" in the HARQ bit order of FIG. 17) for an occasion for candidate PDSCH reception corresponding to $K_1=1$ and a row index 3.

<2-4> In some scenarios, in the case of the type-2 HARQ-ACK codebook, HARQ-ACK for SPS PDSCH release is transmitted based on a HARQ-ACK bit location determined by a downlink assignment index (DAI) indicated by release DCI. If a plurality of DL SPS resources is configured, HARQ-ACK bits corresponding to the plural DL SPS resources may need to be included in one PUCCH resource. In this case, in the type-2 HARQ-ACK codebook, HARQ-ACK bit locations for the HARQ-ACK bits corresponding to the DL SPS resources need to be determined. In the above case, a method of determining a HARQ-ACK bit location of SPS PDSCH release is proposed as follows.

Option 2-4-1: When it is necessary to determine a HARQ-ACK bit location for joint release DCI, the UE may transmit HARQ-ACK information based on a HARQ-ACK bit location determined by the DAI in the joint release DCI.

Option 2-4-2: The UE may transmit HARQ-ACK information for SPS PDSCH release using the same location as a HARQ-ACK bit location corresponding to the first resource among DL SPS transmission resource(s) in a specific configured time duration based on SPS release DCI (e.g., a specific configured time duration after the SPS release DCI).

Option 2-4-3: The UE may transmit the HARQ-ACK information for SPS PDSCH release always using a determined HARQ-ACK bit location. Particularly, the UE may concatenate a HARQ-ACK bit for SPS PDSCH release at the rearmost part always after generating a codebook for a dynamically scheduled PDSCH and/or SPS PDSCH.

Option 2-4-4: When it is necessary to determine a HARQ-ACK bit location for joint release DCI, the UE may transmit HARQ-ACK information based on a HARQ-ACK bit location determined by the DAI in activation DCI for a DL SPS resource selected in consideration the following items.

Lowest SPS configuration index; and/or

Lowest (or highest) PDSCH occasion index, and/or

Lowest SPS configuration index among SPS configurations corresponding to a higher priority.

<2-5> When a plurality of DL SPS resources is configured and HARQ-ACK bits corresponding to the plural DL SPS resources are included in one PUCCH resource, order of HARQ-ACK bits for SPS PDSCHs may be determined according to the following option(s). In particular, the following options may be applied when HARQ-ACK bits for SPS PDSCHs are concatenated at a rear part of a codebook for a dynamically scheduled PDSCH after the codebook for the dynamically scheduled PDSCH is generated or when only HARQ-ACK bit(s) for SPS PDSCH(s) are present without HARQ-ACK for the dynamically scheduled PDSCH. Here, the case in which only HARQ-ACK bit(s) for SPS PDSCH(s) are present without HARQ-ACK for the dynamically scheduled PDSCH means a case in which the HARQ-ACK codebook includes only HARQ-ACK bit(s) for SPS PDSCH(s) without HARQ-ACK for a PDSCH based on dynamic DL assignment DCI and/or HARQ-ACK for SPS release DCI. In some implementations of the present disclosure, for a HARQ-ACK codebook including only HARQ-ACK bit(s) for SPS PDSCH(s), a PDSCH-to-HARQ_feedback timing value may not be considered when a HARQ-ACK bit position is determined.

Option 2-5-1: Order of the HARQ-ACK bits for the SPS PDSCHs may be determined in consideration of i) an SPS configuration index, ii) a PDSCH-to-HARQ_feedback timing value, and/or iii) a serving cell index. Specifically, HARQ-ACK information bits for SPS PDSCH(s) on each serving cell may be included in a HARQ-ACK codebook in ascending order of serving cell indexes starting from a serving cell having the lowest serving cell index. For each serving cell (if PDSCH-to-HARQ_feedback timing values are considered, for each PDSCH-to-HARQ feedback timing value in descending order of the PDSCH-to-HARQ_feedback timing values), the HARQ-ACK information bits are included in a HARQ-ACK codebook in ascending order of SPS configuration indexes. For example, when the SPS configuration indexes, the PDSCH-to-HARQ_feedback timing values, and the serving cell indexes are considered, the HARQ-ACK information bit(s) may be determined in ascending order of the SPS configuration indexes, the HARQ-ACK information bit(s) may be determined in descending order of the PDSCH-to-HARQ_feedback timing values, and then the HARQ-ACK information bit(s) may be determined in ascending order of the serving cell indexes. Consequently, HARQ-ACK information bit(s) for a cell of a lower serving cell index precede HARQ-ACK information bit(s) for a cell of a higher serving cell index in a HARQ-ACK codebook. In HARQ-ACK information bits for the same serving cell index, HARQ-ACK information bits for a higher PDSCH-to-HARQ feedback timing value precedes HARQ-ACK information bits of a lower PDSCH-to-HARQ feedback timing value and, in HARQ-ACK information bits for the same PDSCH-to-HARQ_feedback timing value, HARQ-ACK information bits for a lower SPS configuration index precedes HARQ-ACK information bits for a higher SPS configuration index.

Option 2-5-2: Order of the HARQ-ACK bits for the SPS PDSCHs may be determined in consideration of i) a PDSCH occasion index, ii) a PDSCH-to-HARQ_feedback timing value, and/or iii) a serving cell index. Specifically, HARQ-ACK information bits for SPS PDSCH(s) on each serving cell may be included in the HARQ-ACK codebook in ascending order of serving cell indexes starting from a serving cell having the lowest serving cell index. For each serving cell (if PDSCH-to-HARQ_feedback timing values are considered, for each PDSCH-to-HARQ feedback timing value in descending order of the PDSCH-to-HARQ_feedback timing values), the HARQ-ACK information bits are included in the HARQ-ACK codebook in ascending order of PDSCH occasion indexes. For example, when the SPS occasion indexes, the PDSCH-to-HARQ_feedback timing values, and the serving cell indexes are considered, the HARQ-ACK information bit(s) may be determined in ascending order of the PDSCH occasion indexes, the HARQ-ACK information bit(s) may be determined in descending order of the PDSCH-to-HARQ_feedback timing values, and then the HARQ-ACK information bit(s) may be determined in ascending order of the serving cell indexes. Consequently, HARQ-ACK information bit(s) for a cell of a lower serving cell index precede HARQ-ACK information bit(s) for a cell of a higher serving cell index in the HARQ-ACK codebook. In HARQ-ACK information bits for the same serving cell index, HARQ-ACK information bits for a higher PDSCH-to-HARQ feedback timing value precedes HARQ-ACK information bits of a lower PDSCH-to-HARQ feedback timing value and, in HARQ-ACK information bits for the same PDSCH-to-HARQ_feedback timing value, HARQ-ACK information bits for a lower PDSCH occasion index precedes HARQ-ACK information bits for a higher PDSCH occasion index.

Figure 18:
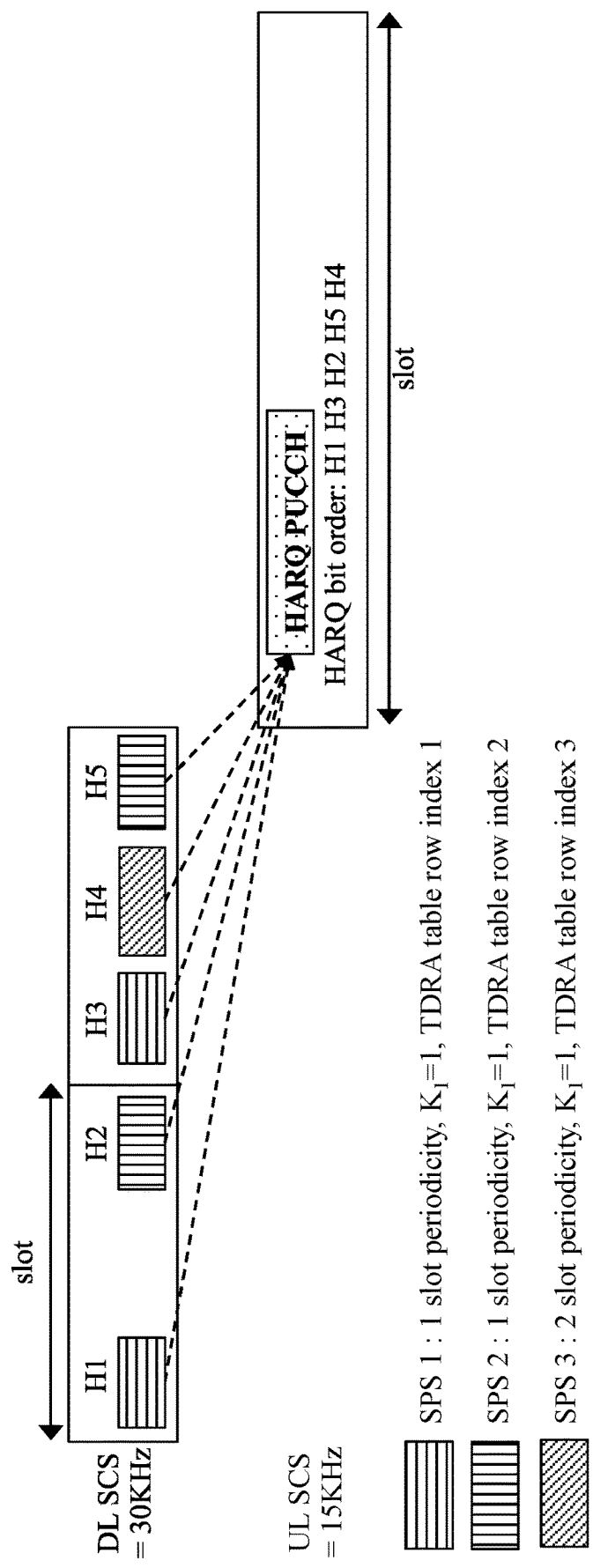
FIG. 18 and FIG. 19 illustrate transmission/reception of HARQ-ACK information for SPS PDSCHs according to some implementations of the present disclosure.
Figure 19:
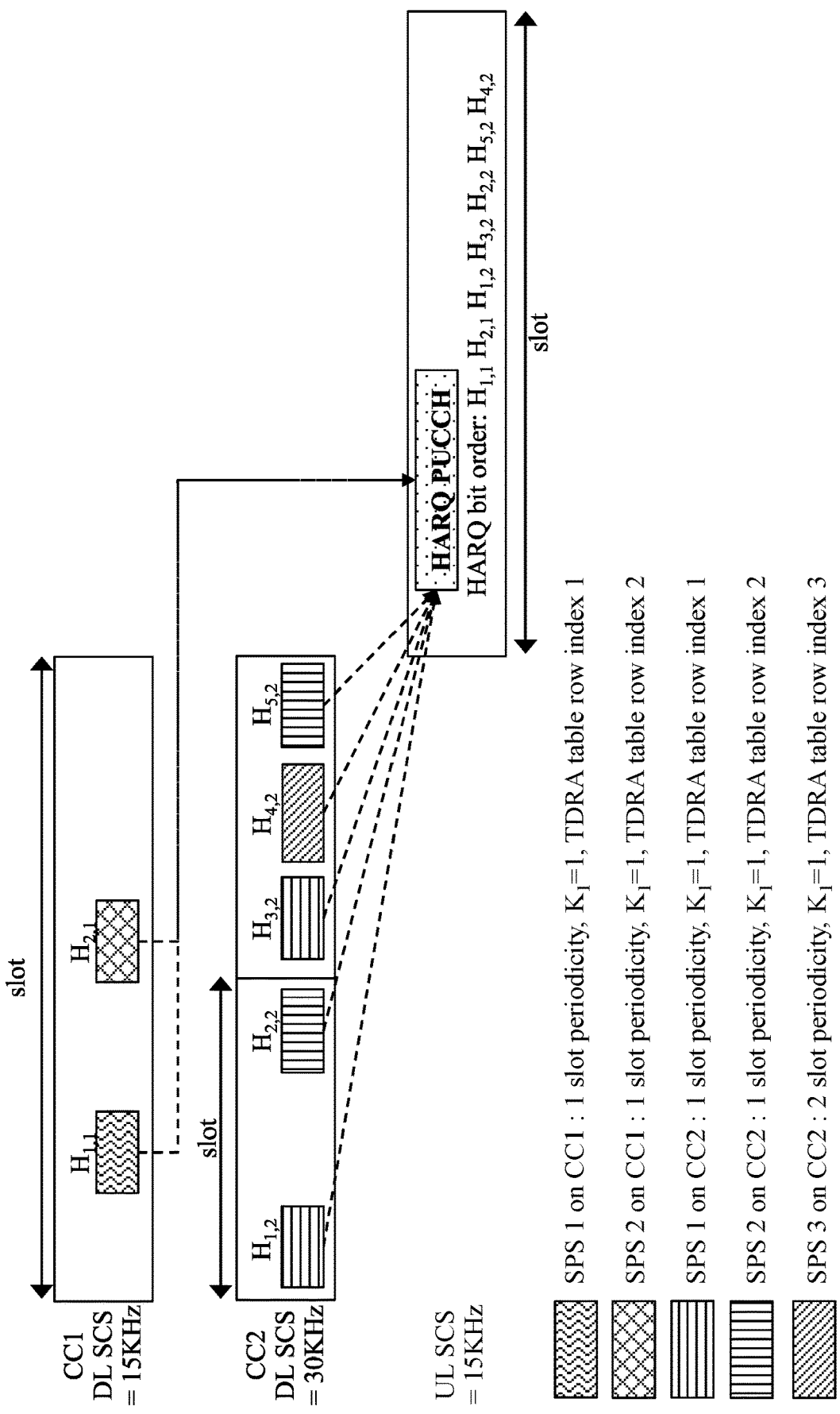

Option 2-5-3: FIG. 18 and FIG. 19 illustrate transmission/reception of HARQ-ACK information for SPS PDSCHs according to some implementations of the present disclosure.

The order of HARQ-ACK bits for SPS PDSCHs may be determined in consideration of i) a DL slot, ii) an SPS configuration index, iii) a PDSCH-to-HARQ_feedback timing value, and/or iv) a serving cell index. Specifically, HARQ-ACK information bits for SPS PDSCH(s) on each serving cell may be included in a HARQ-ACK codebook in ascending order of serving cell indexes starting from a serving cell having the lowest serving cell index. For each serving cell, (for each PDSCH-to-HARQ feedback timing value in descending order of PDSCH-to-HARQ_feedback timing values if the PDSCH-to-HARQ_feedback timing values are considered) HARQ-ACK information bits are included in the HARQ-ACK codebook in ascending order of SPS configuration indexes. For each SPS configuration index, HARQ-ACK information bit(s) are included in the HARQ-ACK codebook in ascending order of DL slots. For example, when a DL slot, an SPS configuration index, a PDSCH-to-HARQ_feedback timing value, and a serving cell index are considered, HARQ-ACK information bit(s) may be determined in ascending order of DL slots (within the same SPS configuration index, the same PDSCH-to-HARQ_feedback timing value, and/or the same serving cell index), HARQ-ACK information bit(s) may be determined in ascending order of SPS configuration indexes (within the same PDSCH-to-HARQ_feedback timing value and/or the same serving cell index), and then HARQ-ACK information bit(s) may be determined in descending order of PDSCH-to-HARQ_feedback timing values (within the same serving cell index). Then, HARQ-ACK information bits may be determined by repeating the above operation in the next serving cell in ascending order of serving cell indexes. According to option 2-5-3, HARQ-ACK information bit(s) for a cell having a lower serving cell index precede HARQ-ACK information bit(s) for a cell having a higher serving cell index in the HARQ-ACK codebook, a HARQ-ACK information bit for a larger PDSCH-to-HARQ_feedback timing value precedes a HARQ-ACK information bit for a smaller PDSCH-to-HARQ_feedback timing value in HARQ-ACK information bits for the same serving cell index, a HARQ-ACK information bit for a smaller SPS configuration index precedes a HARQ-ACK information bit for a larger SPS configuration index in HARQ-ACK information bits for the same PDSCH-to-HARQ_feedback timing value, and a HARQ-ACK information bit for a smaller DL slot index (i.e., a preceding DL slot in the time domain) precedes a HARQ-ACK information bit for a larger DL slot index (i.e., a following DL slot in the time domain) in HARQ-ACK information bits for the same SPS configuration index.

Referring to FIG. 18, SPS configuration 1 (SPS 1 in FIG. 18), SPS configuration 2 (SPS 2 in FIG. 18), and SPS configuration 3 (SPS 3 in FIG. 18) are set in a DL cell with subcarrier spacing=30 kHz, and a HARQ-ACK codebook including HARQ-ACK information bits for SPS PDSCHs according to SPS 1, SPS 2 and SPS 3 is transmitted in a HARQ PUCCH of a UL slot with subcarrier spacing=15 kHz. HARQ-ACK information bits for SPS PDSCHs in the two DL slots associated with the UL slot are determined for a SPS PDSCH based on SPS 1 having the lowest SPS configuration index. Since the SPS PDSCH based on SPS1 is present in two DL slots, HARQ-ACK information bits for SPS PDSCHs H1 and H3 based on SPS 1 may be included in the HARQ-ACK codebook in ascending order of DL slot indexes in ascending order, HARQ-ACK information bits for SPS PDSCHs H2 and H5 based on SPS 2 having the next lowest SPS configuration index may be included in the HARQ-ACK codebook in ascending order of DL slot indexes, and then a HARQ-ACK information bit for an SPS PDSCH H3 based on SPS 3 having the next lowest SPS configuration index may be included in the HARQ-ACK codebook.

Referring to FIG. 19, SPS configuration 1 and SPS configuration 2 are configured in a cell (CC1) with subcarrier spacing=15 kHz, and SPS configuration 1, SPS configuration 2 and SPS configuration 3 are configured in a cell (CC2) with subcarrier spacing=30 kHz. HARQ-ACK information bits for SPS PDSCHs of DL CC1 and DL CC2 are transmitted in a HARQ PUCCH of a UL slot of another cell with subcarrier spacing=15 kHz. According to option 2-5-3, the HARQ-ACK information bits for the SPS PDSCHs may be included in the HARQ-ACK codebook in the order of H$_u$, H2,1, H1,2, H3,2, H2,2, H5,2, H4,2.

If HARQ-ACK bits are unconditionally determined in chronological order regardless of SPS configuration indexes, respective SPS configurations associated with DL slots may be different, and thus HARQ-ACK bits can be determined only when HARQ-ACK bit determination is prepared for all SPS configurations provided to a UE. Accordingly, implementation of the UE becomes complicated. On the other hand, according to option 2-5-3, HARQ-ACK bits are arranged in a codebook in ascending order of slot indexes for each SPS configuration index. That is, HARQ-ACK bits are determined in ascending order of DL slot indexes for the lowest SPS configuration index for a cell, the SPS configuration index is increased, and then HARQ-ACK bits are determined in ascending order of DL slot indexes for the next SPS configuration index. Therefore, a UE calculates a HARQ-ACK bit in chronological order for lowest SPS configuration index #0, changes a parameter/configuration to SPS configuration index #1, and calculates a HARQ-ACK bit again in chronological order. Therefore, according to option 2-5-3, there is an advantage that the complexity of UE implementation can be reduced.

Option 2-5-4: HARQ-ACK information bit(s) may be determined in ascending order of DL slots (within the same DAI value in active DCI, the same PDSCH-to-HARQ_feedback timing value, and the same serving cell index), HARQ-ACK information bit(s) may be determined in ascending order of DAI values in the active DCI (within the same PDSCH-to-HARQ_feedback timing value and the same serving cell index), and then HARQ-ACK information bit(s) may be determined in descending order of PDSCH-to-HARQ_feedback timing values (within the same serving cell index). Then, HARQ-ACK information bits may be determined by repeating the above operation in the next serving cell in ascending order of serving cell indexes.

Option 2-5-5: HARQ-ACK information bit(s) may be determined in ascending order of DAI values in active DCI (within the same DL slot, the same PDSCH-to-HARQ_feedback timing value, and the same serving cell index), HARQ-ACK information bit(s) may be determined in ascending order of DL slots (within the same PDSCH-to-HARQ_feedback timing value and the same serving cell index), and then HARQ-ACK information bit(s) may be determined in descending order of the PDSCH-to-HARQ_feedback timing values (within the same serving cell index). Then, HARQ-ACK information bits may be determined by repeating the above operation in the next serving cell in ascending order of serving cell indexes.

Example <2-5> may be applied together with or independently of Example <2-3> or Example <2-4>.

Example 2 may be applied together with or independently of Example 1.

<2-6> If HARQ-ACK for joint release DCI consists of one bit, in which HARQ-ACK codebook corresponding to which service type/priority HARQ-ACK for joint release DCI will be included should be determined.

If a plurality of DL SPS resources released by the joint release DCI has different service types/priorities, in which HARQ-ACK codebook corresponding to which service type/priority HARQ-ACK for the joint release DCI will be included may be determined by the following option(s).

Option 2-6-1: HARQ-ACK may be included in a HARQ-ACK codebook corresponding to a service type/priority of a higher priority.

Option 2-6-2: HARQ-ACK may be included in a HARQ-ACK codebook corresponding to a service type/priority of the lowest (or highest) SPS configuration index.

Option 2-6-3: HARQ-ACK for the joint release DCI may be generated with respect to each of the service types/priorities and may be included in each HARQ-ACK codebook.

Example <2-6> may be applied together with or independently of Example <2-3> or Example <2-4>. Example <2-6> may be applied together with or independently of Example <2-5>.

Figure 20:
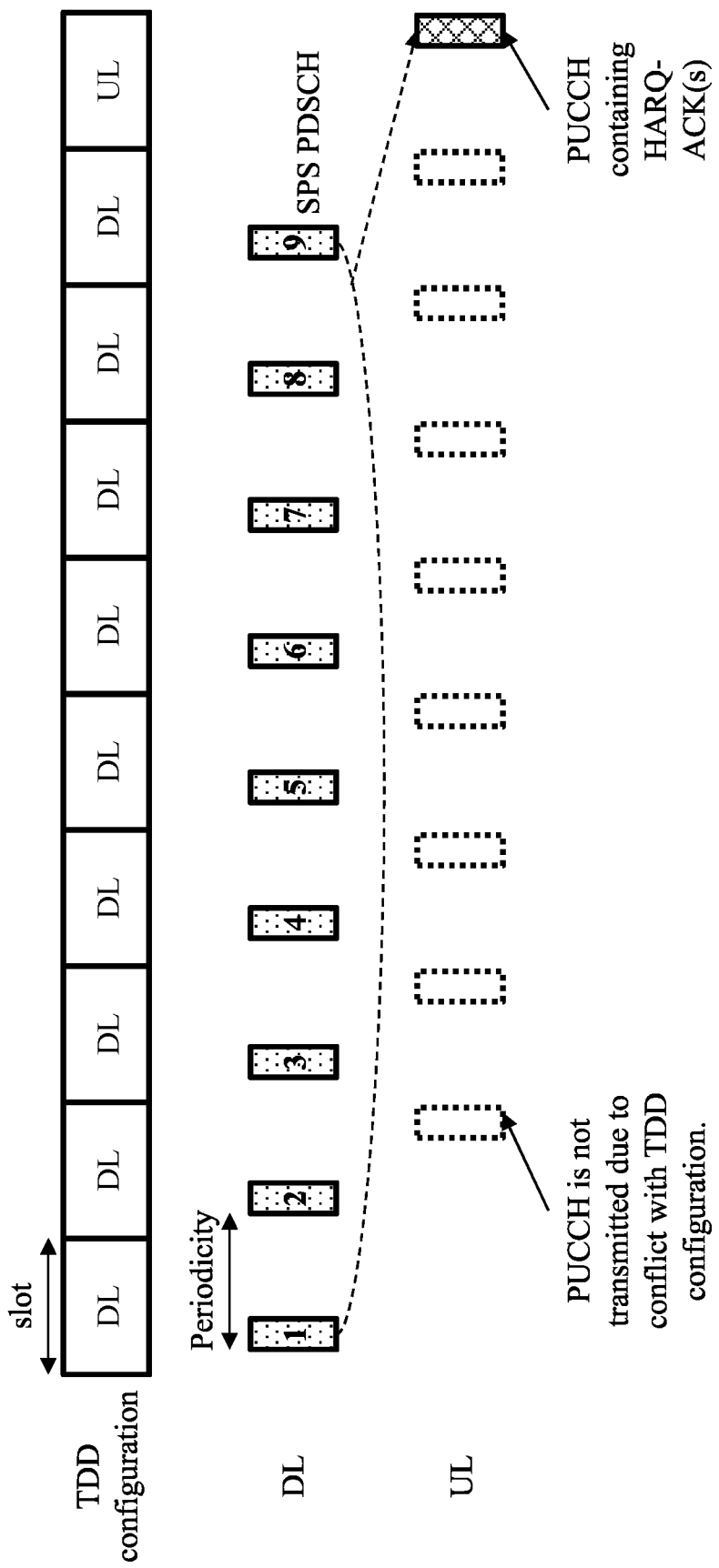
FIG. 20 illustrates PUCCH transmission according to some implementations of the present disclosure.

<2-7> FIG. 20 illustrates PUCCH transmission according to some implementations of the present disclosure. The UE for which a DL SPS is configured transmits, in a slot n+$K_1$, HARQ-ACK for an SPS PDSCH received in a slot n. In this case, $K_1$ (=PDSCH-to-HARQ-ACK timing gap) is a value indicated by activation DCI. In some scenarios, if an available UL resource is not present due to a TDD configuration in the slot n+$K_1$, a rule is defined such that the UE cancels PUCCH transmission for HARQ-ACK. However, to support URLLC targeted at (i.e., requiring) lower latency and higher reliability than existing latency and reliability, a shorter SPS periodicity and/or a plurality of SPS configurations may be considered. In this case, cancellation for PUCCH transmission caused by absence of an available UL resource may be more frequently generated. Accordingly, in order to relieve such HARQ-ACK loss, a rule may be defined such that the UE transmits a PUCCH for an SPS PDSCH using the earliest available UL resource instead of cancelling PUCCH transmission.

Upon transmitting the PUCCH for the SPS PDSCH using the earliest available UL resource, the UE may transmit HARQ-ACK for a specific DL SPS PDSCH after a time longer than the indicated $K_1$. For example, in FIG. 20, when $K_1$ indicates one slot, HARQ-ACK for an SPS PDSCH transmitted in the first slot is actually transmitted in the tenth slot rather than the second slot. In the case of the type-1 HARQ-ACK codebook, a HARQ-ACK bit location (order) is determined by a TDRA table index corresponding to a PDSCH occasion, and $K_1$. In this case, a separate rule for determination of the HARQ-ACK bit location (order) may be needed.

In this case, a rule may be defined such that a HARQ-ACK bit location (order) for a specific SPS PDSCH is determined in ascending order of a TDRA table index corresponding to a PDSCH occasion and in descending order of a time difference from an actual HARQ-ACK transmission PUCCH. For example, the $K_1$ value indicated by the activation DCI is used to determine a timing for PUCCH transmission, but the $K_1$ value may not be used and may be disregarded in determining the HARQ-ACK bit location (order). Referring to FIG. 20, for example, the HARQ-ACK bit location (order) may be determined in order of {SPS1, SPS2, . . . , SPS9}.

As another method, a rule may be defined such that the HARQ-ACK bit location (order) for the specific SPS PDSCH is determined in ascending order of the TDRA table index corresponding to the PDSCH occasion, in descending order of the time difference from the actual HARQ-ACK transmission PUCCH, and by a candidate set of $K_1$ configured for the UE (e.g., slots provided by an RRC parameter dl-DataToUL-ACK, where dl-DataToUL-ACK is a list of timings for given PDSCH-to-UL ACK). The HARQ-ACK bit location (order) may be determined first for the case in which the time difference from the actual HARQ-ACK transmission PUCCH for the specific SPS PDSCH is present in the candidate set of $K_1$ and then the HARQ-ACK bit location (order) for the case in which the time difference from the actual HARQ-ACK transmission PUCCH for the specific SPS PDSCH is not present in the candidate set of $K_1$ may be determined through concatenation. Referring to FIG. 20, for example, when dl-DataToUL-ACK={1,2,3,4}, HARQ-ACK bits for SPS PDSCHs (SPS6 to SPS9 of FIG. 20) belonging to a slot given by dl-DataToUL-ACK={1,2,3,4} are disposed at higher HARQ-ACK bit locations, and the remaining SPS PDSCHs may be subsequently concatenated so that the HARQ-ACK bit location (order) may be determined in order of {SPS6, SPS7, SPS8, SPS9, SPS1, SPS2, . . . , SPS5}.

In the above situation, HARQ-ACK for an SPS PDSCH for which the PUCCH corresponding to the original HARQ-ACK transmission timing is canceled may be concatenated at a rear part of a codebook for dynamically scheduled PDSCH(s) after generation of the codebook for the dynamically scheduled PDSCH(s). Alternatively, the HARQ-ACK for the SPS PDSCH for which the PUCCH corresponding to the original HARQ-ACK transmission timing is canceled may be concatenated at a rear part of a codebook for dynamically scheduled PDSCH(s) and SPS PDSCH(s) for which the PUCCH corresponding to the original HARQ-ACK transmission timing is not canceled after generation of the codebook.

Example <2-7> may be applied together with one or more of Example <2-1> to Example <2-6> or independently of Example <2-1> to Example <2-6>.

<Example 3> Configurable HARQ-ACK Window for DL SPS

Figure 21:
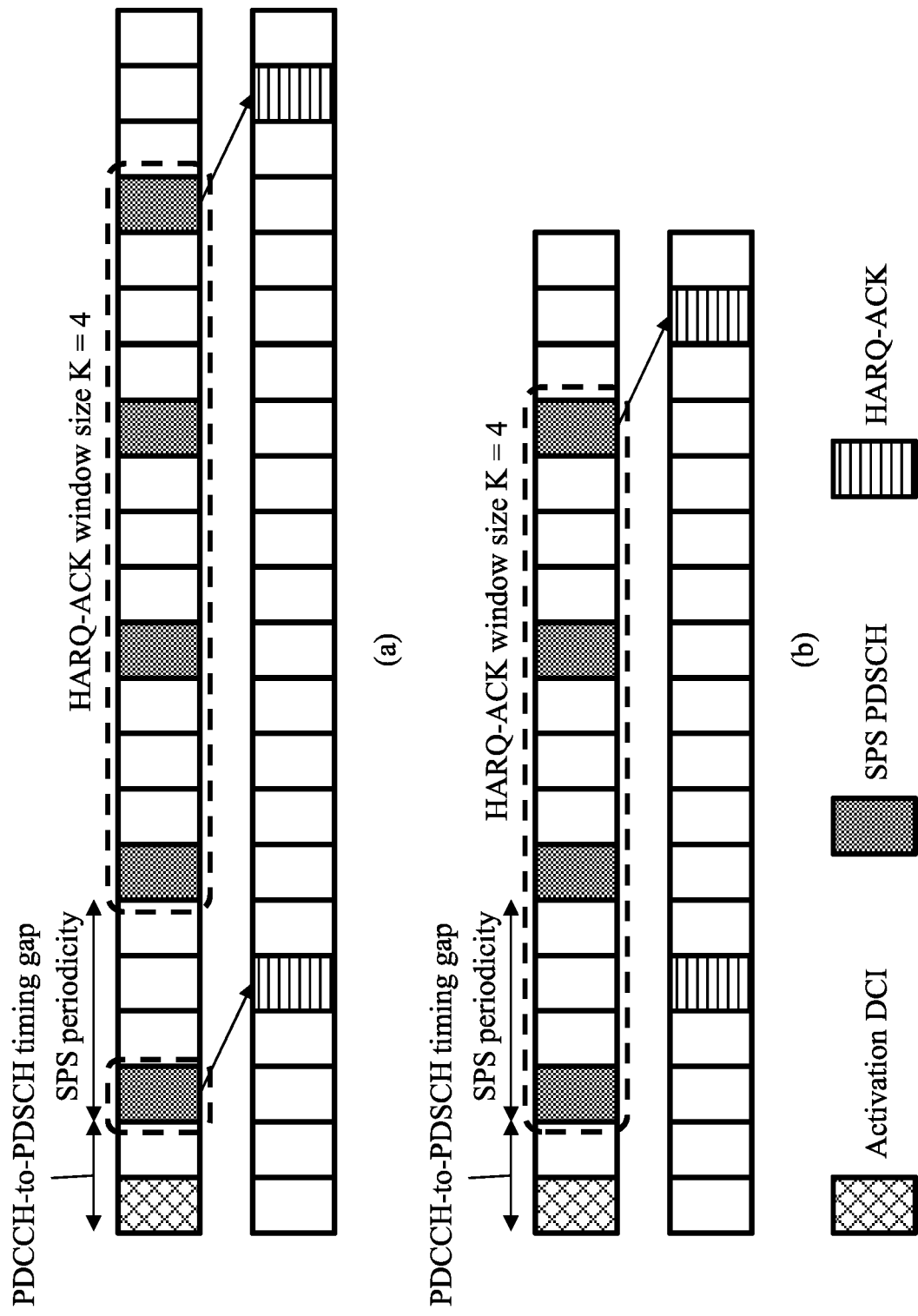
FIG. 21 illustrates HARQ-ACK transmission based on a configurable HARQ-ACK window according to some implementations of the present disclosure.

FIG. 21 illustrates HARQ-ACK transmission based on a configurable HARQ-ACK window according to some implementations of the present disclosure.

When a minimum periodicity of a DL SPS is reduced to a predetermined value or less, the number of HARQ-ACK bits for each SPS PDSCH increases. If each HARQ-ACK information is transmitted on a separate channel, UL spectral efficiency may be degraded due to excessive PUCCH overhead. In contrast, when HARQ-ACK information for SPS PDSCH(s) within a predetermined duration is transmitted on one PUCCH, latency may increase and PUCCH performance may be degraded due to increased payload. Considering balance between UL spectral efficiency and PUCCH itself performance, a HARQ-ACK window size K about whether HARQ-ACK bits corresponding to some SPS PDSCHs will be aggregated and transmitted on one channel may be configured for the UE by the BS through a higher layer signal or may be indicated through a physical layer signal (e.g., activation DCI). The HARQ-ACK window size may refer to a HARQ-ACK transmission payload size for an SPS PDSCH or the number of HARQ-ACK bits to be bundled. The HARQ-ACK window size may be applied by configuring/indicating one common value when multiple DL SPSs are configured or may be applied by configuring/indicating an independent (different) value for each DL SPS configuration.

HARQ-ACK information for K SPS PDSCHs aggregated by the HARQ-ACK window size may be predefined/agreed on from the last SPS PDSCH among the K SPS PDSCHs or may be transmitted on a channel after a configured/indicated time through a higher/physical layer signal.

In particular, a rule may be defined such that HARQ-ACK corresponding to the first SPS PDSCH of a DL SPS activated by activation DCI is transmitted regardless of the HARQ-ACK window size K, and K SPS PDSCHs from a subsequent SPS PDSCH are aggregated to transmit HARQ-ACK for the K SPS PDSCHs on one channel. For example, referring to FIG. 21(a), when K=4, HARQ-ACK for the first SPS PDSCH of the activated DL SPS may be included in one PUCCH/PUSCH and then be transmitted, HARQ-ACK information for the second to fifth SPS PDSCHs may be included in another PUCCH/PUSCH and then be transmitted, and HARQ-ACK information for the sixth to ninth SPS PDSCHs may be included in still another PUCCH/PUSCH and then be transmitted.

As an alternative method, referring to FIG. 21(b), a rule may also be defined such that K SPS PDSCHs corresponding to the HARQ-ACK window size K starting from the first SPS PDSCH of a DL SPS activated by the activation DCI are aggregated and HARQ-ACK for the aggregated SPS PDSCHs is transmitted on one channel.

In the case of a DL SPS deactivated/released by release DCI, in some cases, only fewer (e.g., M) PDSCHs than the K SPS PDSCHs may be transmitted for the last HARQ-ACK report. For the HARQ-ACK report, a rule may be defined such that HARQ-ACK information for the K SPS PDSCHs are all included and NACK (or ACK) is transmitted for K-M SPS PDSCHs which are not actually transmitted. This may be helpful to maintain processing complexity of the UE and the BS at a predetermined level by equally maintaining a HARQ-ACK configuration method even when SPS release occurs.

As another method, a rule may be defined such that a HARQ-ACK codebook size is determined by the number M of actually transmitted SPS PDSCHs for a released DL SPS. Alternatively, for the number M of actually transmitted SPS PDSCHs, the HARQ-ACK codebook size is determined as M+1, and the last bit may include HARQ-ACK information for SPS PDSCH release. This may be helpful to improve the reliability of a corresponding channel by configuring a HARQ-ACK transmission channel through a smaller payload size when SPS release occurs.

A rule may be defined such that a PUCCH resource for HARQ-ACK transmission for a DL SPS (e.g., a parameter n1PUCCH-AN in SPS configuration SPS-Config provided to the UE by the BS, where the parameter n1PUCCH-AN denotes a HARQ resource for a DL SPS PUCCH) and/or a PUCCH format is differently configured (in plural), according to the HARQ-ACK window size K. For example, for K>2, a PUCCH resource/format corresponding to PUCCH format 2, 3, and/or 4 may be configured/used and, for K<=2, a PUCCH resource/format corresponding to PUCCH format 0 and/or 1 may be configured/used. As another example, when HARQ-ACK bundling is configured/indicated even for K>2, a PUCCH resource/format to be used may be determined according to a final payload size after bundling is applied.

Example 3 may be applied together with or independently of Example 1 and/or Example 2.

In the present disclosure, a service type/priority, which will be applied to/considered for a specific SPS PDSCH (or HARQ-ACK corresponding to the specific SPS PDSCH) or which will be used for collision handling, may be configured through a higher layer signal, may be explicitly indicated through a specific field of activation/release DCI, may be distinguished through a search space to which a PDCCH including the activation/release DCI belongs, may be distinguished by a CORESET to which the PDCCH including the activation/release DCI belongs, may be distinguished by an RNTI, DCI format, or a DCI size, may be determined and distinguished by a scheduling characteristic of a PDSCH/PUSCH (e.g., a PDSCH/PUSCH duration or a PDSCH/PUSCH priority), or may be distinguished through CRC masking of the PDCCH.

Figure 22:
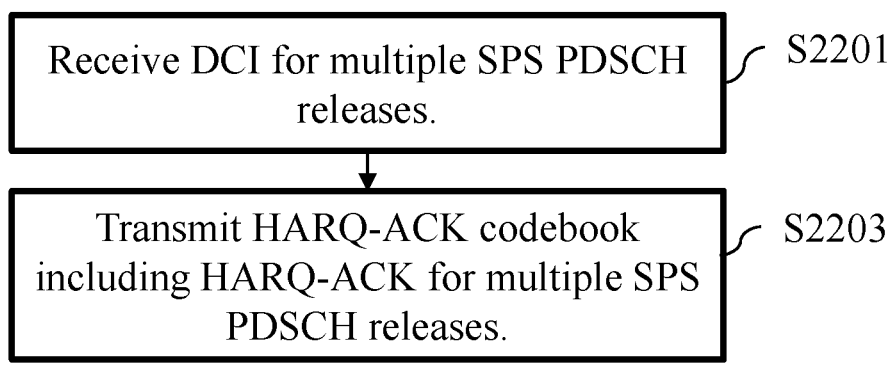
FIGS. 22 and 23 illustrate HARQ-ACK information transmission/reception flows according to some implementations of the present disclosure.
Figure 23:
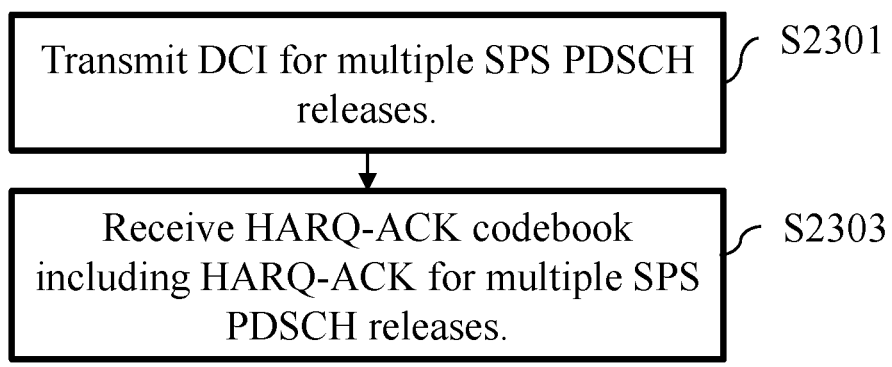

FIGS. 22 and 23 illustrate HARQ-ACK information transmission/reception flows according to some implementations of the present disclosure.

A UE may perform operations according to some implementations of the present disclosure to transmit HARQ-ACK information. The UE may include at least one transceiver; at least one processor; and at least one computer memory operably connectable to the at least one processor and configured to store instructions that, when executed, cause the at least one processor to perform operations according to some implementations of the present disclosure. A processing apparatus for the UE may include at least one processor; and at least one computer memory operably connectable to the at least one processor and configured to store instructions that, when executed, cause the at least one processor to perform operations according to some implementations of the present disclosure. A computer-readable storage medium may store at least one computer program including instructions that, when executed, at least one processor to perform operations according to some implementations of the present disclosure. Referring to FIG. 22, in some implementations of the present disclosure, a method of transmitting a HARQ-ACK codebook or the operations include, for example, receiving DCI for releasing a plurality of SPS resources (S2201); and transmitting the HARQ-ACK codebook including HARQ-ACK information regarding release of the plural SPS resources (S2203). The HARQ-ACK codebook includes the HARQ-ACK information regarding release of the plural SPS resources at a HARQ-ACK bit location corresponding to an SPS resource having a lowest SPS configuration index among the plural SPS resources. The method or the operations may further include receiving an SPS configuration for each of the plural SPS resources. The HARQ-ACK bit location corresponding to the SPS resource having the lowest SPS configuration index may be a HARQ-ACK bit location for an occasion of PDSCH reception based on the SPS resource having the lowest SPS configuration index. The method or the operations may include receiving activation DCI for each of the plural SPS resources. The occasion of the PDSCH reception based on the SPS resource having the lowest SPS configuration index may be determined based on a time domain resource assignment field value in the activation DCI for the SPS resource having the lowest SPS configuration index. The method or the operations may include determining a plurality of occasions for PDSCH receptions. The HARQ-ACK codebook may include a plurality of HARQ-ACK bits for the plural occasions. The HARQ-ACK codebook may be a type-1 HARQ-ACK codebook in which a size of the HARQ-ACK codebook is determined based on higher layer parameters from a BS.

The BS may perform operations according to some implementations of the present disclosure to receive HARQ-ACK information. The BS may include at least one transceiver; at least one processor; and at least one computer memory operably connectable to the at least one processor and configured to store instructions that, when executed, cause the at least one processor to perform operations according to some implementations of the present disclosure. A processing apparatus for the BS may include at least one processor; and at least one computer memory operably connectable to the at least one processor and configured to store instructions that, when executed, cause the at least one processor to perform operations according to some implementations of the present disclosure. A computer-readable storage medium may store at least one computer program including instructions that, when executed, cause at least one processor to perform operations according to some implementations of the present disclosure. Referring to FIG. 23, in some implementations of the present disclosure, a method of receiving a HARQ-ACK codebook or the operations may include, for example, transmitting DCI for releasing a plurality of SPS resources to the UE (S2301); and receiving the HARQ-ACK codebook including HARQ-ACK information regarding release of the plural SPS resources from the UE (S2303). The HARQ-ACK codebook may include the HARQ-ACK information regarding release of the plural SPS resources at a HARQ-ACK bit location related to an SPS resource having a lowest SPS configuration index among the plural SPS resources. The method or the operations may further include transmitting an SPS configuration for each of the plural SPS resources. The HARQ-ACK bit location corresponding to the SPS resource having the lowest SPS configuration index may be a HARQ-ACK bit location for an occasion of PDSCH transmission based on the SPS resource having the lowest SPS configuration index. The method or the operations may include transmitting activation DCI for each of the plural SPS resources. The occasion of the PDSCH transmission based on the SPS resource having the lowest SPS configuration index may be determined based on a time domain resource assignment field value in the activation DCI for the SPS resource having the lowest SPS configuration index. The method or the operations may include determining a plurality of occasions for PDSCH transmissions. The HARQ-ACK codebook may include a plurality of HARQ-ACK bits for the plural occasions. The HARQ-ACK codebook may be a type-1 HARQ-ACK codebook in which a size of the HARQ-ACK codebook is determined based on higher layer parameters provided by the BS to the UE.

Figure 24:
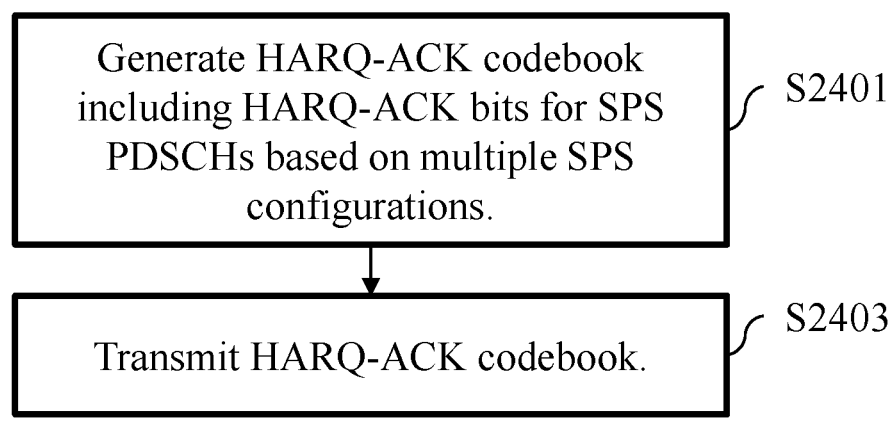
FIG. 24 and FIG. 25 illustrate another example of HARQ-ACK information transmission/reception flows according to some implementations of the present disclosure.
Figure 25:
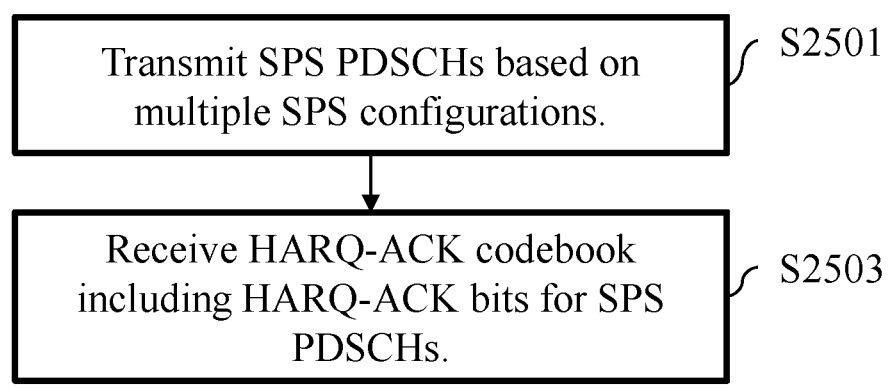

FIG. 24 and FIG. 25 illustrate another example of a HARQ-ACK information transmission/reception flow according to some implementations of the present disclosure.

A UE may perform operations according to some implementations of the present disclosure for transmission of HARQ-ACK information. The UE may include at least one transceiver; at least one processor; and at least one computer memory operably connectable to the at least one processor and storing instructions that, when executed, cause the at least one processor to perform operations according to some implementations of the present disclosure. A processing device for the UE may include at least one processor; and at least one computer memory operably connectable to the at least one processor, storing instructions that, when executed, cause the at least one processor to perform operations according to some implementations of the present disclosure. A computer-readable storage medium may store at least one computer program including instructions that, when executed by at least one processor, cause the at least one processor to perform operations according to some implementations of the present disclosure. Referring to FIG. 24, in some implementations of the present disclosure, a method or the above-described operations of transmitting a HARQ-ACK codebook may include, for example, determining or generating the HARQ-ACK codebook including HARQ-ACK bits for SPS PDSCHs based on a plurality of SPS configurations (S2401); and transmitting the HARQ-ACK codebook (S2403). The HARQ-ACK codebook may be determined or generated such that a HARQ-ACK bit for an SPS PDSCH in a slot having a low slot index precedes a HARQ-ACK bit for an SPS PDSCH in a slot having a high slot index for an SPS configuration index and a serving cell index. The HARQ-ACK codebook may be determined or generated such that a HARQ-ACK bit for an SPS PDSCH based on an SPS configuration having a lower SPS configuration index precedes a HARQ-ACK for an SPS PDSCH based on an SPS configuration having a higher SPS configuration index for each serving cell index. The HARQ-ACK codebook may be determined or generated such that all HARQ-ACK bits for an SPS PDSCH of a cell having a lower serving cell index precede all HARQ-ACK bits for an SPS PDSCH of a cell having a higher serving cell index. The HARQ-ACK codebook may be transmitted through a physical uplink control channel (PUCCH). The HARQ-ACK codebook may be determined or generated such that it includes only HARQ-ACK bits for the SPS PDSCHs. The HARQ-ACK codebook may be determined or generated such that a HARQ-ACK bit for an SPS PDSCH associated with a larger PDSCH-to-HARQ feedback timing value precedes a HARQ-ACK bit for an SPS PDSCH associated with a smaller PDSCH-to-HARQ feedback timing value for each serving cell index. The HARQ-ACK codebook may be determined or generated such that a HARQ-ACK bit for an SPS PDSCH based on an SPS configuration having a lower SPS configuration index precedes a HARQ-ACK bit for an SPS PDSCH based on an SPS configuration having a higher SPS configuration index for the same PDSCH-to-HARQ feedback timing value and the same serving cell index.

ABS may perform operations according to some implementations of the present disclosure for reception of HARQ-ACK information. The BS may include: at least one transceiver; at least one processor; and at least one computer memory operably connectable to the at least one processor and storing instructions that, when executed, cause the at least one processor to perform operations according to some implementations of the present disclosure. A processing device for the BS may include at least one processor; and at least one computer memory operably connectable to the at least one processor, storing instructions that, when executed, cause the at least one processor to perform operations according to some implementations of the present disclosure. A computer-readable storage medium may store at least one computer program including instructions that, when executed by at least one processor, cause the at least one processor to perform operations according to some implementations of the present disclosure. Referring to FIG. 25, in some implementations of the present disclosure, the above-described operations may include, for example, transmitting SPS PDSCHs based on a plurality of SPS configurations (S2501); and receiving the HARQ-ACK codebook including HARQ-ACK bits for the SPS PDSCHs (S2503). The HARQ-ACK codebook may include HARQ-ACK bits for the SPS PDSCHs such that a HARQ-ACK bit for an SPS PDSCH in a slot having a low slot index precedes a HARQ-ACK bit for an SPS PDSCH in a slot having a high slot index for an SPS configuration index and a serving cell index. The HARQ-ACK codebook may include the HARQ-ACK bits for the SPS PDSCHs such that a HARQ-ACK bit for an SPS PDSCH based on an SPS configuration having a lower SPS configuration index precedes a HARQ-ACK for an SPS PDSCH based on an SPS configuration having a higher SPS configuration index for each serving cell index. The HARQ-ACK codebook may include the HARQ-ACK bits for the SPS PDSCHs such that all HARQ-ACK bits for an SPS PDSCH of a cell having a lower serving cell index precede all HARQ-ACK bits for an SPS PDSCH of a cell having a higher serving cell index. The HARQ-ACK codebook may be received through a physical uplink control channel (PUCCH). The HARQ-ACK codebook may be a HARQ-ACK codebook including only the HARQ-ACK bits for the SPS PDSCHs. The HARQ-ACK codebook may include the HARQ-ACK bits for the SPS PDSCHS such that a HARQ-ACK bit for an SPS PDSCH associated with a larger PDSCH-to-HARQ feedback timing value precedes a HARQ-ACK bit for an SPS PDSCH associated with a smaller PDSCH-to-HARQ feedback timing value for each serving cell index. The HARQ-ACK codebook may include the HARQ-ACK bits for the SPS PDSCHS such that a HARQ-ACK bit for an SPS PDSCH based on an SPS configuration having a lower SPS configuration index precedes a HARQ-ACK bit for an SPS PDSCH based on an SPS configuration having a higher SPS configuration index for the same PDSCH-to-HARQ feedback timing value and the same serving cell index.

The examples of the present disclosure as described above have been presented to enable any person of ordinary skill in the art to implement and practice the present disclosure. Although the present disclosure has been described with reference to the examples, those skilled in the art may make various modifications and variations in the example of the present disclosure. Thus, the present disclosure is not intended to be limited to the examples set for the herein, but is to be accorded the broadest scope consistent with the principles and features disclosed herein.

INDUSTRIAL APPLICABILITY

The implementations of the present disclosure may be used in a BS, a UE, or other equipment in a wireless communication system.

What is claimed is:

1. A method of transmitting a hybrid automatic repeat request acknowledgment (HARQ-ACK) codebook by user equipment in a wireless communication system, the method comprising:
generating the HARQ-ACK codebook including HARQ-ACK bits for SPS physical downlink shared channels (PDSCHs) based on a plurality of semi-persistent scheduling (SPS) configurations; and
transmitting the HARQ-ACK codebook,
wherein the HARQ-ACK codebook is generated such that a HARQ-ACK bit for an SPS PDSCH in a slot with a low slot index precedes a HARQ-ACK bit for an SPS PDSCH in a slot with a high slot index with respect to an SPS configuration index and a serving cell index, and
wherein the HARQ-ACK codebook is generated such that a HARQ-ACK bit for an SPS PDSCH based on an SPS configuration with a lower SPS configuration index precedes a HARQ-ACK bit for an SPS PDSCH based on an SPS configuration with a higher SPS configuration index with respect to each serving cell index.

2. The method of claim 1, wherein the HARQ-ACK codebook is generated such that all HARQ-ACK bits for an SPS PDSCH of a cell with a lower serving cell index precede all HARQ-ACK bits for an SPS PDSCH of a cell with a higher serving cell index.

3. The method of claim 1, wherein the HARQ-ACK codebook is transmitted through a physical uplink control channel (PUCCH).

4. The method of claim 1, wherein the HARQ-ACK codebook includes only the HARQ-ACK bits for the SPS PDSCHs.

5. The method of claim 4, wherein the HARQ-ACK codebook is generated such that a HARQ ACK bit for an SPS PDSCH associated with a larger PDSCH-to-HARQ feedback timing value precedes a HARQ-ACK bit for an SPS PDSCH associated with a smaller PDSCH-to-HARQ feedback timing value with respect to each serving cell index.

6. The method of claim 1, wherein the HARQ-ACK codebook is generated such that a HARQ-ACK bit for an SPS PDSCH based on an SPS configuration with a lower SPS configuration index precedes a HARQ-ACK bit for an SPS PDSCH based on an SPS configuration with a higher SPS configuration index with respect to the same PDSCH-to-HARQ feedback timing value and the same serving cell index.

7. A user equipment for transmitting a hybrid automatic repeat request acknowledgment (HARQ-ACK) codebook in a wireless communication system, the user equipment comprising:
at least one transceiver;
at least one processor; and
at least one computer memory operably connectable to the at least one processor and storing instructions that, when executed, cause the at least one processor to perform operations, the operations comprising:
generating the HARQ-ACK codebook including HARQ-ACK bits for SPS physical downlink shared channels (PDSCHs) based on a plurality of semi-persistent scheduling (SPS) configurations; and
transmitting the HARQ-ACK codebook,
wherein the HARQ-ACK codebook is generated such that a HARQ-ACK bit for an SPS PDSCH in a slot with a low slot index precedes a HARQ-ACK bit for an SPS PDSCH in a slot with a high slot index with respect to an SPS configuration index and a serving cell index, and
wherein the HARQ-ACK codebook is generated such that a HARQ-ACK bit for an SPS PDSCH based on an SPS configuration with a lower SPS configuration index precedes a HARQ-ACK bit for an SPS PDSCH based on an SPS configuration with a higher SPS configuration index with respect to each serving cell index.

8. A method of receiving a hybrid automatic repeat request acknowledgment (HARQ-ACK) codebook by a base station in a wireless communication system, the method comprising:
transmitting SPS physical downlink shared channels (PDSCHs) based on a plurality of semi-persistent scheduling (SPS) configurations; and
receiving the HARQ-ACK codebook including HARQ-ACK bits for the SPS PDSCHs,
wherein the HARQ-ACK codebook includes the HARQ-ACK bits for the SPS PDSCHs such that a HARQ-ACK bit for an SPS PDSCH in a slot with a low slot index precedes a HARQ-ACK bit for an SPS PDSCH in a slot with a high slot index with respect to an SPS configuration index and a serving cell index, and
wherein the HARQ-ACK codebook includes the HARQ-ACK bits for the SPS PDSCHs such that a HARQ-ACK bit for an SPS PDSCH based on an SPS configuration with a lower SPS configuration index precedes a HARQ-ACK bit for an SPS PDSCH based on an SPS configuration with a higher SPS configuration index with respect to each serving cell index.

9. The method of claim 8, wherein the HARQ-ACK codebook includes the HARQ-ACK bits for the SPS PDSCHs such that all HARQ-ACK bits for an SPS PDSCH of a cell with a lower serving cell index precede all HARQ-ACK bits for an SPS PDSCH of a cell with a higher serving cell index.

10. The method of claim 8, wherein the HARQ-ACK codebook is received through a physical uplink control channel (PUCCH).

11. The method of claim 8, wherein the HARQ-ACK codebook includes only the HARQ-ACK bits for the SPS PDSCHs.

12. The method of claim 11, wherein the HARQ-ACK codebook includes the HARQ-ACK bits for the SPS PDSCHs such that a HARQ ACK bit for an SPS PDSCH associated with a larger PDSCH-to-HARQ feedback timing value precedes a HARQ-ACK bit for an SPS PDSCH associated with a smaller PDSCH-to-HARQ feedback timing value with respect to each serving cell index.

13. The method of claim 8, wherein the HARQ-ACK codebook includes the HARQ-ACK bits for the SPS PDSCHs such that a HARQ-ACK bit for an SPS PDSCH based on an SPS configuration with a lower SPS configuration index precedes a HARQ-ACK bit for an SPS PDSCH based on an SPS configuration with a higher SPS configuration index with respect to the same PDSCH-to-HARQ feedback timing value and the same serving cell index.

* * * * *